United States Patent [19]

Eerkens et al.

[11] Patent Number: 5,666,639

[45] Date of Patent: Sep. 9, 1997

[54] CRISLA PROCESS AND APPARATUS

[75] Inventors: Jozef W. Eerkens, Pacific Palisades, Calif.; Dennis G. Garratt; Brian C. Olson, both of Cobourg, Canada; Ken J. Falk; John H. Wang, both of Saskatoon, Canada

[73] Assignee: ITI Group LLC, Rocheport, Mo.

[21] Appl. No.: 255,331

[22] Filed: Jun. 7, 1994

[51] Int. Cl.$^6$ .................................................. B01J 19/08
[52] U.S. Cl. ...................................... 422/186; 204/157.22
[58] Field of Search ....................... 422/186; 204/157.22

[56] References Cited

U.S. PATENT DOCUMENTS

| | | | |
|---|---|---|---|
| 4,082,633 | 4/1978 | Eerkens | 204/157.22 |
| 4,119,509 | 10/1978 | Szoke | 204/157.22 |
| 4,156,811 | 5/1979 | Born | 250/284 |
| 4,401,627 | 8/1983 | Janner et al. | 422/186 |
| 4,948,478 | 8/1990 | Obermayer | 204/157.22 |
| 5,015,348 | 5/1991 | Eerkens | 204/157.2 |
| 5,108,566 | 4/1992 | Eerkens | 204/157.2 |
| 5,110,430 | 5/1992 | Eerkens | 204/157.2 |

Primary Examiner—Ngoclan Mai
Attorney, Agent, or Firm—George W. Finch

[57] ABSTRACT

Nozzle cooling and wall contact prevention control are included in a gaseous CRISLA apparatus, along with removable collectors, and the efficient use of one or more currently available high power lasers to produce a commercially economic isotope separation process. The wall contact prevention is accomplished with gaseous boundary layers, and a supersonic nozzle normally is used to cool and separate excitation bands of the isotopic material. Non-intermixing gaseous streams with different isotopic assays can be created in a single nozzle chamber and segmented collection chamber, which along with recirculation loops and compressors, allows a single laser system and a single nozzle system to be used to selectively excite the isotopic material while it makes multiple passes through the laser beams of the laser system until only a small fraction of the desired isotope remains to be separated. The process is especially effective in separating $^{235}UF_6$ from a gaseous mixture of $^{235}UF_6$ and $^{238}UF_6$.

57 Claims, 18 Drawing Sheets

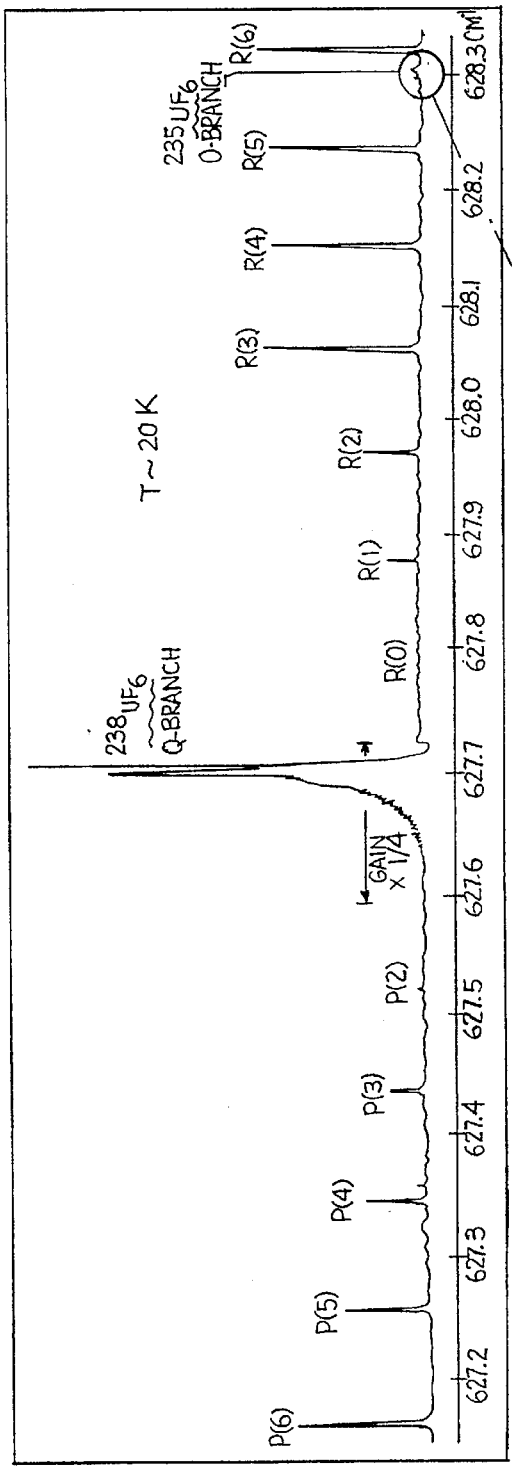
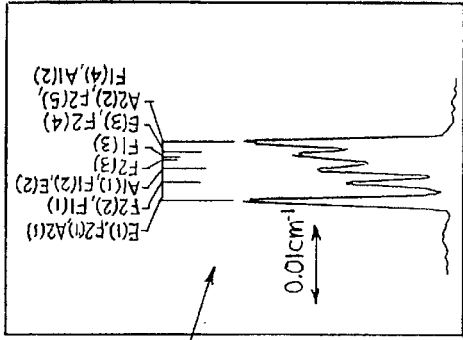
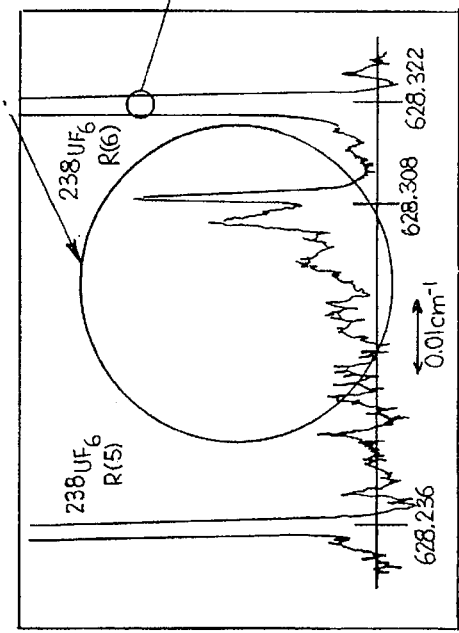
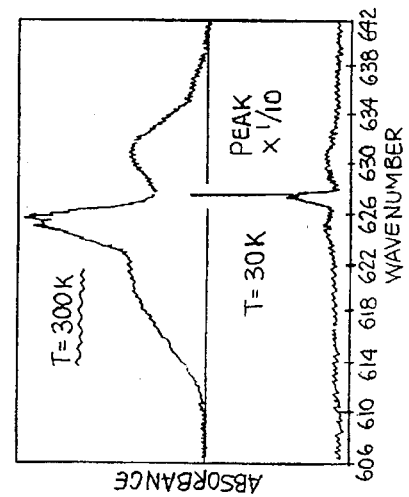
FIG. 7A
FIG. 7B
FIG. 7C
FIG. 7D
FIG. 7E

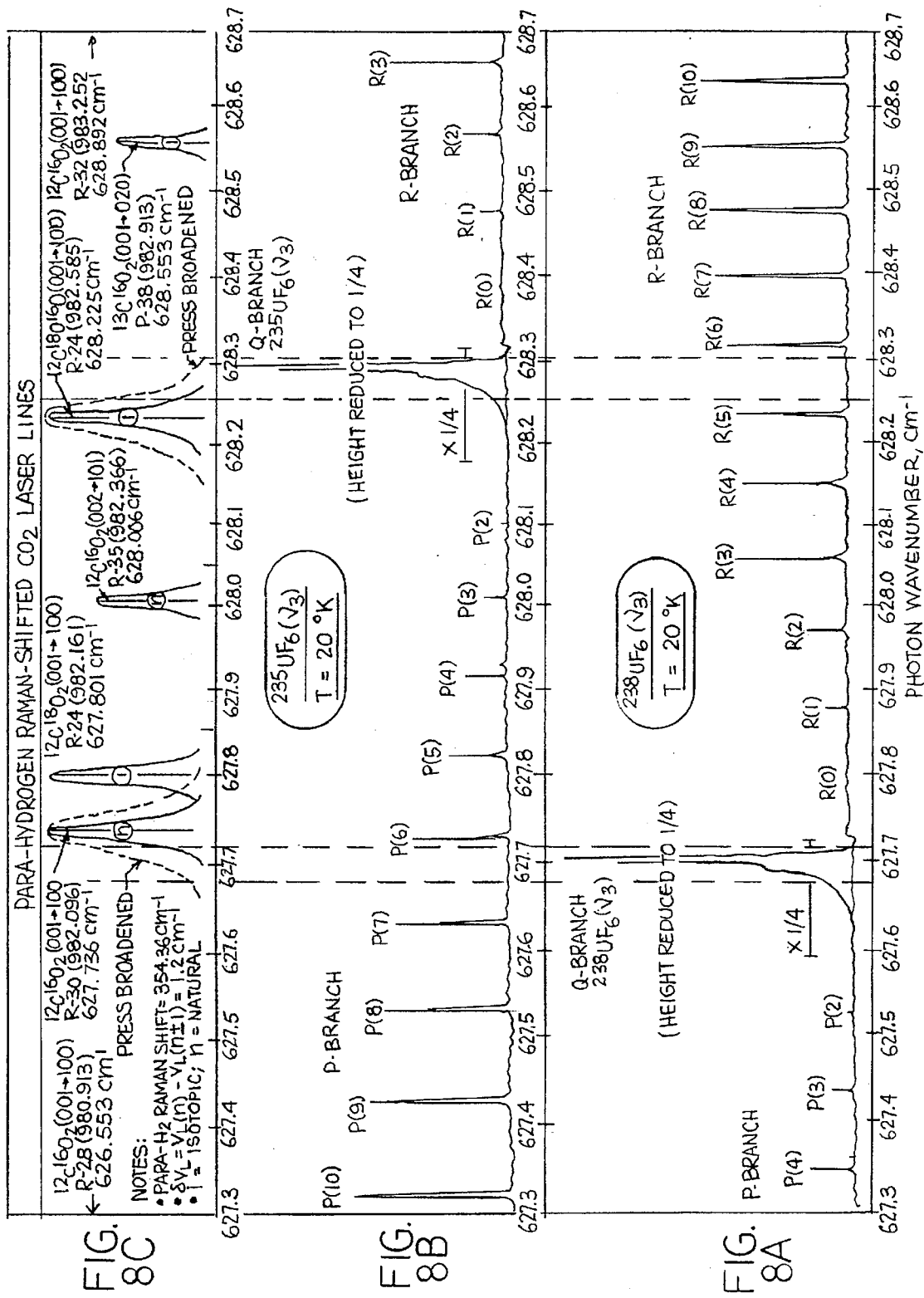

CRISLA PROCESS AND APPARATUS

FIELD OF TECHNOLOGY

This invention relates to separation of predetermined isotopes, especially the separation of the isotopes of uranium and molybdenum, using photons at one or more selected wavelengths to preferentially excite a predetermined-isotope-carrying molecule to a vibrational energy level where the excited predetermined-isotope-carrying molecule reacts chemically to become a new compound that can be separated from unreacted isotope carrying molecules.

BACKGROUND OF THE INVENTION

Before the availability of lasers capable of providing large numbers of photons at specific desirable frequencies and at high densities, gaseous diffusion or ultra-centrifugation (UCF) were the preferred processes for high volume isotope separation processes, with the enriching of uranium to reactor-grade concentrations being the highest volume process. These mass-action processes, which depend on the small mass differences between naturally occurring isotope-carrying molecules, are well developed and today are used to provide the enriched uranium for most operating nuclear power plants.

Quantum processes that use lasers are inherently more efficient and are expected to replace diffusion and UCF processes some time in the future. Three different approaches for the laser isotope separation of uranium, which show promise as the next preferred commercial separation process have emerged after two decades of intensive research beginning in 1970. These processes are known by the acronyms AVLIS for Atomic Vapor Laser Isotope Separation, MOLIS for Molecular Obliteration Laser Isotope Separation, and CRISLA for Chemical Reaction by Isotope Selective Laser Activation.

In the AVLIS process, uranium is vaporized by bombarding molten uranium with an electronic beam. $^{235}$U atoms in the vapors are preferentially excited and ionized in three steps by laser photons in the visible spectrum:

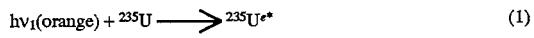   (1)

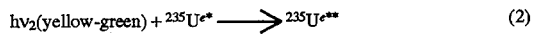   (2)

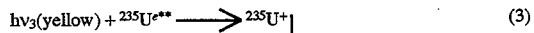   (3)

(Deflected by E-field onto collector)

Superscripts $^{e*}$ and $^{v*}$ indicate electronic and vibrational excitations respectively. One * designates a general or a single excitation, ** a double excitation, etc. The ionized uranium atoms, $^{235}$U$^+$, are passed through an electrostatic field which deflects them to collectors while the un-ionized depleted uranium flows on and condenses out for subsequent removal from the process. The AVLIS process requires expensive isotope handling and vaporizing equipment and therefor is not practical when small quantities of isotopes need to be separated, such as the separation of molybdenum.

In the MOLIS process, a nozzle-cooled flowing gas of UF$_6$ diluted with N$_2$, Ar, He, H$_2$, and/or CH$_4$, is dissociated to UF$_5$+F by exposure to photons at three different successive frequencies. The photons usually are generated by two fine-tuned far-infrared (16 µm) lasers and one ultraviolet laser. Instead of a UV laser, a high-intensity far-infrared laser can also be used for the final step. The lasers are tuned to preferentially excite and dissociate $^{235}$UF$_6$ but since the absorption bands of $^{235}$UF$_6$ and $^{238}$UF$_6$ at the required temperature and pressures somewhat overlap, some $^{238}$UF$_6$ is also undesirably disassociated. The consecutive process steps required to disassociate $^{235}$UF$_6$ can be written symbolically:

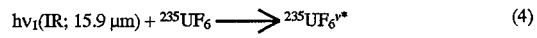   (4)

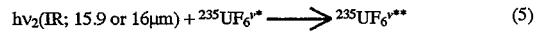   (5)

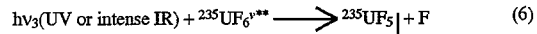   (6)

(Precipitated on impact plate)

Following dissociation by step (6), solid UF$_5$ out of a gaseous mixture of $^{238}$UF$_6$ and $^{235}$UF$_5$ is collected on an impact plate. Contact with the impact plate is assured by first passing the gaseous UF$_6$/UF$_5$ mixture through a plate perforated with holes that is positioned just upstream from the impact plate to force the gas to make a 90° turn. Solidified UF$_5$ piles form opposite the holes while gaseous UF$_6$ passes on.

Often a so-called "scavenger" gas like CH$_4$ is added to the flow to remove F radicals and to prevent the back-reaction UF$_5$+F→UF$_6$. With the current state of the laser art, the photon frequencies and intensities required for the MOLIS process can only be produced by pulsed lasers. Since the UF$_6$ to be excited moves across the laser beams, the pulse repetition rates of the pulsed lasers must be high enough so that most of the gas flowing by is laser-irradiated. Otherwise an insufficient fraction of the UF$_6$ will experience excitation, causing the MOLIS process to be inefficient. Also, because multiple lasers at different specific frequencies are required, MOLIS is not economic to use to separate small quantities of isotopes where the cost of equipment must be amortized, although for such purpose, MOLIS is much more economic than AVLIS.

In a uranium CRISLA process, gaseous $^{235}$UF$_6$, diluted with a carrier gas such as N$_2$, Ar, He, or H$_2$, is preferentially excited by irradiation with infrared photons. The reaction cell may be placed inside the cavity of a CO laser, which can then excite the 3v$_3$ vibration in UF$_6$ with its 5.3 µm photons in one step. Such a CO laser can be operated continuously. The UF$_6$ may also be step-wise excited to a multi-quantum level by 16 µm laser photons from a pulsed or CW laser. A gaseous coreactant RX is mixed with the UF$_6$ either before or after its laser irradiation. With suitable CRISLA coreactants RX, the reaction rate of laser-irradiated $^{235}$UF$_6$ is greatly enhanced over the thermal chemical reaction rate of $^{238}$UF$_6$. This rate enhancement is given by the factor $$\theta_L = \rho_a^{-1} \exp\left(\frac{h\nu_L}{kT}\right)$$

where $\rho_a$ is the statistical weight of molecular vibrations that promote the reaction, $h\nu_L$ is the laser photon energy, and kT is the thermal Boltzmann energy of the gas. For CO lasers with $h\nu_L$=1876.3 cm$^{-1}$, $$\theta_L = \rho_a^{-1} \exp\left(\frac{2700}{T}\right).$$

With typical values of $\rho_a$=56, $\theta_L$=140 at T=300° K, $\theta_L$=1.2×10$^6$ at T=200° K, and $\theta_L$=1×10$^{10}$ at T=100° K. Thus lower operating temperatures give higher laser-enhancement rates in CRISLA.

The basic process steps in uranium CRISLA are:

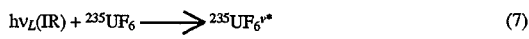

(7)

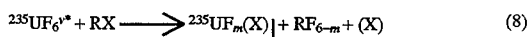

(8)

(Deposits on collector surfaces)

Even though the laser frequency $v_L$ is tuned to the peak absorption for $^{235}UF_6$, because of the partial overlap of the absorption bands of $^{235}UF_6$ and $^{238}UF_6$, some $^{238}UF_6$ is also undesirably excited. The enriched reaction product ($UF_4$, $UF_5$, or $UF_mX$) in (8) either has a lower vapor pressure than $UF_6$ so that it can be removed from the gas mixture by differential freezing, or it polymerizes or decomposes into a solid precipitate that can be removed by mechanical and/or chemical means.

In a molybdenum CRISLA process to separate radioactive $^{99}Mo$ from a mixture of $^{99}Mo$ and $^{98}Mo$, the molybdenum mixture is fluorinated and the resultant gaseous $^{99}MoF_6$, diluted with a carrier gas, is preferentially excited over the gaseous $^{98}MoF_6$ by irradiation with infrared photons that can be produced by a 9 μm $CO_2$ laser that selectively excites the $v_3+v_5$ vibration in $^{99}MoF_6$.

Typical CRISLA processes are described in U.S. Pat. Nos. 5,110,430; 5,108,566; 5,015,348; and 4,082,633, all by Jozef W. Eerkens, and U.S. Pat. No. 4,948,478 by Alexander Obermayer, which are incorporated herein by reference. The use of lasers to selectively excite a desired isotope is possible whenever the spectral absorption peaks of the isotope and/or compounds thereof to be separated occur at small frequency differences from the other isotopes in the mixture. These isotope frequency shifts are caused by the different masses of the isotopes that affect internal electronic and vibrational frequencies. For the purely electronic absorption lines of atomic U, there is not only an isotope shift of approximately 0.2 cm$^{-1}$, between $^{235}U$ and $^{238}U$, but also a nuclear-spin-induced splitting of the $^{235}U$ absorption into eight hyperfine lines spread out over approximately 0.15 cm$^{-1}$ while $^{238}U$, with an even number of nucleons, has only one absorption line. In the case of $UF_6$ molecules, the isotope shift between $^{235}UF_6$ and $^{238}UF_6$ is about 0.6 cm$^{-1}$ for the strongest stretching vibration $v_3$ (near 16 μm) and 1.8 cm$^{-1}$ for the tertiary $3v_3$ absorption (near 5.3 μm). Similarly, for $^{98}MoF_6$ and $^{99}MoF_6$, the isotope shift of both the $v_3$ and the $v_3+v_5$ band is approximately 1.0 cm$^{-1}$. At room temperature the $v_3$ and $3v_3$ absorption bands of $^{235}UF_6$ are spread over approximately 15 cm$^{-1}$ and to some extent overlap the absorption bands of $^{238}UF_6$. However at lower temperatures, the band spreads become narrower and the two isotopic bands become essentially separated below about 100° K. This spreading and overlapping of the bands occurs in most isotopic mixtures of medium to heavy molecules such as $QF_6$, if the atomic mass of Q exceeds about 50 amu.

For MOLIS and CRISLA processes that use gaseous $QF_6$, higher separation factors can be achieved if the $QF_6$ is cooled from 300° K to temperatures between 10° K and 100° K. Also for CRISLA, laser-induced reaction rates are considerably enhanced at lower temperatures over thermal rates. The $QF_6$ cooling can be accomplished by expansion through a supersonic nozzle before laser irradiation. Although $QF_6$ is normally a solid at very low temperatures, when $QF_6$ is diluted in a carrier gas and subjected to supersonic expansion, the $QF_6$ remains gaseous at 10° K<T<100° K for the ~0.1 milliseconds it takes to traverse the downstream section of a supersonic nozzle.

In the conventional uranium MOLIS process, the supercooled $UF_6$ flow is cross-irradiated by two pulsed 16 μm laser beams of moderate power and by a pulsed dissociation-producing UV or high-intensity IR laser beam. The three different laser pulses usually have 10 to 100 ns durations and follow each other within micro-second time intervals or partially overlap. The pulse repetition rate (prr) of the three companion pulses must be high enough so that the cross-flowing $UF_6$ is struck at least once as it flows by. If the transit time is $\tau_R$ the pulse rate must be at least $1/\tau_R$. Otherwise only a small fraction of the $^{235}UF_6$ that flows through the nozzle is excited and the $UF_6$ must be recycled through the nozzle many times. Dicke superradiance and other losses during $^{235}UF_6$ laser-pumping do not allow all the $^{235}UF_6$ to be excited in one pulse and make it necessary to further increase the minimum pulse rate of $1/\tau_R \approx 10,000$ Hz. The high prr requirements for 16 μm MOLIS lasers have pushed the limits of existing pulsed laser technology. With the present state-of-art, some ten or more 16 μm lasers would have to be multiplexed to get the desired result, unless enrichment is carried out in ten or more stages.

Ultimately, the most advantageous isotope separation system is that system that can produce a given amount of separation for the lowest overall cost. All the above processes work, but the CRISLA process appears most economic both for high volume separation of uranium and production of microgram quantities of radioisotopes for medical uses. The main reason is that the MOLIS process, which is the closest contender to the CRISLA process, requires expensive laser energy to supply all the separation energy, whereas in the CRISLA process, expensive laser energy is used only for the activation of an isotope-specific reaction. Most of the isotope separating energy in CRISLA is provided by inexpensive chemical energy so that when sufficient enrichment is not achieved in one pass, economics has allowed multiple serial CRISLA processes to be proposed. Also for CRISLA, only one laser (usually CO or $CO_2$) with one output frequency and a single-step isotope-selective excitation is usually sufficient. Additional multi-step booster excitations may be advantageous under some circumstances to provide adequate energies for overcoming subsequent chemical reaction barriers. In the MOLIS process, two or three different laser isotope-selective frequencies and at least two different pulsed lasers are required. In a single-step CRISLA process, a CO or $CO_2$ laser can be operated continuously, whereas multi-step MOLIS lasers need accurately timed pulses. The 16 μm MOLIS lasers must use Raman conversion cells filled with para-$H_2$ thereby adding one additional piece of optics-loaded hardware and an additional special gas. Also in the MOLIS process, all optical windows must be made from expensive ZnSe and RbCl to allow transmissions at 16 μm, whereas in a CRISLA process that uses 5.3 μm or 9 μm radiation, less expensive $CaF_2$ and KCl windows can be used. Dicke superradiance losses and high prr problems are also absent in a CRISLA process that uses single-step 5.3 μm or 9 μm excitations from a continuous CO or $CO_2$ laser.

In some cases it may be advantageous in CRISLA to employ isotope-selective pulsed 16 μm multi-step-excitation lasers similar to those used in the MOLIS process, in spite of the prr problems just mentioned. Even then, the CRISLA process is less expensive than MOLIS since laser excitation of the isotope is not carried out all the way to the dissociation limit and chemical energy is substituted for laser photo-dissociation energy. Of course CRISLA uses coreactant chemicals that are absent in the MOLIS process (MOLIS does use chemicals in the product removal phase). However, chemicals are relatively inexpensive and their consumption costs are less than those of laser photo-dissociation. Laser hardware and maintenance costs have a much larger effect on the unit enrichment cost than the cost of chemicals, and some of those can be recycled in the CRISLA process. This is clearly indicated in detailed cost analyses of uranium enrichment by the MOLIS and CRISLA processes that show CRISLA to be the most economic.

Although each of the three uranium laser enrichment processes (AVLIS, MOLIS, and CRISLA) appears conceptually straight-forward and reasonably simple to carry out, in practice all three have proven to be more complicated and costly to implement than was originally anticipated.

For AVLIS, after finding suitable high-power visible lasers and tunable frequencies, the main technical problem is the development of manageable processes and durable materials to handle molten Uranium and Uranium vapor. For MOLIS, the major technical problem is the development of new, efficient, reliable, pulsed lasers at the desired wavelengths (pulsed because CW lasers are not available at the desired wavelengths) and at sufficiently high pulse repetition rates (prr). To attain one-stage enrichment with 16 μm pulsed lasers for example one needs a prr of more than 60,000 Hz, whereas the most advanced units today can only provide 4000 Hz. This results in the requirement to multiplex ten or more 4000 Hz sets of pulsed 16 μm lasers (each set with two or three laser chains) to provide the necessary irradiation time coverage and $^{235}$U depletion for a one-stage process. For CRISLA the main problem is to find one or more suitable coreactants and to understand the chemistry.

In both MOLIS and CRISLA, another development problem has been the efficient separation of condensing enriched product $^eUF_5(X)$ from the depleted $^dUF_6$ gas stream and the product removal from collector surfaces. It was found that laser-produced enriched products such as $^eUF_5(X)$ can back-react on $UF_6$-covered surfaces by the reaction:

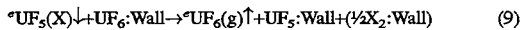

$$^eUF_5(X)\downarrow + UF_6{:}Wall \rightarrow {^eUF_6(g)}\uparrow + UF_5{:}Wall + (½X_2{:}Wall) \qquad (9)$$

When a mixed gas stream containing $UF_6$, $UF_5(X)$, RX, and carrier gas (e.g. $N_2$) flows past an untreated collector surface, $UF_6$ tends to be adsorbed on the surface in addition to the condensing $\{UF_5(X)\}_n$ (n=1, 2, 3, . . . for the condensing or polymerizing $UF_5(X)$). Since $UF_6$ is usually present in excess over $UF_5(X)$, reaction (9) can take hold quickly. Besides reaction (9), even if a passivated wall has no $UF_6$ adsorbed on it, the reverse of (9) can take place after several monolayers of solid $\{^eUF_5(X)\}_n$ have precipitated out on it:

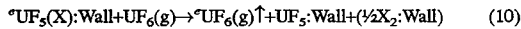

$$^eUF_5(X){:}Wall + UF_6(g) \rightarrow {^eUF_6(g)}\uparrow + UF_5{:}Wall + (½X_2{:}Wall) \qquad (10)$$

Both U-exchange reactions (9) and (10) undo the original laser-induced isotopic change that was achieved and are referred to as isotope "scrambling" reactions. To overcome the isotope scrambling reactions (9) and (10), there are several remedies. These special product harvesting techniques form part of the present invention and are described in detail in what follows.

BRIEF DESCRIPTION OF THE INVENTION

The present invention is an improved CRISLA process that uses: supersonic expansion cooling with controlled boundary layer supersonic flow in which (Isotopes)$F_6$ or other gaseous isotopic molecules are present mostly in the core region of the flow and are prevented from contacting any walls during supersonic expansion; controlled injection of feed with one or more contiguous flow streams of (Isotopes)$F_6$ (in carrier gas) possessing different isotopic assays, flowing side-by-side during supersonic expansion and laser irradiation; exposure of the (Isotopes)$F_6$ flow streams ($UF_6$, $MoF_6$, $SF_6$, $SeF_6$, $TeF_6$, $WF_6$, etc. in carrier gas) to intracavity infrared laser irradiation to selectively excite the (Isotope)$F_6$ to be separated to a higher vibrational state in one or several steps; reaction of the laser-excited isotopes with one or more coreactants RX which are admixed with the (Isotopes)$F_6$ before or after laser exposure or which are provided at collector surfaces to form (Uranium being used as an example) enriched $\{UF_m(X)\}_n$ product with $m \leq 5$ and $n \leq 1$; impingement of the Uranium-carrying gas flow on passivated $UF_6$-repelling collector surfaces in a collection zone downstream of the laser irradiation chamber; rapid removal of the enriched $\{UF_m(X)\}_n$ products from the collection zone after several monolayers have been deposited; product removal being accomplished either by on-off switching between $UF_6$ feed and fluorinating agent with corresponding switching between tails exhaust collection and product exhaust collection, or by means of a rotating collection wheel, which continuously moves passivated collector plates into and out of the collection zone, or by surface-passivated particles that are injected in the collection zone and recaptured downstream on screens; product recovery by pump-out after refluorination of surface-deposited enriched $\{UF_6(X)\}_n$ to gaseous enriched $UF_6$ in a region different from the collection zone in the case that a product collection wheel or particle injection is employed; continuous repassivation and reuse of collector plates or particles after product removal by additional exposure to strong fluorinating agents such as hot $F_2$, $XeF_2$, $IF_7$, $ClF_3$, $BrF_5$, or others, as needed.

Instead of the gaseous hexafluorides $^iQF_6$ (where $^iQ$ designates an isotope), other gaseous species such as $^iQ(CO)_s$, $^iQ(PF_3)_s$, and $^iQ(CH_3)_s$ with $1 \leq s \leq 6$, or $^iQO_pF_q$ with $2 \leq (p+q) \leq 7$ may be succesfully employed in CRISLA. For example, $^iMo(CO)_6$, $^iW(CO)_6$, $^iPd(PF_3)_4$, $Zn(CH_3)_2$ are gaseous molecules that can be used in CRISLA to separate the isotopes of Mo, W, Pd, and Zn.

Although subsonic flow and conventional cooling can be employed in the CRISLA process, supercooling the $UF_6$ (using uranium as an example) in a supersonic slit nozzle usually is preferred. For supersonic CRISLA, one or more coreactants RX may be mixed or contacted with the $UF_6$ and carrier gas in different ways. It may be done by gaseous admixing at either: (a) upstream of the nozzle throat; (b) in the nozzle just past the throat; or (c) downstream after laser irradiation and just before shocked transition to subsonic flow, downstream of which, the desired chemical separation reactions occur. Alternatively or in addition, laser-excited $^{235}UF_6^*$ may contact RX on: (d) surfaces of catalyst particles injected as a dust dispersed in carrier and/or reactant gas, downstream after laser irradiation like in (c); and/or (e) at porous, perforated, or overcoated active surfaces in the collector chamber on which excited $^{235}UF_6$ impinges and where coreactant RX is either transpired through the surfaces or present in an overcoat to induce excitation-enhanced surface-aided chemical conversion reactions. In case (d), the catalyst particles are soaked with $H_2$ and/or RX and may be granules of Ni, Pd, or other material (e.g., fullerenes (buckyballs), Teflon, carbon); or they may be Ni-, Pd-, or other material coated spheres of $Al_2O_3$, C, or other substrate. Typical catalyst particle sizes may range between 0.1 and 100 μm and may be in the form of microspheres, flakes, or other geometry. The transpiring coreactant RX in case (e) may serve not only as the primary reactant for $UF_6^*$ but also as a buffer gas which keeps unexcited $UF_6$ away from the surface (i.e. avoiding reactions (9) and (10)) while allowing heavier polymerizing $\{UF_m(X)\}_n$ product to penetrate to the collector surface as the gas stream weaves or zigzags its way between stacks of collector plates. To accomplish both of these tasks, two or more reactants or agents (e.g. RX and GY) may be used in case (e).

The collector plates that catch enriched $UF_m(X)$ reaction product can be in the form of "zigzag plates" in which the product-carrying gas mixture meanders between plates making 90° turns at certain intervals. Solid enriched product will then pile up in the corners of the zigzag plates since the heavier condensing polymerizing $\{UF_m(X)\}_n$ product can not follow the 90° bends as rapidly as the gaseous $UF_6$. Instead of sharp 90° (or other angle) zigzag plates, wavy riffle plates may be employed that collect polymerizing solid product in their troughs. Wavy plates offer less resistance to the gas flow but may not collect solids as efficiently as zigzag plates. In both cases, the product-collecting plates may be "passive" solid plates or they may be "active" hollow plates with internal plenums or passage-ways and porous or perforated surfaces through which reactants and/or other gaseous agents can pass.

Passive plates are passivated, that is their surfaces are covered with a fluoride layer minimizes $UF_6$ and minimizes $UF_6$ adsorption Onto the surface. Active plates can transmit gases such as $N_2$, $F_2$, $CH_4$, $SiH_4$, HCl, HBr, through their porous or perforated surfaces. The gases are pushed through the pores or perforations from the inner plenum inside an active collector plate using slight overpressures. A thin layer of buffer gas is thereby provided on the collector surface which, as mentioned, helps to minimize diffusion of gaseous unexcited $UF_6$ from the main flow stream to the surface thus minimizing reactions (9) and (10). On the other hand the buffer layer is thin enough to allow heavier condensing and polymerizing $\{^eUF_5(X)\}_n$ species to pass through it and reach the collector surface in the 90° bends or wavy turns which the gas stream experiences as it moves over the zigzag or wavy collector plates. Alternatively, in some CRISLA applications where gaseous coreactant RX is passed through the sufaces of active collectors and only $UF_6$+carrier gas is nozzle-expanded and laser-irradiated, laser-excited enriched $^eUF_6$*** reacts with RX in the interface between the buffer-layer and the main gas stream. After this, the heavy polymerizing products $\{^eUF_5(X)\}_n$ can penetrate to the surface and condense there as the main stream meanders by the plates. Like the passive plates, the surfaces of active plates are usually also passivated at the beginning of each collection cycle.

After passive or active plate surfaces have collected between one and a thousand (depending on scrambling conditions) monolayers of solid product, the plates are either moved out of the collection zone, or production of product is temporarily halted, and the enriched product is refluorinated to gaseous $^eUF_6$ by exposure to hot $F_2$, $ClF_3$, $XeF_2$, $IF_7$, $BrF_5$ or other suitable fluorinating gas. Simultaneously the plate surfaces are repassivated with a fluoride layer after and during the refluorination and regassification of the deposited product. Thus they can be subsequently recycled and re-used for product collection. The gaseous enriched product is cryo-pumped away and collected in a final product tank after separation from the admixed gaseous fluorinating agent in differential freezers.

In one product harvesting technique, a large collection wheel with stacks of circumferentially placed collector plates is used. In this case the process of product refluorination and removal, and the repassivation of plates takes place at other stations away from the collection zone (into which the nozzle and laser-irradiation chamber exhaust), as the wheel turns through 360°. Thus before re-entering the collection zone, the plates are cleaned of product and repassivated for reuse.

In another product-harvesting method, stream-injected particles (0.1–100 μm) are used instead of plates for product collection. The product-covered particles are then recaptured on a downstream screen placed in the exhaust from the collection zone. The screen rotates continuously through the exhaust end of the collection zone and after particle capture, moves out of the collection zone. The particles are then shaken or blown from the screen and subsequently exposed to gaseous fluorinating agents or liquid leachants to remove the enriched product from the particle surfaces. Following product removal, and repassivation of the particle surfaces with fluoride films, the particles can be reused and reinjected in the collection zone.

As stated above, Uranium CRISLA is usually performed with either a CW CO laser at 5.3 μm or with a set of 16 μm and/or 9 μm pulsed lasers. Should the intracavity CO laser power flux or the pulse repetition rate (prr) of the 16 μm pulsed $CO_2$ lasers fall short of what is needed to achieve sufficiently depleted (e.g., 0.2%) $UF_6$ tails in one pass through a supersonic nozzle, a higher degree of $^{235}U$ depletion can be achieved by using a number of adjacent $UF_6$ (+carrier gas) streams with different isotopic Uranium compositions (assays), which are injected into a common slit nozzle just upstream of the throat. That is, with $UF_6$, it is possible to cycle the $UF_6$ through two to twenty parallel stages using only one nozzle and one set of 16 μm multi-step-excitation lasers (e.g., with prr of ~4000 Hz) or one intracavity CO laser. For example, the slit-nozzled irradiation chamber might have a throat 100 cm wide (parallel to the laser beam), through which ten differently depleted $UF_6$ substreams or strips are flowing side-by-side, with a different strip every 10 cm. These strips can expand jointly and contiguously in the supersonic portion of the slit nozzle and laser irradiation chamber with minimal intermixing. This is because of the very slow lateral diffusion rate of $UF_6$ in a high-speed supersonic flow. After irradiation, the ten contiguous supersonic streams are intercepted by and returned to subsonic conditions in ten separate (partitioned) collection chambers where product is collected and out of which separate gaseous $UF_6$ tails fractions are pumped. The unreacted depleted $UF_6$ (+carrier gas) strips leaving the separate collection chambers are re-compressed and recycled as feed to adjacent separate strips at separate inlets just before the nozzle throat. The feed to each 10 cm wide strip is injected just upstream of the nozzle throat through a separate inlet duct in such a way that the $UF_6$ gas is swept away as core gas in each 10 cm strip with a small layer (~2 mm) of pure carrier gas surrounding it that forms a buffer between adjacent $UF_6$ stream strips and the walls. With careful aerodynamic designs, pressure recovery in each collection chamber can be optimized and the required power for recompression of tails gas between each stage held to a minimum.

For example, the first strip might have a feed assay of 0.7% $^{235}UF_6$ and tails gas with an assay of 0.616% $^{235}UF_6$ that is recycled to the second stream as feed. The second strip depletes the 0.616% $^{235}UF_6$ to 0.542% $^{235}UF_6$, etc., until ultimately the tenth strip yields a tails assay of approximately 0.2% $^{235}UF_6$ that is collected in a final depleted Uranium storage tank. When pressure recovery in the collector compartment of each substream is optimized, the power required for recompression and recycling of each stream's tails does not adversely impact the economics of the overall CRISLA process.

The technique of arranging parallel multiple-assay contiguous substreams, requires only one nozzle and one laser to simultaneously serve many enrichment stages. Such parallel staging is much less expensive than the serial staging employed in some other enrichment technologies including prior proposed CRISLA processes. The inter-stage re-compression of the tails gases of the isotopically differing substreams may be carried out with a plurality of conventional compressors in parallel or with a specially designed axial compressor in which little or no $UF_6$ intermixing between adjacent ($UF_6$+M) gas substreams occurs, similar to the situation in the supersonic nozzle flow. A suitable specially designed axial compressor is discussed in U.S. Pat. No. 4,113,448 to Haarhoff et al.

As mentioned, the harvesting of isotopically enriched $\{^eUF_m(X)\}_n$ or more generally $\{^jQF_m(X)\}_n$ product, via its condensation on particles or collector plates in the collection zone, runs into difficulties because of back-reactions (9) and (10). There are several approaches to solving this problem. One technique which can be used if only small quantities of isotopic species $\{^jQF_m(X)\}_n$ are to be separated, is to interrupt the feed flow of $QF_6$ (+ RX)+M (M=Carrier Gas) through the laser irradiation chamber and product collection zone every $\tau_c$ seconds and to replace it by a flow of fluorinating gas FL+M (FL=$F_2$, $ClF_3$, $IF_7$, $XeF_2$, $BrF_5$, etc) for a period of $\tau_F$ seconds. During the period of $\tau_c$ seconds, enriched product $\{^jQF_m(X)\}_n$ precipitates out on collector plates while depleted $QF_6$ is exhausted into and captured (cold-trapped) by the tails collection tank, while during the time $\tau_F$, precipitated $\{^jQF_m(X)\}_n$ is refluorinated to gaseous $^jQF_6$ and collected in the product tank. Thus the process alternates between a tails removal mode of period $\tau_c$ and a product clean-up mode with time $\tau_F$.

For example to separate 0.003% of reactor-produced $^{99}MoF_6$ from 99.997% $^{98}MoF_6$ by the CRISLA process using a supersonic 20 cm slit nozzle, one finds that the period $\tau_c$ is typically 10 seconds if 4 mg of $^{99}MoF_5(X)$ are deposited in three monolayers on particles or plates with a total surface area of 10,000 cm$^2$. Thus in this $^{99}Mo/^{98}Mo$ application, one could run the CRISLA process by intermittent switching between collections for $\tau_c$=10 seconds and clean-ups with (estimated) times of $\tau_F\approx 200$ seconds, to respectively remove tails and recover product. During the fluorination period $\tau_F$, it is necessary that not only all deposited product $\{^jQF_m(X)\}_n$ is reconverted to gaseous $^jQF_6$ and removed from the particle or plate surfaces, but also that the collector surfaces are repassivated and covered by a fluoride film which repels $QF_6$ and thereby minimizes reaction (9). For this reason and because refluorination to $QF_6$ is slow, the period $\tau_F$ is usually much longer than the collection time $\tau_C$.

If the above-described "on-off" harvesting technique is applied to the commercial enrichment of natural Uranium (0.7% $^{235}U$) to reactor-grade Uranium (~4% $^{235}U$), the period $\tau_C$ is found to be $\tau_C \approx 2\times 10^{-3}$ seconds, if not more than three monolayers are to be deposited on 10,000 cm$^2$ of surface and a 20 cm slit nozzle is used as before. It is possible to have millisecond feed periods and corresponding laser-irradiation times and alternate them with one-minute clean-up periods for example. However this would result in a very inefficient CRISLA process. Instead, a more effective harvesting technique in this case is to employ a product "collection wheel". In this method, a large number of collection plates are mounted on the outer periphery of a large wheel (similarly to a water wheel). The wheel turns on roller bearings inside a stationary housing at typical speeds between 0.1 and 10 rpm, with the plates passing through the collection zone adjacent to the CRISLA laser-irradiation chamber. This chamber is integrally mounted to the wheel housing. If the plates are mounted at a small angle relative to the exhaust flow stream, the impulse from the gas stream can turn the wheel in the same manner as a turbine wheel with blades. Alternatively the wheel can also be turned with an electric motor. The (stacks of wavy or zigzag) plates pass through the collection zone in fractions of a second during which they pick up twenty or more monolayers of precipitated product. After leaving the collection zone, the plates pass by two stations (attached to the wheel's housing), one of which flushes the space between plates with nitrogen and the second of which injects a strong fluorinator FL which travels with the wheel for a time $\tau_F$ as needed to gassify the deposited product to $QF_6$ and to repassivate (i.e. refluorinate) the plate surfaces. A third station then pumps out and stores the $QF_6$ product. The nitrogen flushing, FL injection, and $QF_6$ product pumpout may be repeated several times as the wheel turns through 360°, before the plates re-enter the collection zone and repeat the product collection and removal cycle.

Instead of using a collector wheel with plates, in still another product harvesting technique, passivated particles (0.1–100 μm) made of Ni, Pd, Cu, Li(H), Carbon, $Al_2O_3$, teflon, etc., are injected into the gas stream in the collection zone. The polymerizing enriched product species $\{^jQF_m(X)\}_n$ then precipitate out on the particle surfaces. The particles move through the collection zone loading up with product before they are captured on a revolving screen at the exhaust end. After the particle-covered screen moves out of the collection zone, the particles are shaken or blown off the screen and subsequently "cooked" in a fluorinating gas FL, which removes the product by conversion to gaseous $^jQF_6$ and which repassivates the particle surfaces so they can be recycled and reused. Alternatively the product may be removed by a liquid leachant before the particles are repassivated. The product $^jQF_6$ is cryo-pumped off and stored in the product tank in these operations.

In many CRISLA experiments, single 5.3 μm photons from a CO laser have been used successfully to excite $^{235}UF_6$ molecules to the $3v_3$ excitation level for subsequent accelerated chemical reactions. However other vibrational overtone or combination levels excitable with 16 μm and other powerful lasers in one or more excitation steps may be used as well. Generally, vibrational excitation below the dissociation limit is provided in CRISLA. What level of excitation is desirable is determined by an economic tradeoff between improvements in separation efficiency versus laser excitation and coreactant(s) costs. The chemical reaction enhancement of selectively excited $^{235}UF_6$ with a suitable admixed reagent RX, either in the gas, on catalyst dust, or admitted through an active collector surface, also figures prominently in choosing the degree of laser excitation.

To date, the only practical 16 μm lasers whose frequencies coincide with $^{235}UF_6$ absorption resonances are pulsed at 1000 to 4000 Hz with pulse durations of ~50 ns. This causes some special problems that have to be recognized and dealt with in selecting a suitable $UF_6$ 16 μm laser-excitation scheme for the CRISLA process. The ten nanoseconds (less than a collision-time) saturation and bleaching of $v_3$ vibrational excitations in $UF_6$, obtained with 50 ns 16 μm laser pulses, generates "Dicke superradiance" from $v_3 \rightarrow v_2$ and $v_3 \rightarrow v_5$ transitions, which can cause considerable losses. This problem is absent for the tertiary $3v_3$ one-photon excitations of $UF_6$ by 5.3 μm photons. However, the absorption cross-section by $UF_6$ at 5.3 μm is 20,000 times lower than at 16 μm, so that higher laser fluxes (with attendant losses) are needed. Because the photon absorption cross-section for tertiary $3v_3$ (5.3 µm) excitation is twenty thousand times smaller than that for the fundamental $v_3$ (16 µm) absorption, saturation can not occur for $3v_3$ excitations. The $3v_3$ population is built up slowly while a thousand or more de-phasing and rotation-changing (but not necessarily $v_3$ de-exciting) collisions and reactions of $UF_6(3v_3)$ molecules occur. Dicke superradiance requires in-phase dipole-aligned inverted populations of excited molecules. This is precisely what is produced during 16 µm pulsed excitations of $UF_6$, but it is absent for 5.3 µm excitations.

With the preferred supersonic nozzle cooling technique, typical nozzle transit times are ~0.1 ms, which is long enough to allow excited $UF_6$ to experience some ten-thousand collisions during laser cross-irradiation. During this time (~0.1 ms) any depletions of rotational or low-energy vibrational ($v_4$, $v_5$, $v_6$) states are rapidly replenished (~10 collisions). Thus for one-step excitations to $3v_3$ at 5.3 µm there is virtually no spectral "bleaching" or depletion of the lower level. Low laser fluxes at 16 µm might be used to avoid spectral bleaching of $1v_3$, but then the ability to pump enough once-excited $UF_6(1v_3)$ molecules to the $UF_6(2v_3)$ level is lost. That is, for efficient multi-step 16 µm excitations of $UF_6$, high laser fluxes are needed. This requirement in turn causes Dicke superradiance losses. Without the presence of super-radiance or other losses, in principle, 33% of resonant ground-state $^{235}UF_6$ can be pumped to the $2v_3$ level in two steps with high-flux 16 µm photons. However because of the Dicke superradiance "leakage" during pumping, only ~10% can be put into the $2v_3$ state.

The low $UF_6(3v_3)$ absorption cross-section for 5.3 µm photons has the disadvantage that a much higher laser photon flux is needed than what is needed in 16 µm excitations, if an adequate fraction of $^{235}UF_6$ is to be excited as it passes through the nozzle's irradiation chamber. One way to improve the situation with 5.3 µm excitations is to employ intracavity laser irradiation, rather than the usual extracavity laser illumination employed in other laser applications. That is, by placing two high-reflection laser mirrors (or a mirror and a grating) at the ends of the combined laser plasma tube and aligned intracavity reaction cell (IC), the IC experiences a circulating intracavity laser flux that is generally higher by a factor of ten over the flux available from an extracavity laser beam. Additional effective laser flux enhancement can be achieved by folding the laser beam through the IC many times with appropriately placed reflecting mirrors, like those used in White cells, Herriott cells, or other multi-pass cells. However because of mirror losses, more than ten passes usually give diminishing returns. The combination of intracavity irradiation and beam-folding can typically increase the effective laser flux a hundred-fold over conventional laser beam irradiations.

To avoid undesirable wall reactions, a boundary layer of inert gas or a mixture of inert gas and reactant gas preferably is introduced adjacent the nozzle walls in the present supercooled supersonic CRISLA process. This boundary layer flow keeps $UF_6$ from the walls where it could form undesirable deposits. When multi-assay multi-stream supercooled flow is employed, some inert gas usually is injected between the different contiguously flowing streams of $UF_6$+ inert gas. In the event a supersonic CO laser is employed, an inert gas stream can also be used to separate the CO lasing medium from the intracavity supersonic $UF_6$+carrier gas flow so that no solid interface is needed.

The present Uranium CRISLA process also can be performed with subsonic $UF_6$ flow rates cooled to −40° C. Below −40° C., the density of $UF_6$ vapor becomes impractically low. At −40° C., the peak value of the cross-section ratio $\sigma_5/\sigma_8$ for $UF_6(3v_3)$ excitation is approximately equal to 2. This is sufficiently high to cause substantial $^{235}U/^{238}U$ ratio changes in CRISLA product and tails (unreacted $UF_6$) for experimental research or pilot studies. However to enrich natural (0.7%) uranium to 3.5% reactor-grade material subsonically at T=−40° C. would require three or more serial stages. Since the processing speed of the subsonic scheme is inherently one thousand times slower than that of the supersonic nozzle method and serial staging would enhance the difference even more, the supersonic expansion technique (with a single stage or parallel stages) is generally preferred in commercial CRISLA operations. For example, to generate one million SWU (Separative Work Units) of enriched Uranium per year, only one supersonic CRISLA module is needed as opposed to the thousand subsonic CRISLA units needed to obtain the same result.

To overcome present laser prr or power limitations, both CRISLA and MOLIS processes can use the relatively inexpensive multi-assay contiguous stream technique, using one laser or set of lasers and one supersonic nozzle to enrich multiple parallel stages described above. Some additional recompression work by a compressor must be provided, but the added cost for this is much less than the cost of providing tens of lasers or laser systems and/or tens of nozzles. In the AVLIS process, multi-staging would be extremely expensive since solidified or liquid Uranium tails would have to be re-evaporated for every stage. Actually, multiple stages are not needed in AVLIS because sufficiently low tails assays can readily be obtained in one stage. The higher enrichment costs of AVLIS when compared to CRISLA and MOLIS are due to energy and materials handling costs and not due to staging constraints.

Therefore, it is an object of the present invention to provide an improved CRISLA process that uses a supersonic expansion nozzle in combination with flow stream control to provide an economic isotopic separation for large quantities of $^{235}U$, industrial isotopes like $^{98}Mo$, $^{92}Mo$, $^{184}W$, $^{66}Zn$, and small quantities of medical and research isotopes such as $^{99}Mo$ and $^{102}Pd$.

Another object of the present invention is to minimize or avoid isotope-scrambling back-reactions on collector surfaces, and to improve product harvesting in a CRISLA process by arranging for the continuous recycling and reconditioning of collector plate or particle surfaces via rapid movement of product-covered collectors from the collection zone to other regions where recovery of product by refluorination to gaseous $QF_6$ or by other means can be carried out, and where $QF_6$ product pump-off and storage as well as plate or particle repassivation for reuse can be achieved in a more efficient manner and in a more suitable period of time.

Another object is to provide a CRISLA process that can separate $^{235}U$ from $^{238}U$ much more economically than other available processes.

Another object is to provide a CRISLA process in which the primary chemical reaction can be promoted on the surface of catalyst particles or directly on collector plates.

Another object is to provide a CRISLA process that requires a minimum of capital expenditure to build a facility with which to perform the CRISLA process.

Another object is to provide a CRISLA process that can be performed with available hardware technology.

These and other objects and advantages of the present invention will become apparent to those skilled in the art after considering the following detailed specification together with the accompanying drawings wherein:

BRIEF DESCRIPTION OF THE DRAWINGS

FIGS. 7A and 7B are graphs of the relative absorbance versus wave number showing the enormous shrinkage of the $v_3$ band of gaseous $UF_6$ when super cooled from T=300° K to T=30° K where the peak in FIG. 7B is reduced to 10% of its actual height;

FIG. 7C is a graph of the relative absorbance versus wavenumber showing a spectral overview of the $UF_6$ ($v_3$) band for a mixture of 400 torr Ar and saturated vapor of $UF_6$ at room temperature in a jet stream at T=20K with the relative location (i.e., isotope shift) of the $^{235}UF_6$ and $^{238}UF_6$ Q-branches where the $^{238}UF_6$ Q-branch intensity is reduced by 25% compared to the P- and R- branch lines and the time constant was 0.3 sec.;

FIGS. 7D and 7E are expanded views of the graph of FIG. 7C showing the $^{235}UF_6$ Q-branch and fine structure splitting in $^{238}UF_6$ R(18), respectively;

FIG. 8 shows the low-temperature high-resolution $0 \rightarrow 1v_3$ absorption bands of $^{235}UF_6$ and $^{238}UF_6$ side-by-side with the (near-) coincident frequencies of several 16 µm laser photons, the 16 µm photons being from para-$H_2$-Raman-shifted $CO_2$ laser emissions produced by the $001 \rightarrow 020$ and $001 \rightarrow 100$ or $002 \rightarrow 101$ lasing bands of natural $CO_2$ and isotopic $C^{18}O^{16}O$, $C^{18}O_2$, and $^{13}CO_2$;

DETAILED DESCRIPTION OF THE SHOWN EMBODIMENTS

Figure 1:
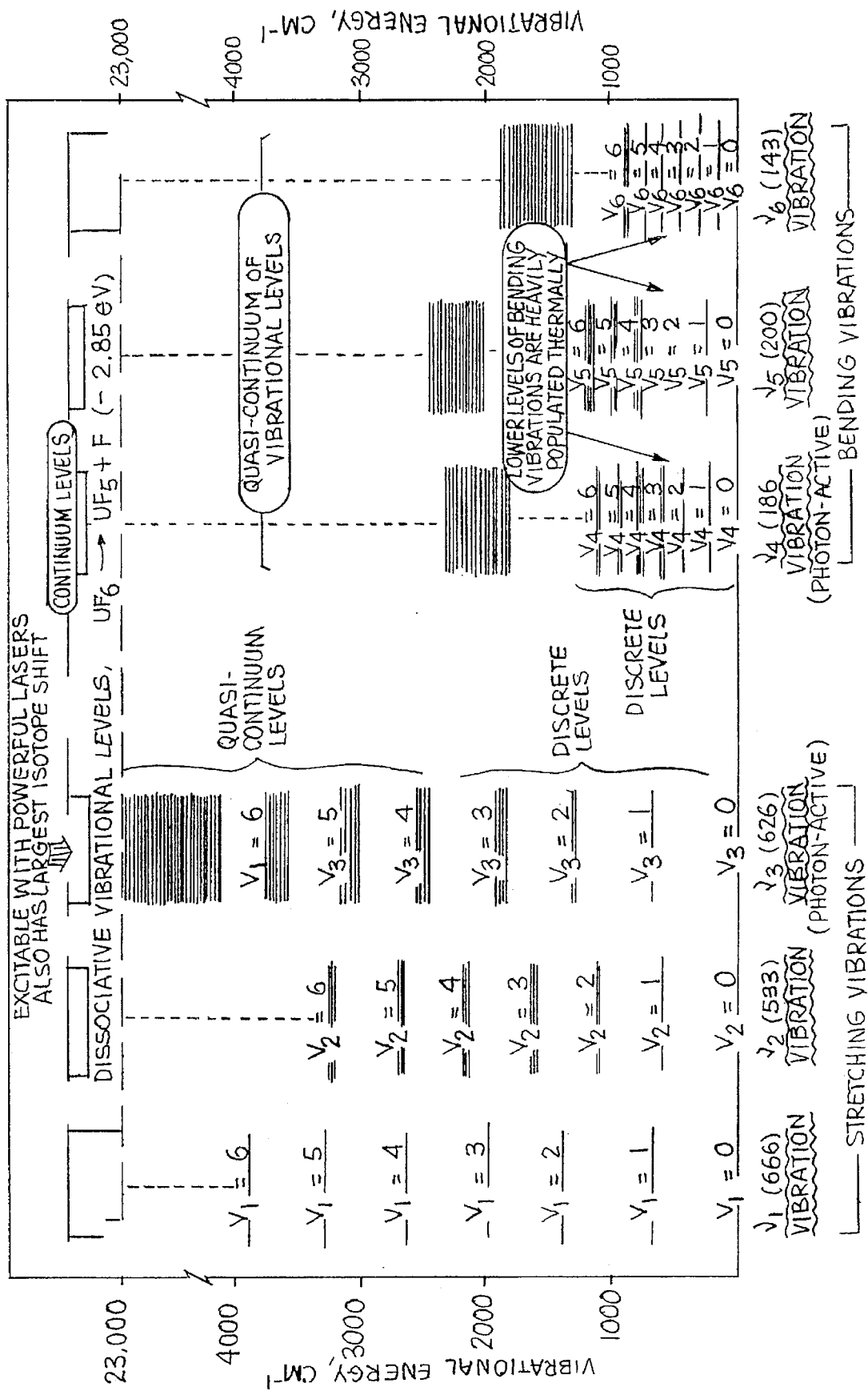
FIG. 1 illustrates the vibrational energy levels of the six normal vibrations of $UF_6$ and the relative quantum energies required for their excitation.

To fully appreciate the preferred embodiments of the CRISLA invention, it is instructive to briefly review the vibrational properties of the uranium hexafluoride ($UF_6$) molecule and the possible ways of exciting its vibrations with laser photons. As illustrated in FIG. 1, $UF_6$ possesses six fundamental vibrational modes, each one of which can be excited by one, two, three, or more discrete quanta of energy. Three of the six vibrations ($v_1$, $v_2$, $v_3$) are stretching modes whose energy quanta are relatively high ($\sim 600$ cm$^{-1}$), while three others ($v_4$, $v_5$, $v_6$) represent bending vibrations that can be excited with relatively low quanta of energy ($\sim 175$ cm$^{-1}$).

The molecular vibrations of gaseous molecules are generally excited and deexcited by thermal collisions and by photon absorptions and emissions. Because the quantum energies of the three bending vibrations are so low, most gaseous $UF_6$ molecules are found to be once, twice, or triply excited with the bending vibrations due to thermal collisions, even at temperatures down to 50° K.

Figure 2:
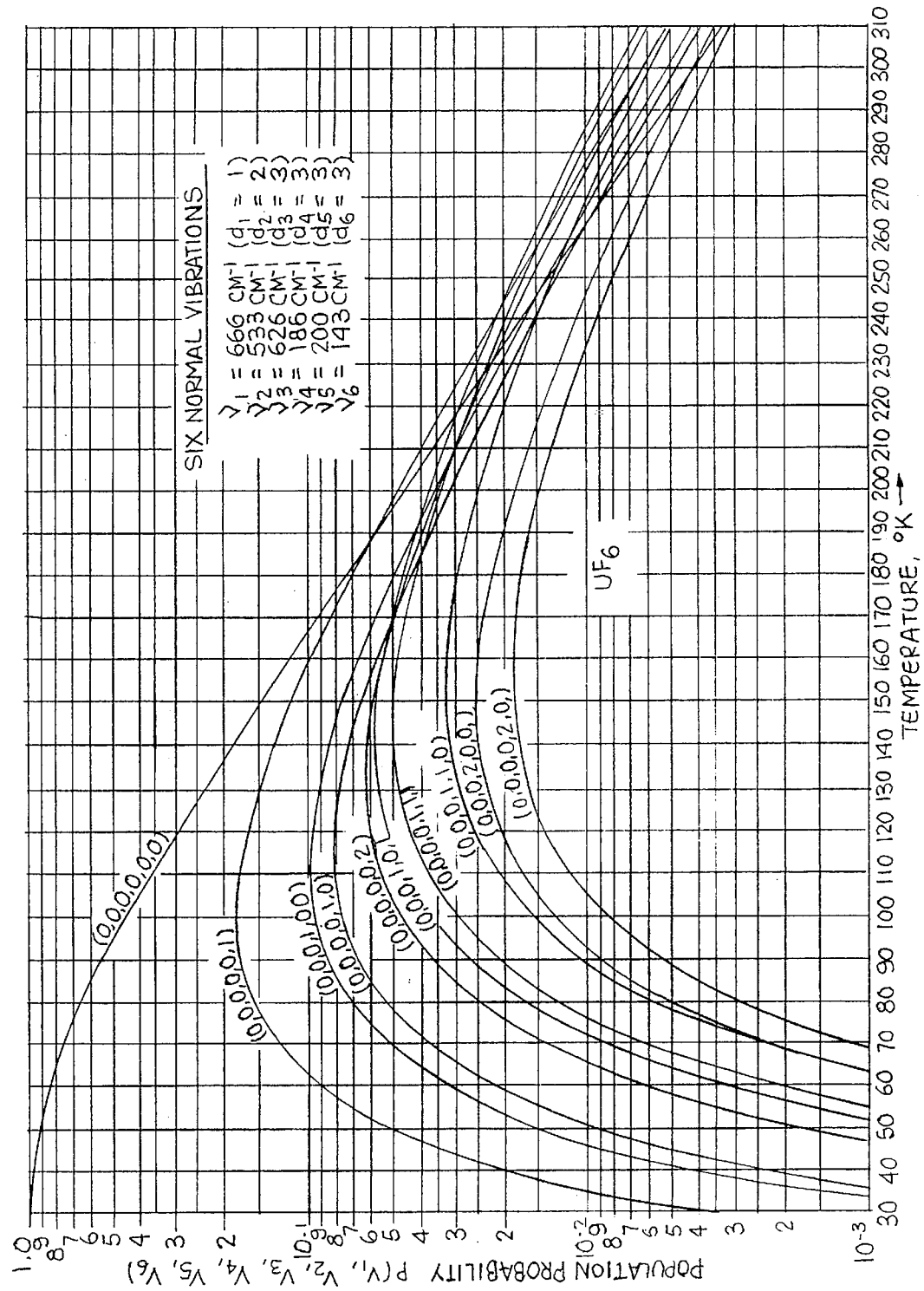
FIG. 2 shows the population probabilities of the ten lowest vibrational states of gaseous $UF_6$ as a function of temperature.

FIG. 2 shows the relative population probabilities of the ten lowest bending vibrational states of $UF_6$ as a function of temperature. The $UF_6$ bending vibrations are excited and de-excited every fifteen collisions or so (i.e. in microseconds) while the stretching vibrations generally live much longer. Thus an individual $UF_6$ molecule changes the status of its bending vibrations constantly and rapidly. However, on average, the populations of the bending vibrations at any instant of time are as given in FIG. 2.

TABLE I

UF$_6$ VIBRATIONAL ABSORPTION BANDS AT T = 300 K.[a]

| Vibrational Level | Wavenumber (Wavelength) at Peak of Absorption Band, cm$^{-1}$ (μm) | Isotope Shift, $\Delta v_{5/8}$ cm$^{-1}$ | Relative Peak Abs Strength[b] | Laser with Band-Overlapping Emissions |
|---|---|---|---|---|
| $2v_1 + v_3$ | 1955 ± 3 (5.12) | 0.60 | 0.006 | |
| $3v_3$ | 1870.5 ± 2 (5.35) | 1.81 | 0.02 | CO (5.3 μm; 1730–1950 cm$^{-1}$) |
| $v_1 + v_2 + v_3$ | 1821 ± 2 (5.49) | 0.60 | 0.02 | |
| $2v_2 + v_3$ | 1687 ± 2 (5.93) | 0.60 | 0.05 | |
| $2v_1 + v_4$ | 1519 ± 2 (6.58) | 0.16 | 0.007 | |
| $v_1 + v_3 + v_5$ | 1486 ± 2 (6.72) | 0.60 | 0.015 | |
| $2v_3 + v_4$ | 1434 ± 2 (6.97) | 1.21 | 0.01 | |
| $2v_3 + v_6$ | 1386 ± 2 (7.22) | 1.21 | 0.01 | |
| $v_1 + v_2 + v_4$ | 1386 ± 2 (7.22) | 0.16 | 0.01 | |
| $v_1 + v_2 + v_6$ | 1341/1335 (7.46/7.49) | — | 0.05 | |
| $v_1 + v_3$ | 1290.9 ± .5 (7.75) | 0.60 | 4.1 | |
| $2v_2 + v_6$ | 1211 ± 2 (8.26) | — | 0.004 | |
| $v_2 + v_3$ | 1156.9 ± .5 (8.64) | 0.60 | 4.7 | Co-Pumped$^{13}$COS (8.6 μm/1160 cm$^{-1}$) |
| $2v_3 - v_6$ | 1106 ± 3 (9.04) | 1.21 | 0.01 | |
| $v_1 + v_4 + v_5$ | 1054 ± 3 (9.49) | 0.16 | 0.004 | CO$^2$ (9 μm; 1000–1093 cm$^{-1}$) |
| $v_1 + v_2 - v_6$ | 1054 ± 3 (9.49) | — | 0.004 | |
| $v_3 + 2v_5$[c] | 1021 ± 1 (9.79) | 0.60 | 0.003 | CO$_2$ (9 μm; 1000–1093 cm$^{-1}$) |
| $v_1 + v_2 - v_4$[c] | 1012 ± 1 (9.88) | −0.16 | 0.005 | |
| $v_1 + v_5 + v_6$[c] | 1006 ± 1 (9.94) | — | 0.005 | |
| $v_3 + 2v_4$ | 997 ± 1 (10.03) | 0.82 | 0.005 | |
| $v_2 + v_3 - v_5$[c] | 956 ± 1 (10.46) | 0.60 | 0.008 | CO$_2$ (10 μm; 892–996 cm$^{-1}$) |
| $2v_2 - v_6$ | 921 ± 2 (10.86) | — | 0.01 | |
| $v_2 + v_4 + v_5$[c] | 915 ± 2 (10.93) | 0.16 | 0.005 | |
| $v_3 + 2v_6$ | 905 ± 2 (11.05) | 0.60 | 0.02 | $^{13}$CO$_2$ (11 μm; 870–943 cm$^{-1}$) |
| $2v_2 - v_4$ | 875 ± 1 (11.43) | −0.16 | 0.007 | |
| $v_1 + v_4$ | 852.8 ± .5 (11.73) | 0.16 | 0.70 | |
| $v_3 + v_5$ | 827/821 (12.09/12.18) | 0.60 | 1.9 | CO$_2$ (9 μm)-Pumped NH$_3$ (12 μm) |
| $v_1 + v_3 - v_2$ | 757.6 ± .5 (13.20) | 0.60 | 0.05 | |
| $v_2 + v_4$ | 719.1 ± .5 (13.91) | 0.16 | 0.70 | |
| $v_2 + v_6$ | 677.5/670 (14.76/14.93) | — | 8.9 | |
| $v_3$[d] | 625.5 ± .5 (15.99) | 0.60 | 500 | CO$_2$/C$^{18}$O$^{16}$O(10 μm) + p-H$_2$ Raman-shift (16 μm); CO$_2$(020→010; 16 μm); CO- or CO$_2$-Pumped CF$_4$ (16 μm). |
| $v_4 + 2v_5$ | 585 ± 5 (17.09) | 0.16 | 0.40 | |
| $3v_4$ | 546 ± 2 (18.32) | 0.48 | 0.14 | |
| $2v_4 + v_6$ | 519.5 ± 2 (19.25) | 0.32 | 0.08 | |
| $v_1 - v_4$ | 480.8 ± 1 (20.80) | −0.16 | 0.11 | |
| $2v_2 - v_3$ | 440.5 ± 1 (22.70) | −0.60 | 0.01 | |

TABLE I-continued

UF$_6$ VIBRATIONAL ABSORPTION BANDS AT T = 300 K.[a]

| Vibrational Level | Wavenumber (Wavelength) at Peak of Absorption Band, cm$^{-1}$ (μm) | Isotope Shift, Δν$_{5/8}$ cm$^{-1}$ | Relative Peak Abs Strength[b] | Laser with Band-Overlapping Emissions |
|---|---|---|---|---|
| 3ν$_6$ | 419 ± 2 (23.87) | — | 0.003 | |
| ν$_2$ − ν$_6$ | 389.8 ± 1 (25.65) | — | 1.1 | |
| ν$_2$ − ν$_4$ | 347.3 ± 1 (28.79) | 0.16 | 0.43 | |
| ν$_5$ + ν$_6$ | 337 ± 2 (29.67) | — | 0.09 | |
| ν$_4$ | 186.2 ± .5 (53.71) | 0.16 | 100 | |

[a] After McDowell, Asprey, and Payne, J. Chem. Phys. 61, 9, 3571 (1974).
[b] To obtain peak absoprtion cross-sections in cm$^2$, multiply these values by $5 \times 10^{-21}$.
[c] FTIR Measurements by J. W. Eerkens, Isotope Technologies Internal Report, Nov 14, 1988.
[d] The ν$_3$ Q-branch origin for ground-state $^{235}$UF$_6$ is at 628.302 ± 0.010 cm$^{-1}$ and for $^{238}$UF$_6$ at 627.695 ± 0.010 cm$^{-1}$ (Takami, e.a., Jap. J. of Appl. Phys. 23, 2, L88 (1984)).

Table I shows the observed infrared-active one-, two-, and three-level vibrational transitions in UF$_6$ reported by McDowell, e.a., in J. Chem. Phys. 61, 9, 3571 (1974), supplemented with data from Takami, e.a., Jap. J. Appl. Phys. 23, 2, L88 (1984) and from Eerkens, e.a., (1988). Table I also lists some lasers that can excite these transitions with one laser photon.

In selecting suitable transitions and matching lasers to obtain Uranium enrichment with the CRISLA process, it is important to assure that there is an adequate isotope shift between $^{235}$UF$_6$ and $^{238}$UF$_6$, so that $^{235}$UF$_6$ can be preferentially excited (see the third column in Table I). Only the ν$_3$ and ν$_4$ vibrations of UF$_6$ have isotope shifts of 0.60 and 0.18 cm$^{-1}$ respectively. The other vibrations in UF$_6$, that is ν$_1$, ν$_2$, ν$_5$, ν$_6$, are symmetric and have no isotope shifts. Also only ν$_3$ and ν$_4$ (and sometimes ν$_6$ in combinations) are photon-active, while the other vibrations are not, unless they are in a combination band with ν$_3$ or ν$_4$. For an isotope-selective photon absorption, it is therefore necessary that ν$_3$ and/or ν$_4$ are at least once (ν$_3 \geq 1$; ν$_4 \geq 1$) excited in the transition. The optical selection rules further restrict the vibrational transitions that are possible in UF$_6$. For example, 2ν$_3$ and 2ν$_4$ excitations by single photons are forbidden and these levels can only be populated in two steps with two consecutive photons or by collisions. Only 1ν$_3$, 3ν$_3$, 5ν$_3$, . . . , and 1ν$_4$, 3ν$_4$, 5ν$_4$, . . . can be excited by one photon. However, the absorption strengths decrease by a factor of about 20,000 for each successively higher allowed vibrational excitation in these series.

Efficient "workhorse" infrared lasers with sufficiently high powers to pump UF$_6$ levels suitable for isotope separation are mainly the CO$_2$ laser (9.6 and 10.6 μm, or 900–1100 cm$^{-1}$) and the CO laser (5.3 μm, or 1860–1880 cm$^{-1}$). The outputs from these lasers have been applied in CRISLA processes either directly, using their natural emission wavelengths around 9.6, 10.6, and 5.3 μm, or, for the CO$_2$ laser, the natural lasing emission lines are shifted by para-H$_2$- or NH$_3$-filled Raman cells to the 16 μm and 12 μm regions respectively. Unfortunately the more powerful natural emissions from the CO$_2$ and CO lasers match only the weakly absorbing (ν$_1$+ν$_4$+ν$_5$), (ν$_2$+ν$_3$−ν$_5$), (ν$_3$+2ν$_5$) and 3ν$_3$ tertiary bands of UF$_6$ (see column 4 of Table I). Hence the 9 and 10 μm photons from the CO$_2$ laser have been Raman-shifted or Raman-converted to 16 and 12 μm photons that can excite the strong fundamental ν$_3$ and medium-strong binary (ν$_3$+ν$_5$) bands of UF$_6$.

Figure 3:
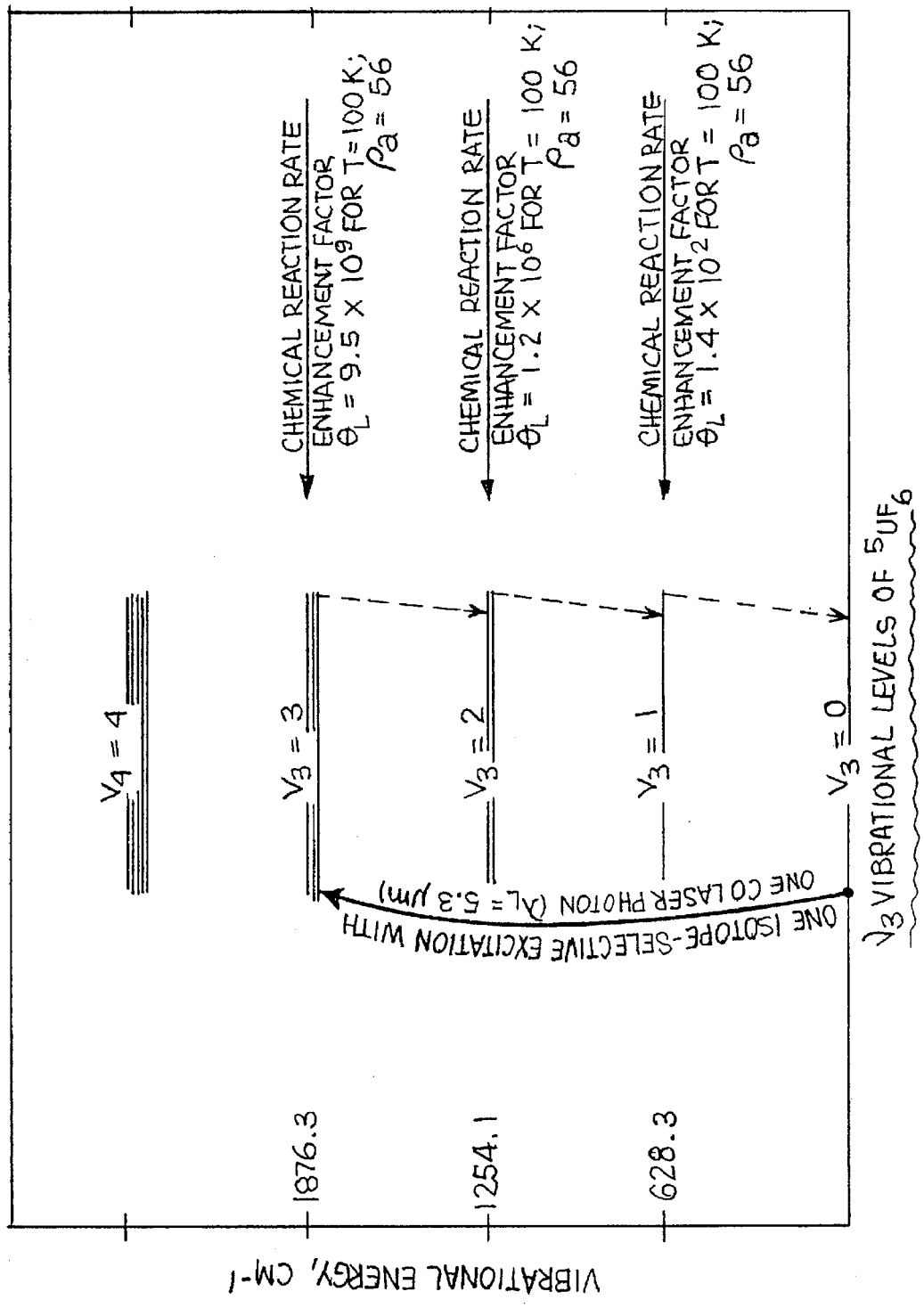
FIG. 3 illustrates the one-step isotope-selective $3v_3$ excitation of $^{235}UF_6$ with 5.3 µm CO laser photons and also lists the enhancement factors of chemical reaction rates for $1v_3$, $2v_3$, and $3v_3$ excited $UF_6$ at T=100° K.
Figure 4:
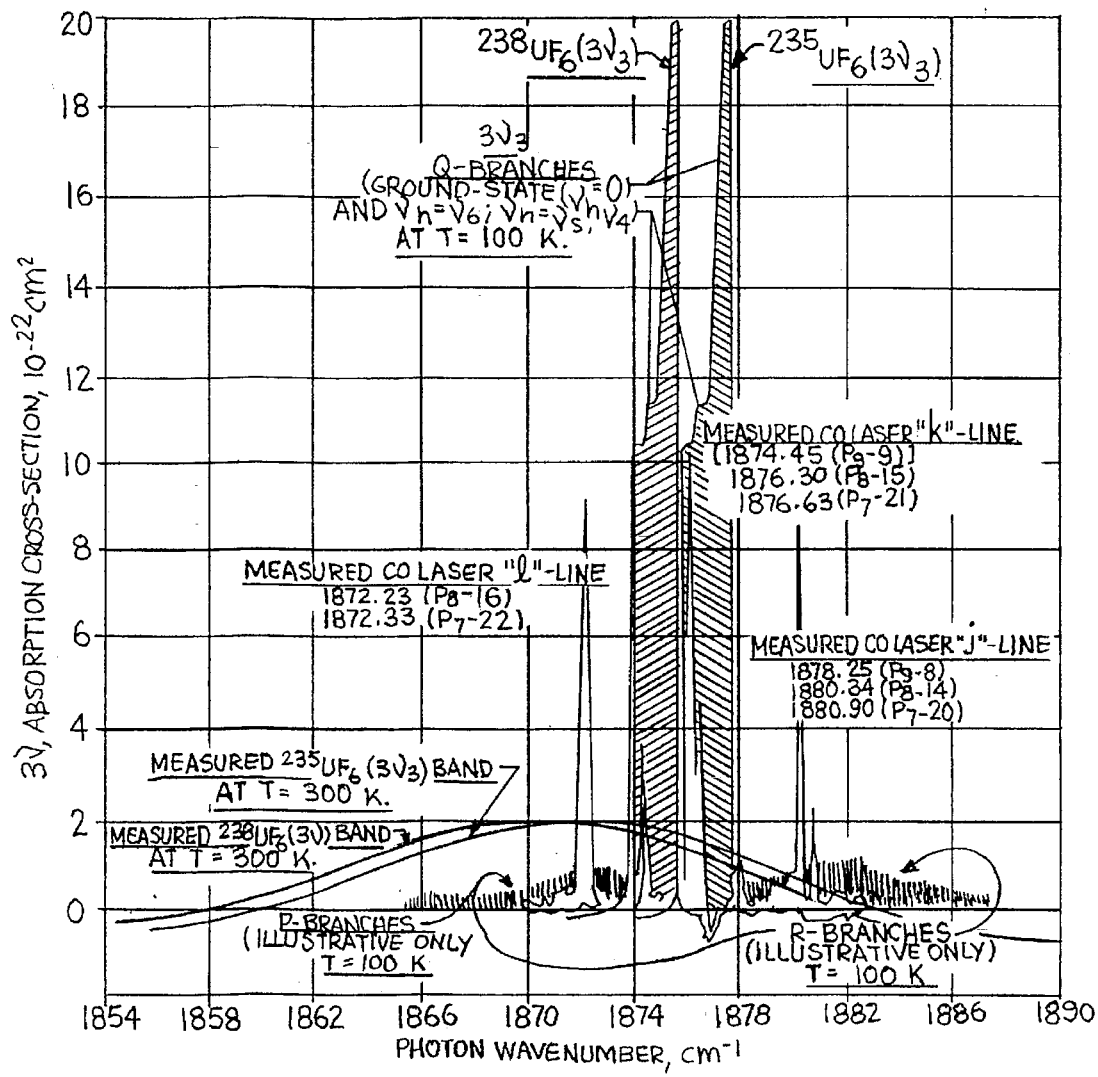
FIG. 4 illustrates the enormous narrowing of the $3v_3$ absorption bands of $^{235}UF_6$ and $^{238}UF_6$ when the temperature drops from 300° K to 100° K in a supersonic expansion and also shows the coincidence of several CO laser lines with the low-temperature absorption bands of $UF_6$.
Figure 5:
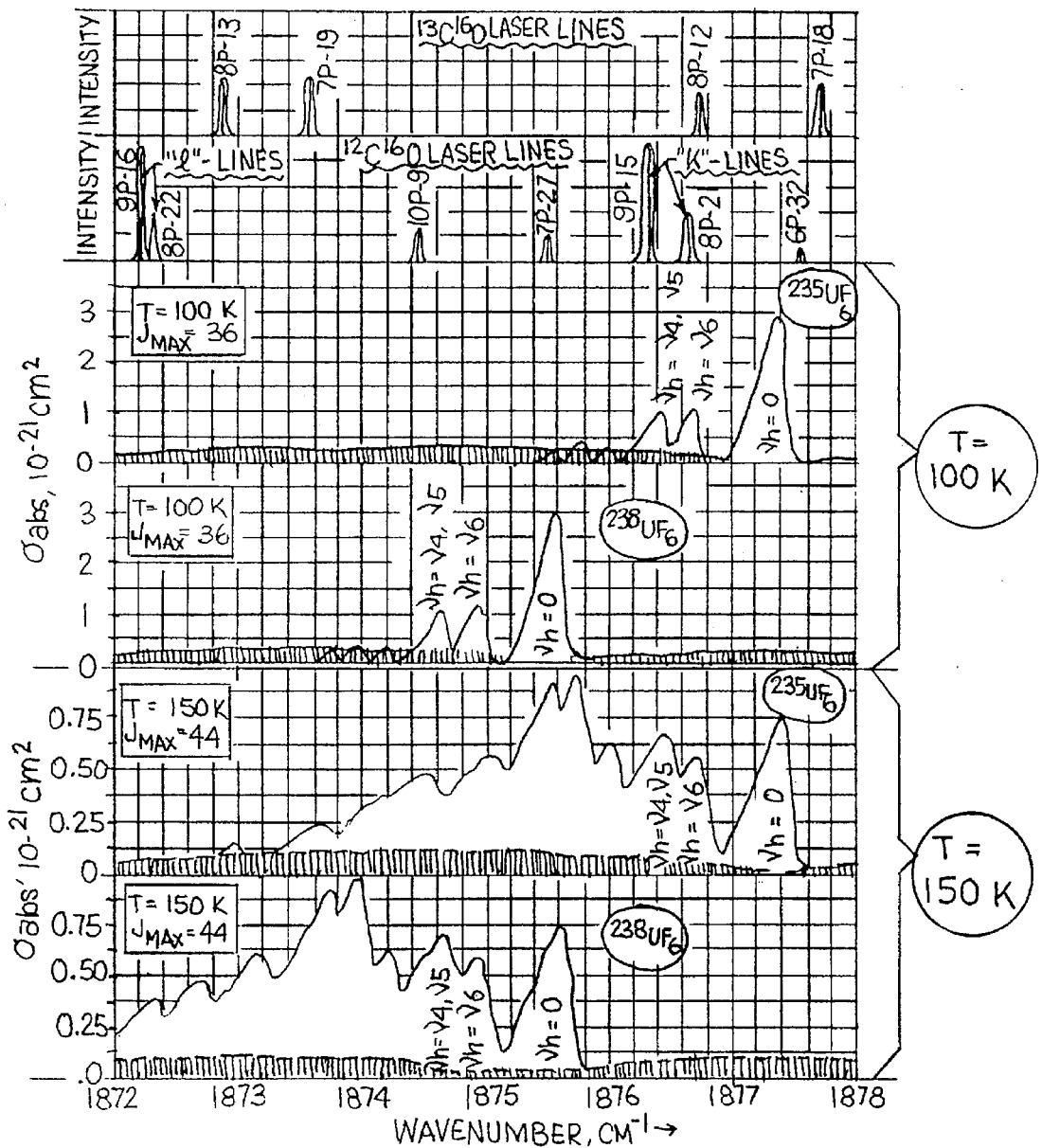
FIG. 5 shows the high-resolution $3v_3$ absorption bands of $^{235}UF_6$ and $^{238}UF_6$ at T=100° K and T=150° K and the coincidence of the CO laser lines at 1876.3 cm$^{-1}$ and 1876.6 cm$^{-1}$ with the $^{235}UF_6$ Q-branches of the $v_h=v_4$, $v_5$ and $v_6$ hot-bands of the $(0+v_h) \rightarrow (3v_3+v_h)$ transition.

Although the 3ν$_3$ tertiary absorption in UF$_6$ is weak, a continuous CO laser can excite this vibration in one step as shown in FIG. 3, and thereby provide enough energy to a UF$_6$ molecule to enhance its chemical reaction rate with a coreactant RX a hundred-fold or more. As shown in FIGS. 4 and 5, there is also a very fortunate match between the CO laser's strong lasing lines at 1876.3 cm$^{-1}$ and at 1876.6 cm$^{-1}$ and the Q-branches of the (ν$_b$)→(ν$_b$+3ν$_3$) hot-band transitions in $^{235}$UF$_6$, where b=4, 5, or 6. As was shown in FIG. 2, the thermally excited ν$_b$ bending vibrations in UF$_6$ are present in a large fraction of the UF$_6$ population. Even at 100° K, 34% of all UF$_6$ have one of its ν$_b$ vibrations once excited. Finally, the 3ν$_3$ bands of $^{235}$UF$_6$ and $^{238}$UF$_6$ have a very large isotope-shift (the largest in table I). When UF$_6$ is supercooled to 100°–150° K, these bands become essentially separated, while the peak absorption cross-section increases ten to thirty fold, as shown in FIGS. 4 and 5. Excellent isotope-selective excitation of $^{235}$UF$_6$ by the CO laser's 1876.3 and 1876.6 cm$^{-1}$ lines is therefore possible at T~100° K.

By suppression of lasing in the 900–1100 cm$^{-1}$ region, the CO$_2$ laser can also be operated directly, but less strongly, on its 2ν$_2$→1ν$_2$ (or 020→010) transition that emits a series of laser lines in the 575–641 cm$^{-1}$ range (i.e., 16 μm region). Another direct 16 μm emitting laser useful for UF$_6$ isotope separation might be the chemical BrF laser. In some tests with F+Br$_2$→BrF*+Br reactions, brief bursts of 16 μm lasing emissions have been observed. However it has been found so far that all strong emission lines from CO$_2$ (020→010) and other direct 16 μm lasers miss the required value of ν$_3$=628.27±0.04 cm$^{-1}$ of the Q-branch of $^{235}$UF$_6$. The frequencies of lasing lines in the CO$_2$ and BrF lasers for example are spaced 1.5 cm$^{-1}$ (CO$_2$) and 0.7 cm$^{-1}$ (BrF) apart and the closest line is a (calculated) emission at 628.36 cm$^{-1}$ from the v=6→5 (R-19) transition in $^{81}$BrF.

The CO$_2$ and CO lasers have also been used as pump lasers to excite other lasable molecules with desirable output frequencies near UF$_6$ absorption resonances (e.g., CO$_2$-pumped CF$_4$ with 16 μm emissions). So far none of these conversions have yielded lasing lines that were sufficiently close or coincident with the strong high-resolution absorption resonances of supercooled $^{235}$UF$_6$.

The output frequencies from CO$_2$ and CO lasers can be shifted some 30 cm$^{-1}$ by using isotopic substitutions $^{14}$C or $^{13}$C for $^{12}$C, and $^{17}$O or $^{18}$O for $^{16}$O. This can bring some direct or Raman-shifted laser lines into accidental coincidence with the 628.23–628.30 cm$^{-1}$ absorption of $^{235}$UF$_6$ (Q-origin is at 628.302 cm$^{-1}$). So far, the only useful near-coincident laser emission in this interval has been obtained from the pulsed pH$_2$-Raman-shifted R-24 line of the 001→100 laser transition in $C^{18}O^{16}O$ centered at 628.23 $cm^{-1}$. This laser line can be pressure broadened and/or microwave shifted to give a better overlap with the 628.23–628.30 $cm^{-1}$ Q-branch absorption of $^{235}UF_6$.

Figure 6:
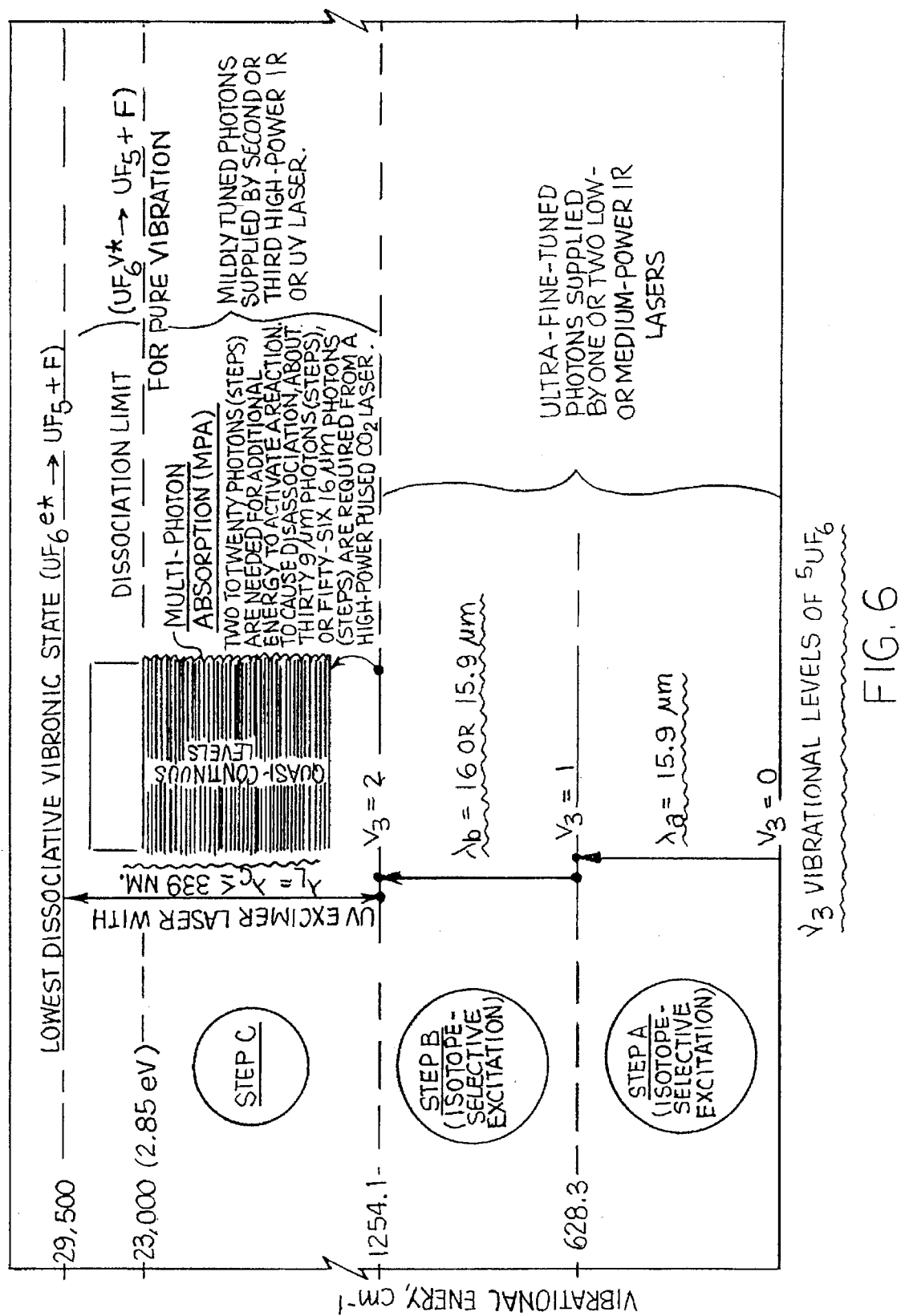
FIG. 6 illustrates two-step isotope-selective excitation of $^{235}UF_6$ to $1v_3$ and $2v_3$, and single-photon or multi-IR-photon-absorption (MPA) steps to higher vibrational levels for the energization of $^{235}UF_6$ to either induce an enhanced chemical reaction or to cause its dissociation.

Besides the direct one photon pump-up of the higher vibrational levels in $UF_6$, these levels also can be populated by sequential absorption of two, three, or more laser photons. As illustrated in FIG. 6, $UF_6$ can be excited to $v_3$ in two steps from $0\to 1v_3$ and $1v_3 2v_3$ with suitably tuned 16 μm lasers. To avoid overlap of the $^{235}UF_6(v_3)$ and $^{238}UF_6(v_3)$ bands and to achieve efficient isotope-selective excitations, the $UF_6$ must be supercooled in a supersonic adiabatic expansion. FIGS. 7A and 7B show the enormous shrinkage of the $v_3$ absorption band of $UF_6$ when this gas is supercooled from 300° K to 30° K. FIGS. 7C–7E show the totally resolved $UF_6(v_3)$ spectrum at T=20° K and the clearly separated Q-branches of $^{235}UF_6(v_3)$ and $^{238}UF_6(v_3)$ as measured by Takami, e.a., Jap. J. Appl. Phys. 23, 2, L88 (1984). Because the $v_3$ vibrations can be activated along any one of three different F-U-F axes in $UF_6$, all higher $nv_3$ vibrational levels are subdivided into a number of sublevels, some of which are lower and some slightly higher than the average $nv_3$ energy level. For example, while the photon frequency required for pumping $^{235}UF_6$ from the ground level ($v_3=0$) to $1v_3$ ($v_3=1$) equals 628.30 $cm^{-1}$, photons with frequencies of approximately 625.74, 625.95, or 628.32 $cm^{-1}$ are required to pump $^{235}UF_6$ from the single $1v_3$ level (of symmetry species $F_1$) to the three possible sublevels of $2v_3$ (of species E, $A_1$, and $F_2$).

Figure 9:
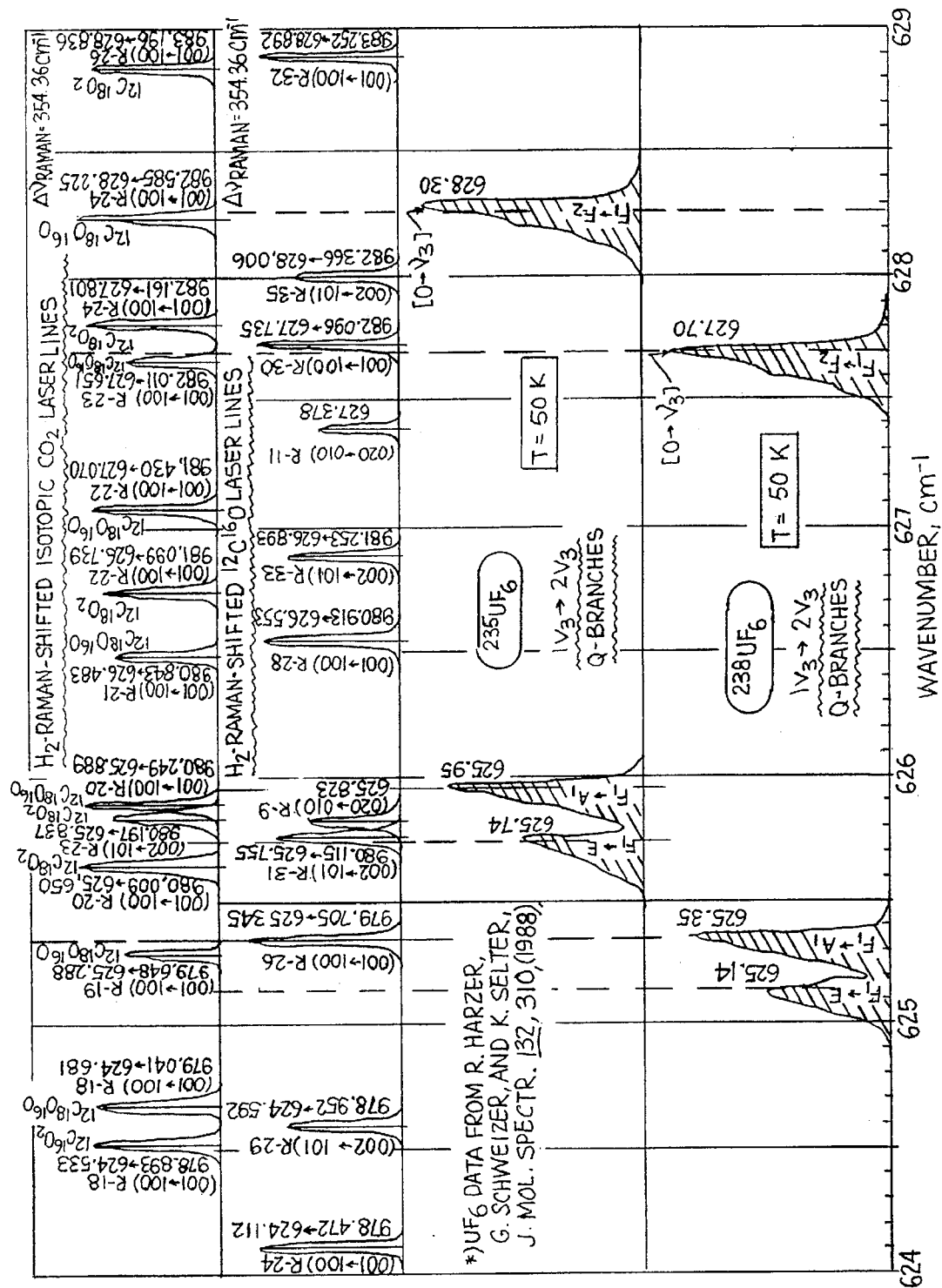
FIG. 9 shows the low-temperature high-resolution absorption bands of $^{235}UF_6$ and $^{238}UF_6$ for second-step $2v_3$ transitions in these molecules, and the (near-) coincident frequencies of para-$H_2$-Raman-shifted $CO_2$, $C^{18}O^{16}O$, $C^{18}O_2$, and $^{13}CO_2$ emissions from their lasing bands in the vicinity of 10.2 µm.

FIGS. 8 and 9 show the $v_3$ Q-branch absorptions of $^{235}UF_6$ and $^{238}UF_6$ for, respectively, $0\to 1v_3$ and $1v_3\to 2v_3$ transitions, and various Raman-shifted laser frequencies from natural and isotopic $CO_2$ at or near these Q-branches. Because of the 628.32 $cm^{-1}$ $F_1\to F_2$ transition, which differs by only ~0.02 $cm^{-1}$ from the $v_3(0\to F_1)$ transition, $^{235}UF_6$ can be step-wise excited with one laser from 0 to $1v_3$ and from $1v_3$ to $2v_3$ with Raman-converted R-24 $C^{18}O^{16}O$ laser photons that are frequency-swept (chirped), broadened, and/ or microwave-shifted through the 628.23–628.32 $cm^{-1}$ interval. Alternatively, the second step, $1v_3$ to $2v_3$, may be pumped by a second laser tuned to 625.70±0.05 $cm^{-1}$ or 625.92±0.05 $cm^{-1}$. As illustrated in FIG. 6, in the MOLIS process, laser-excited $^{235}UF_6(2v_3)$ molecules are subsequently dissociated to $^{235}UF_5+F$ by exposure to UV laser photons ($\lambda$=339 nm) or by multi-photon-absorption (MPA) of some thirty additional 9 μm photons or fifty (Raman-converted) 16 μm photons from a high-power $CO_2$ laser. In CRISLA however, only a limited number of additional 9 or 16 μm photons (e.g., two to twenty) are absorbed in a "second boost" phase to provide additional excitation, that is just enough to induce an enhanced chemical reaction of the excited $^{235}UF_6$ with coreactant(s) RX.

Although exact isotopic frequency matching is required for the first few pumping steps in the $v_3$ vibrational ladder, at the higher vibrational levels, absorption of photons with approximately non-exactly-matched frequencies is greatly enhanced because of the increasing number of frequency-shifted sublevels in $UF_6$ (often called the quasi-continuum), and because of the resonant-frequency-broadening caused by high-power high-intensity laser pulses (so-called "power-broadening"). Thus from level $mv_3$ ($m\geq$~3) and upwards, additional less precisely tuned laser photons at 9 or 16 μm can be step-wise absorbed by a $^{235}UF_6(2v_3)$ molecule to provide sufficient additional excitation for a significantly enhanced chemical reaction with one or more coreactants RX.

To summarize, any laser pumping method that provides isotope-selectively excited $UF_6$ at some higher vibrational level below the dissociation limit can be used in the CRISLA process, provided the excitation energy is sufficient to significantly enhance chemical reaction of the excited $UF_6$ with one or more coreactants RX. The one-step $3v_3$ excitation of $^{235}UF_6$ with 5.3 μm CO laser photons is sufficient in many reaction scenarios to promote an enhanced chemical reaction. However for some desirable coreactants (e.g., $CH_4$), it is necessary that this pumped-in vibrational energy be supplemented with additional energy to achieve a satisfactory reaction rate. For example, in this case, (continuous or pulsed) 5.3 μm CO laser photons can be used to isotope-selectively produce $^{235}UF_6(3v_3)$, which excitation can be followed by the absorption of two to twenty additional 9 μm photons from a (continuous or pulsed) $C^{18}O_2$ or CO-pumped $^{13}COS$ laser. This results in the formation of excited $^{235}UF_6$ ($3v_3+\Sigma m_\beta v_\beta$) where $m_\beta$ is some integer less than 30, and $\beta$ is mostly $\beta$=2 and $\beta$=3, but it may also have values $\beta$=1, 4, 5, and/or 6. Alternatively, pulsed 16 μm lasers can be used to pump $^{235}UF_6$ isotope-selectively to level $2v_3$ in two steps, and thereafter, for example, from $2v_3$ to $8v_3$ with photons from six additional less precisely tuned 16 μm lasers. In still another example, 12 μm and 16 μm laser photons can be used to isotope-selectively populate the $v_3+v_5$, the $2v_3+v_5$, the $3v_3+v_5$, . . . , and the $7v_3+v_5$ levels of $^{235}UF_6$ in succession. The isotope-selectively excited $^{235}UF_6(3v_3)$, $^{235}UF_6(3v_3+\Sigma m_\beta v_\beta)$, $^{235}UF_6(8v_3)$, and $^{235}UF_6(7v_3+v_5)$ molecules in these examples are subsequently harvested by undergoing an enhanced chemical reaction with one or more coreactants to form a new enriched product that is separable from the unreacted unexcited $UF_6$ by chemical or physical processes.

It might appear that there are many different pathways to populate the upper vibrational levels in $UF_6$ in multiple steps. However optical selection rules greatly restrict the number of transitions that are allowed between levels. To date, after substantial experimentation, only two- or three-step $v_3$ excitations with 16 μm laser photons or one-step $3v_3$ excitations with 5.3 μm photons appear to give practical first-stage isotope-selectively excited species in CRISLA. As discussed, once a population of 2- or 3-level isotope-selectively excited vibrations has been established, the $^{235}UF_6$ molecules can be excited further to higher levels by less precisely tuned laser photons. However in such a second boost phase, care must be taken to avoid the simultaneous undesirable excitation of other previously unexcited $UF_6$ molecules with the $^{238}U$ isotope.

Figure 10:
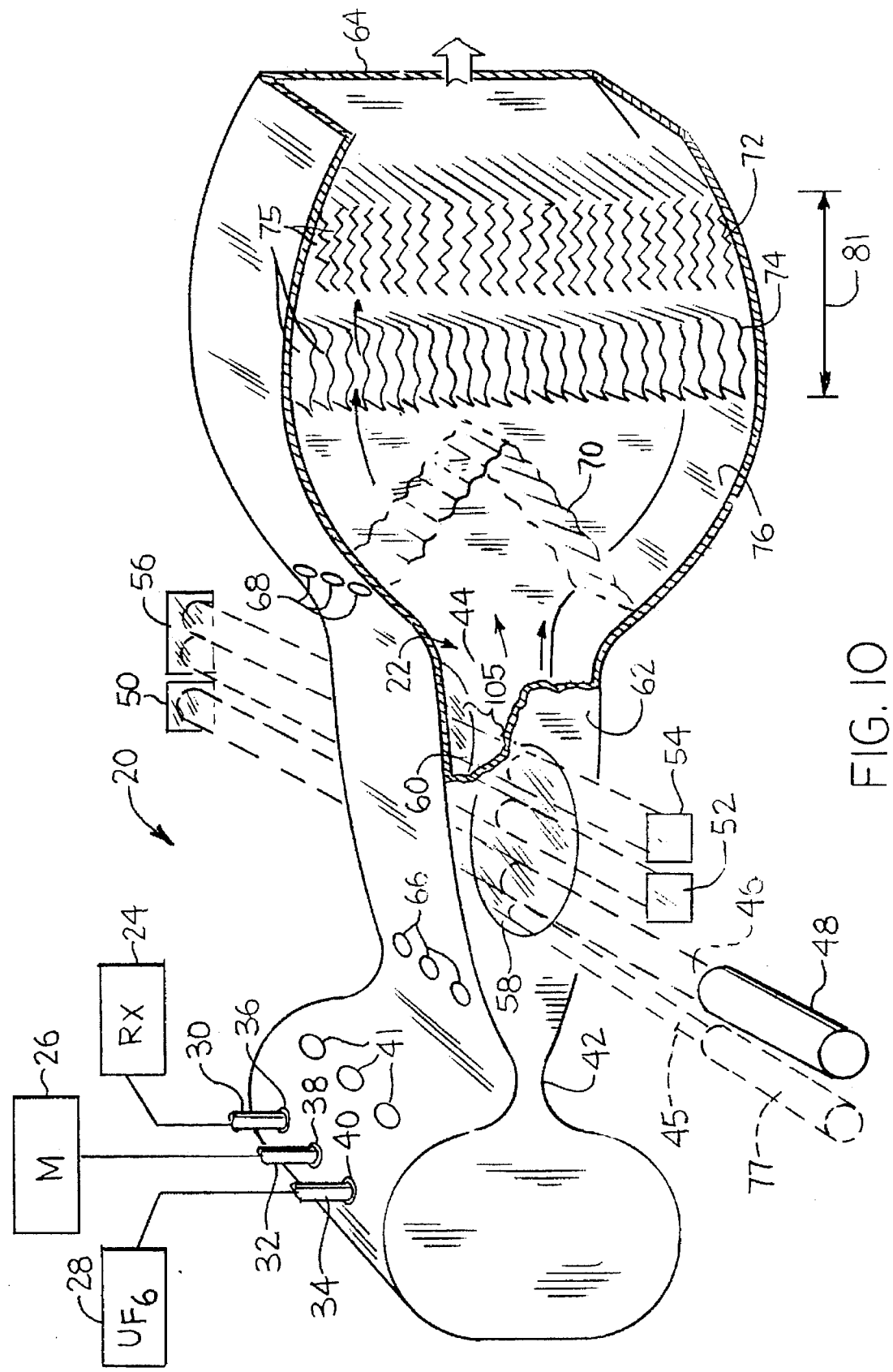
FIG. 10 illustrates one physical embodiment of the present invention in which a 5.3 µm CO laser isotope-selectively excites supercooled $UF_6$ in one step to the $3v_3$ vibration by irradiation of a ($UF_6$+carrier gas) mixture that flows supersonically through a slit-nozzle chamber, the excitation being boosted to higher vibrational levels with a powerful $CO_2$ laser in some applications, the excited enriched $UF_6$ reacting with a coreactant added before, during, or after the supersonic expansion with or without the presence of catalyst particles, and enriched reaction product being collected in a collection zone where the supersonic flow has returned to subsonic conditions and where precipitating enriched Uranium product is collected on wavy or zigzag collector plates, while depleted unreacted gaseous $UF_6$ and carrier gas are pumped out of the collection zone.

Referring to the Figures more particularly by reference numerals wherein like numerals refer to like structures, reference numeral 20 in FIG. 10 refers to a supersonic nozzle for performing a preferred CRISLA process of the present invention. A gaseous mixture of $UF_6$ and a carrier gas M is fed into a plenum 22 of the supersonic nozzle 20 from supply tanks 24, 26, and 28, through suitable conduits 30, 32, and 34, and ports 36, 38, and 40. Suitable carrier gas, M, includes one or more gases such as, by way of example, $N_2$, Ar, He, $H_2$, and $CH_4$, and one or more coreactants, RX, such as, by way of example, $SiH_4$, $CH_4$, HCl, and HBr in any combination. Gas M may be mixed in plenum 22 by introduction through ports 41. The mixture, $UF_6+M+(RX)$, is supercooled to about 100° K by adiabatic expansion through supersonic slit throat 42 of the nozzle 20 into a chamber 44 where it is irradiated by a multi-pass 5.3 μm laser beam 46 from a CO laser 48 operated at the 1876.3 $cm^{-1}$ and 1876.6 $cm^{-1}$ emission lines to excite the $^{235}UF_6$ to its $3v_3$ vibrational state. The beam 46 is directed to make multiple passes by a plurality of suitably placed and oriented mirrors 50, 52, 54, and 56 located adjacent windows 58 and 60 through sides 62 and 64, respectively, of the nozzle 20.

The reactant gases RX are admixed with the $UF_6$+M stream either before, during, or after laser-irradiation downstream of different possible ports. The possible ports may include ports 41 in the plenum 22, ports 66 just beyond the nozzle throat 42, or ports 68 at the shock 70. For example, if RX is injected at ports 68, it may be accompanied by a dust of dispersed catalyst particles that promote reaction and fixation of laser-excited $^{235}UF_6^{\nu*}$ on their surfaces. After laser-irradiation, the excited $UF_6(3\nu_3)$ either reacts with admixed RX in the gas, on catalyst surfaces, or at active zigzag plate collectors 72 or at active wavy plate collectors 74, at surfaces 75 thereof on which the $UF_6$+M stream impinges. The supersonic flow is generally converted to subsonic flow at the standing shock 70 in collection entrance chamber 76 or after impingement on a collector surface 75 in collection zone 81. In some CRISLA embodiments, the isotope-selective fine-tuned 5.3 µm excitation provided by the CO laser 48, is supplemented by 9 µm booster excitations from a $C^{18}O_2$ or a CO-pumped $^{13}CO_2$ mildly tuned laser 77, whose beam 45 enters the irradiation chamber 44 at substantially the same location as the laser beam from laser 48, but at a slightly different angle.

Figure 11:
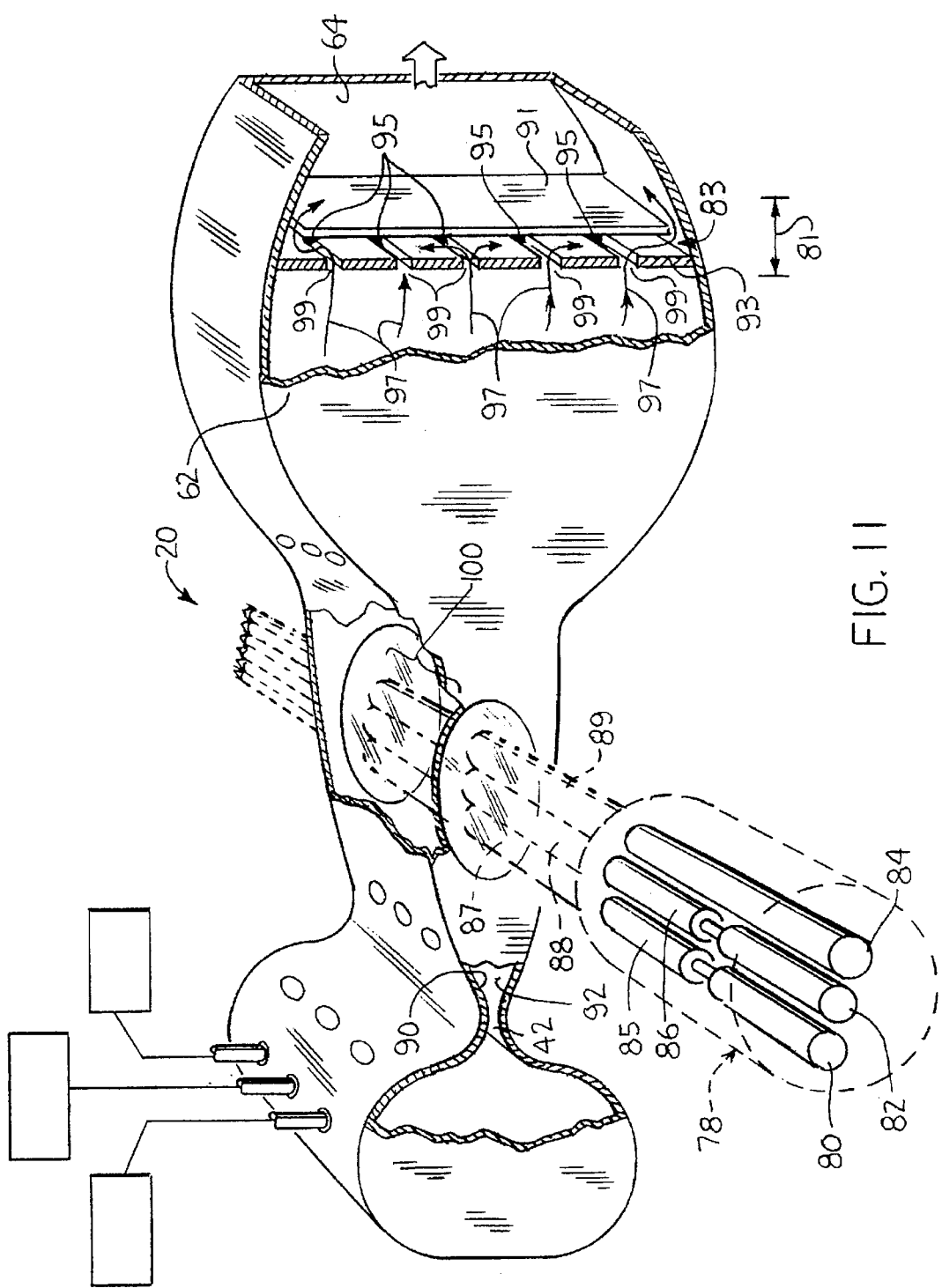
FIG. 11 shows the same enrichment chamber as in FIG. 10, except that instead of one 5.3 µm laser beam, one or two isotope-selectively tuned 16 µm laser beams excite supercooled $UF_6$ in a supersonically expanding jet of $UF_6$ and carrier gas to the $mv_3$ vibrational level in m steps ($\Delta v_3=1$), while a second or third less-accurately tuned 16 µm or 9 µm laser boosts the $mv_3$-excited isotopic $UF_6$ molecules further to the $nv_3+pv_2$ level with $(n-m) \geq 5$ and $p \geq 0$, and where enriched Uranium product is collected on an impact plate.

As shown in FIG. 11, the nozzle 20 may have the CO laser 48 replaced by a system 78 of three pulsed 16 µm (Raman-converted) $CO_2$ lasers, 80, 82, 84. Continuous wave (CW) lasers would be preferred, but no suitable CW lasers at 16 µm presently exist. The first two of these lasers 80 and 82 include Raman cells 85 and 86, respectively, to adjust the frequency of their photon beams 87 and 88, respectively, so that they excite the $^{235}UF_6$ to $1\nu_3$ and to $2\nu_3$ in two steps, while the third laser 84 pumps the $^{235}UF_6(2\nu_3)$ species with beam 89 in multiple steps to $^{235}UF_6(2\nu_3+\Sigma m_\beta\nu_\beta)$ where $m_\beta$ is an integer less than or equal to 30 ($\leq 30$), and $\beta$ preferably equal to 3, but $\beta$ can also have values of 1, 2, 4, 5, and/or 6. Instead of a 16 µm laser, the third laser 84 also could be a 9 µm $C^{18}O_2$ or a CO-pumped $^{13}COS$ laser and/or 10 µm $CO_2$ laser.

FIG. 11 also illustrates an alternate collector configuration 83 with a solid impact plate 91 and a parallel juxta-positioned plate 93 with holes 99 through which streams 97 of $UF_m(X)/UF_6/RX/N_2$ gas flow. The polymerizing condensing enriched $UF_m(X)$ species in the stream 97 form piles of solid product 95 opposite the holes 99 in plate 93 since the solid product 95 can not follow the sharp 90° turns of the main gas stream 97. This impact condensation effect is similar to that induced in the zigzag plate collectors 72 of FIG. 10 where the gas is also forced to meander though 90° turns as discussed below.

Figure 12:
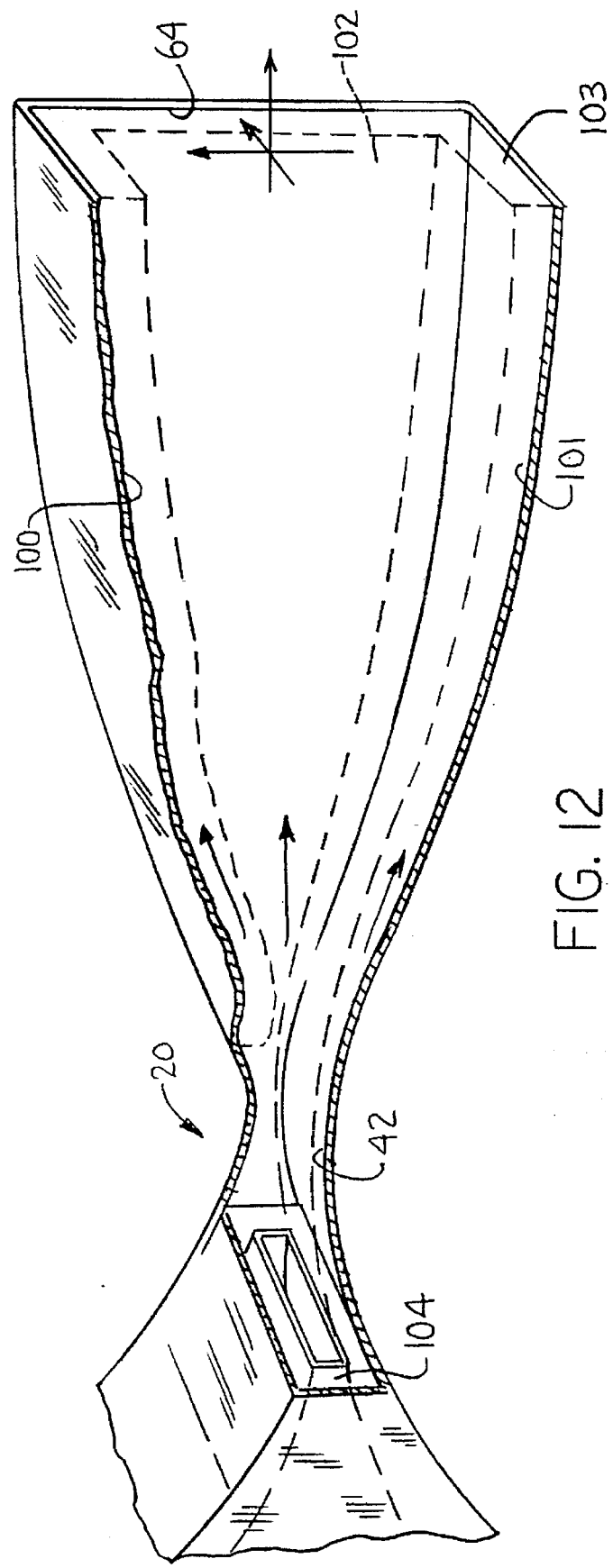
FIG. 12 is a cutaway view of a portion of the supersonic nozzle of a preferred embodiment of the present invention.

In a preferred embodiment of the invention, as illustrated in FIG. 12, the $UF_6$ may be injected into the supersonic nozzle 20 in such a manner that it never contacts the nozzle walls 100 or 101, or the nozzle sides 62 or 64 as it supersonically expands and is laser irradiated. $UF_6$ diffuses very slowly laterally during its ~0.1 ms transit through the nozzle 20 and before reaching plate collectors 72, 74 of FIG. 10 or collector configuration 83 of FIG. 11, it will be maintained inside a core gas stream 102. The core gas stream 102 of $UF_6$+carrier gas M is surrounded by a shroud 103 of carrier gas M using a core gas injector 104. This prevents the $UF_6$ core gas stream 102 from contacting nozzle sides 62, 64 and walls 100, 101 (and wall reactions at undesirable places) until core gas stream 102 impacts the collectors 72, 74, or the collector configuration 83.

There are a number of important constraints that exist for multi-step 16 µm pulsed excitations of FIG. 11. First, to obtain the desired gas temperatures of 20°–100° K, $UF_6$ mixed with a monatomic or diatomic carrier gas must be expanded sonically through throat 42 after which it becomes supersonic in the nozzle expansion section 105 where it passes through cross-irradiating 16 µm pulsed laser beams 87, 88, and 89 in approximately $10^{-4}$ seconds. During this flow-through time, all isotope-selective and second-boost step-wise excitations must occur for the $UF_6$ gas that travels through the laser beams 87, 88, and 89. This means that the lasers 80, 82, and 84 must be pulsed at a pulse repetition rate (prr) of at least 10,000 times per second (10,000 Hz) if all the $^{235}UF_6$ gas flowing by is to be irradiated at least once by one pulse. Otherwise pockets of unirradiated $UF_6$ gas will pass through.

Even at the one-strike rate of 10,000 Hz, only about 10% of all the $^{235}UF_6$ will be pumped to the $2\nu_3$ level, partially because of Dicke Superradiance discussed herein. If the starting material is natural Uranium, $^{235}U/^{238}U=0.007$, this would result in a tails assay of $^{235}U/^{238}U\approx 0.006$ that is unacceptably low, as 0.002 is the present norm when separation costs average about $100/SWU. To achieve the lower tails assays of 0.002, approximately 70% of all $^{235}UF_6$ must be removed. This means that the cross-flowing $UF_6$ must be struck at least ten times during its transit through the expansion section irradiation zone 105 defined by the laser beams 87, 88, and 89 and bracket in FIG. 11. To generate acceptable separations in the once-through one-stage enrichment of $UF_6$ with pulsed 16 µm laser photons, a prr=80 to 100 kHz is required if the fly-by time is $10^{-4}$ seconds, which is beyond the current performance of available pulsed lasers.

To excite an adequate (~70%) fraction of the $^{235}UF_6$ at T~100° K by continuous excitation of supersonically flowing $UF_6$ with 5.3 µm CO laser irradiation during a 0.1 ms "fly-by", requires a laser flux of almost 500 kW/cm². This also is beyond the current performance of available lasers. Whether pulsed 16 µm stepped excitation, or continuous 5.3 µm laser pumping of $UF_6$ is used in the CRISLA process, the present laser performance is such that it is necessary to multiplex ten or so 16 µm laser systems or 5.3 µm lasers to achieve economic enrichments in one passage through the laser-irradiated supersonic nozzle 20. That is in the pulsed 16 µm case, the repetition rate must be ~80,000 Hz for one-stage enrichment, while 4000 Hz is the maximum rate achieved to date. In the 5.3 µm case, intracavity nozzle irradiation flux of about 450 kW/cm² is needed for one-stage enrichment while the maximum demonstrated CO laser power to date has been about 50 kW/cm².

Figure 13:
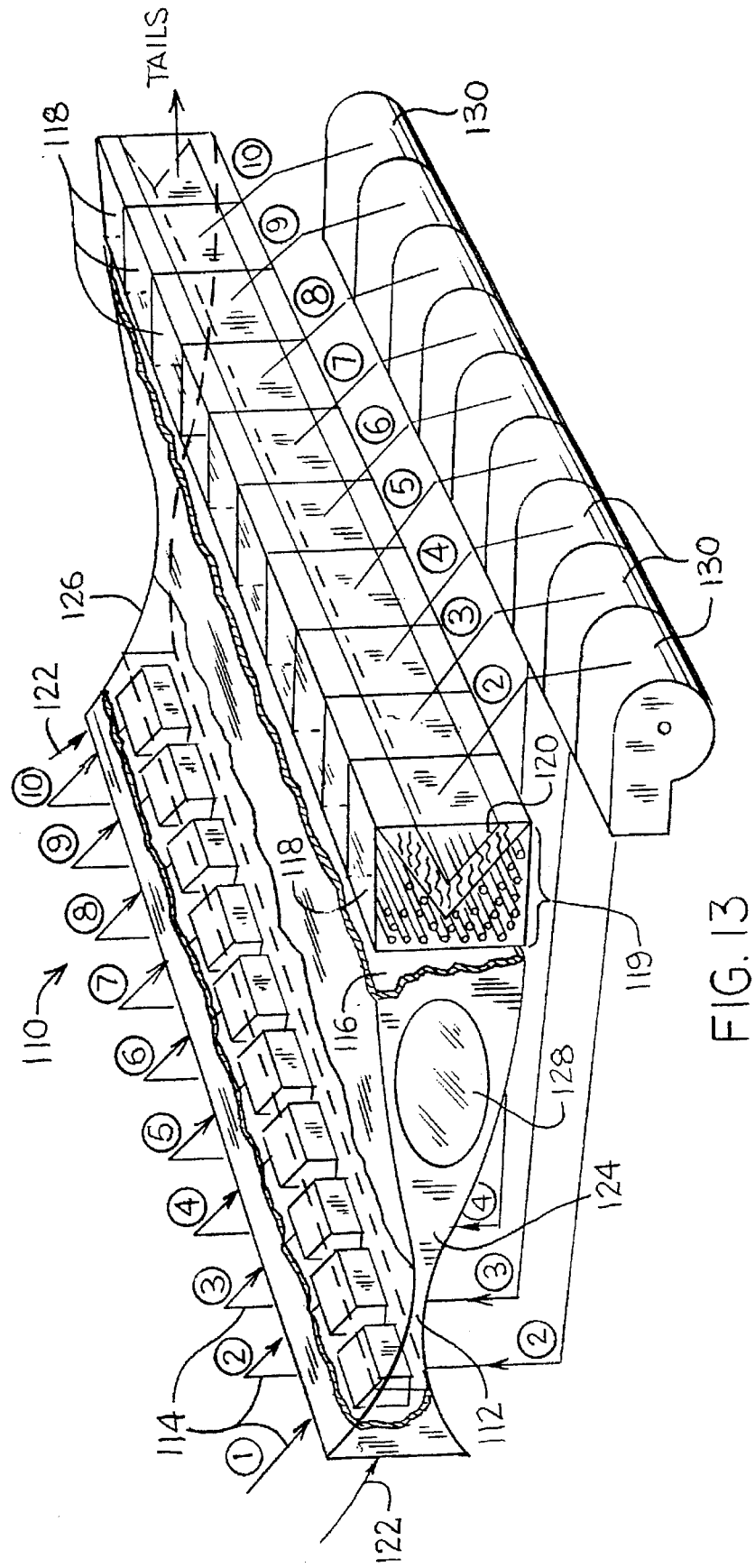
FIG. 13 illustrates how several streams of $UF_6+M$ with different isotopic Uranium compositions are expanded side-by-side in a supersonic slit nozzle and recirculated so as to effectively form parallel enrichment stages.

An alternative to the multiplexing of lasers is to use several stages for enrichment. For example, in a ten stage process in which the $UF_6$+carrier gas M is recycled ten times through the nozzle 20 where 12% of the $^{235}U$ can be removed in each pass through nozzle 20, 70% of all $^{235}UF_6$ will be removed from the feed (e.g., with depletion of 0.7% to 0.2% $^{235}U$). If such staging were to be done in series, using ten consecutive nozzles 20 and ten lasers 48 with or without laser 77, or ten laser systems 78, the unit cost of such a multi-stage laser induced separation (LIS) scheme could become non-competitive compared to existing Uranium enrichment technology. However as shown in FIG. 13, for the CRISLA or a MOLIS process that uses gaseous $UF_6$ in a carrier gas that is supersonically cooled, it is possible to carry out enrichment with a parallel staging technique at little additional complexity or cost, using one nozzle 110 and one state-of-the-art 50 kW 5.3 µm CO laser 48 with or without laser 77, or a 4000 Hz 16 µm triple laser system 78. Since $UF_6$ diffuses sideways very slowly in a flowing gas, ten or more adjacent streams of $UF_6$+carrier gas with different isotopic U compositions can be made to flow through the supersonic nozzle 110 without any intermingling.

For example, as illustrated in FIG. 13, if the slit throat 112 of the nozzle 110 is 100 cm wide and 0.2 cm in height, ten isotopically different streams 114 of $UF_6$+carrier gas M can be arranged to flow contiguously through a common nozzle irradiation chamber 116 at 10 cm intervals. In FIG. 13 the isotopically different streams 114 are labeled ①–⑩ where stream ① flows through nozzle 110 and the output stream, stream ②, is returned to the next adjacent input of nozzle 110. After flowing supersonically through this chamber 116 (in ~0.1 ms), each stream ①–⑩ (streams 114) is intercepted by a separate collector compartment 118 in the collection zone 119 where the flow is returned to subsonic conditions and where precipitating $^{235}U$ product is collected while depleted $UF_6$+carrier gas "tails" are passed through.

The tails gas from ones of streams 114, i.e., streams ①–⑨, is then recompressed in compressors 130 (to overcome flow friction losses) and sequentially fed to ones of streams 114, i.e., streams ②–⑩, respectively. For example, stream ① enters nozzle 110 with natural 0.7% enriched $UF_6$ and after removal of 12% of the $^{235}UF_6$, leaves with a tails assay of 0.616% that is fed to stream ②, and so on. The last stream ⑩ would have tails of 0.2%, which are passed on to a depleted $UF_6$ storage terminal.

Using the parallel staging techniques described with reference to nozzle 110, only one laser enrichment module is used instead of ten as in the case of a series of ten laser enrichment modules for each stage. A laser enrichment module includes one nozzle 110 and one laser 48 with or without laser 77, or laser system 78. By providing extra inert gas streams 122 inside chamber 116 along walls 124, 126 where laser windows 128 are respectively positioned, solid window material is not required and the amount of laser flux available for separation is not reduced by window losses.

The interstage re-compression of the isotopically different streams 114 may be carried out by a plurality of conventional compressors 130 or a specially designed axial compressor in which contiguous streams carrying isotopically different $UF_6$ are compressed without $UF_6$ mixing in much the same manner as in the multi-stage parallel nozzle 110. A suitable specially designed axial compressor is discussed in U.S. Pat. No. 4,113,448 to Haarhoff et al. which is hereby incorporated by reference. If pressure recovery in the collection zone 119 is optimized, the recompression energy needed for gas recirculation will be about 80 kWe for a CRISLA module that produces 400,000 SWU/yr. This is quite acceptable.

The particular configuration of collectors 120 shown in FIG. 13 are only illustrative. Any one of a combination of passive or active collector types shown in FIGS. 14A, 14B, 15A, 15B, discussed below, or any other effective collector may be used equally well.

Still another alternative to serial staging or multi-plexing is possible for 5.3 μm CO lasers, but not for 16 μm multi-step pumping lasers. In this one-stage technique, the CO laser is Q-switched by a rotating end mirror at a rate between 100 and 400 Hz and with pulse durations of 0.5 to 1 μs. The photon power flux during a CO laser pulse can be enhanced 100- to 1000-fold over the average CW power level when a CO laser is Q-switched. Because the CO molecule has an anomalously long spontaneous-emission lifetime, vibrational energy pumped into a CO laser gas can be stored for milliseconds, making such Q-switching unusually efficient. The ultra-high laser fluxes during a 1 μs CO laser Q-pulse are adequate to excite 60 to 75% of the $^{235}UF_6$ population to the $3v_3$ level (i.e., one-stage pass-throughs). However, this is only true for the $UF_6$ gas that is present in the nozzle 20 during the 1 μs pulse that is applied only once every 2500 μs (=$prr^{-1}$). Thus to avoid unirradiated pass-through of 24/25 of all $UF_6$, the $UF_6$ must be pulse-fed every 2500 μs for a duration of 100 μs (100 μs=flow-through time in irradiation region) prior to each 1 μs laser pulse, in synchronization with the laser pulses. The CO laser pulse rate may be increased to ~10,000 Hz by using a pulsed discharge instead of a rotating mirror. However the peak pulse power would be much less in this case. In addition to the requirement for a special synchronized pulsed $UF_6$ feed rotor to generate the gas pulses, the effective $UF_6$ flow-rate through the nozzle 20 is reduced by a substantial factor. Therefore, the Q-switching or pulsed-discharge scheme for CO lasers appears less desirable in commercial applications than the parallel staging technique with CW CO lasers discussed above. However the pulsed CO laser and pulsed feed technique may be useful in exploratory process research.

When $^{235}UF_6$ is excited to the first vibrational level $1v_3$ by 16 μm laser irradiation, the pumped-up $^{235}UF_6(1v_3)$ molecules must be excited to the next level, $2v_3$, and to higher ones $nv_3$, rather quickly before these molecules experience too many collisions (<$10^{-6}$ sec). Otherwise a large portion of previously excited $^{235}UF_6(1v_3)$ molecules will experience changes in their rotational J-values and bending vibrations, which cause them to be no longer resonant to the laser photon frequency selected for pumping them from $1v_3$ to $2v_3$, and up the ladder to $nv_3$. By broadening the laser line frequencies as much as possible and by supersonic nozzle cooling of $UF_6$ to ~20° K (to suppress the bending vibrations), the out-of-resonance spreading can be minimized to some degree. Nevertheless to have reasonably efficient pumping of $0 \rightarrow v_3 \rightarrow 2v_3 \rightarrow \ldots \rightarrow nv_3$ in $UF_6$ with two or three 16 μm laser beams (with differently tuned frequencies and different power levels), the beams should either irradiate the $UF_6$ continuously or, if pulsed, must follow each other and/or overlap within a microsecond. Currently, the best $^{235}UF_6$-resonant-frequency-matching 16 μm lasers deliver photons with pulse durations of ~50 ns. Thus the two or more companion pulses (with different powers and frequencies) for selective and booster excitation can easily be pulsed sequentially or with partial time overlaps to meet the maximum 1 μs time spacing requirement.

The necessity of populating the $1v_3$, $2v_3$ and higher $nv_3$ levels of $^{235}UF_6$ as quickly as possible ($\leq 1$ μs) produces a complication known as "Dicke superradiance". In this phenomenon, molecules radiate their excited energy away at considerably higher rates than what occurs in spontaneous emission. In Dicke Superradiance or "mirror-less lasing", molecules within a radius of one emission wavelength stimulate each other coherently to emit photons at stimulated emission rates rather than at the much slower spontaneous emission rate. However this only happens if all the excited molecules have their dipoles aligned, have the same quantum level excitation, oscillate in-phase, and there is an inversion between the excited level and some lower (usually not the ground-state) level. Of course, this is precisely what happens when intense 16 μm laser pulses pump a volume of $UF_6$ molecules to near-saturation before any collisions occur, and it is desired to pump the largest possible number of $^{235}UF_6$ molecules within a collision time. Even as the 50 ns laser pulse starts to pump up the $UF_6(v_3)$ population, many excited $UF_6(v_3)$ molecules start to de-excite to $UF_6(v_2)$ by emission of 109 μm photons from optically allowed ($v_3 \rightarrow v_2$) transitions, due to Dicke superradiance. This happens because the $UF_6(v_2)$ population is essentially empty at $T \leq 100°$ K, and there is an inversion between levels $v_3$ and $v_2$.

If there was no Dicke superradiance, theoretically 33% of the $^{235}UF_6$ population could be pumped up in two steps to $2v_3$ during irradiation by 30 ns 16 μm laser pulses. However, because of the superradiance "leakage" during pump-up, only about 10% of all $^{235}UF_6$ will reach $2v_3$ during the isotope-selective two-step excitation phase.

The vibrational ground-state of $^{235}UF_6$ is bleached when the isotope-selective pulses reach their peaks. It takes approximately 1 to 10 μs after this before the $^{235}UF_6$ ground-state is re-equilibrated by collisions. Therefore, after 10 μs, a second 50 ns pulse or set of isotope-selective 16 μm pulses can take another 10% of the $^{235}UF_6$ to the $2v_3$ state. With prr=100,000 Hz, there is 10 μs of time between each pulse or set of pulses, which is enough to allow partial collisional re-equilibration. Thus, provided prr≈100,000 Hz, it is possible to achieve economic one-stage LIS enrichment of Uranium with pulsed 16 μm lasers, whether used in MOLIS or CRISLA processes.

While a good portion of the $UF_6(v_3)$ population can change into a $UF_6(v_2)$ population during a 16 μm pulse because of Dicke superradiance, some 16 μm photons can pump this new $v_2$ population in turn to $(v_2+v_3)$ excited species, if the photon frequencies match the resonance $(v_2)\rightarrow(v_2+v_3)$. Dicke superradiance can also relax the $v_3$-excited $UF_6$ molecules to the $v_5$ excited level, which is empty below about 20° K, though more slowly than relaxation to the $v_2$ level. Like the $v_2$-excited population, 16 μm photons can excite the $v_5$ excited species to $(v_5+v_3)$. It also may be possible to pump the "renegade" $v_5$-excited molecules to the $(v_2+v_3)$ level with $CO_2$ laser photons at ~957 cm$^{-1}$ (P-4 line of the $v_3\rightarrow v_1$ band of $CO_2$), if the absorption cross-section for this vibrational three-quantum change is not too low. Thus with a mixture of 16 and 9 or 10 μm laser photons, a mixture of isotope-selectively excited $UF_6$ molecules can be created at higher vibrational levels, with an overall pumping efficiency between 10 and 20% per pulse.

The primary concern in CRISLA processes is to provide sufficient vibrational energy in $^{235}UF_6$ to enhance its reaction with a coreactant well above the thermal reaction rate and to produce enriched product $UF_m(X)$ which can be separated from depleted $UF_6$. In practice this means that laser-provided energies of about 0.25 eV (~2000 cm$^{-1}$) or more must be added to $UF_6$ molecules, if they are to affect the rearrangement of bonds in gas-phase $UF_6$:RX bonded complexes, which require 0.5 eV or so to induce a chemical reaction. The balance is provided by thermally produced and previously stored vibrational energy in $UF_6$ and RX.

On surfaces, many $UF_6$+RX reactions require less than 0.25 eV to proceed. In this case, the reactions may be enhanced by laser-excited $UF_6$ molecules that strike RX on a surface with as little as 0.1 eV (~800 cm$^{-1}$) of excitation energy, assuming such laser excited species can reach the surface with their excitation intact. At room temperature, an average $UF_6$ molecule already possesses about 0.1 eV of stored vibrational energy and it is unlikely that such a surface reaction can be significantly enhanced by laser excitation. However, if the $UF_6$ is cooled to 100° K or so, surface reactions by laser-excited $UF_6^{v*}$ may be considerably enhanced over non-laser-excited $UF_6$ interactions with the surface. For $UF_6$, laser-induced reaction enhancement factors $\theta_L$ are approximately given by:

$$\theta_L = 0.015 \exp\left\{ 1.439 \left( \frac{v_L (cm^{-1})}{T(°K.)} \right) \right\},$$

where $v_L$ is the laser photon wavenumber in cm$^{-1}$ and T the gas temperature in °K. This relation gives $\theta_L$=0.7 at T=300° K and $\theta_L$=1,500 at T=100° K, if $v_L$=800 cm$^{-1}$ (≈0.1 eV); or $\theta_L$=220 for T=300° K and $\theta_L$=4.7×10$^{10}$ at T=100° K if $v_L$=2000 cm$^{-1}$ (≈0.25 eV).

Although it is necessary to supply sufficient laser energy for reaction enhancement, providing too much energy in CRISLA can cause complications due to increased probabilities of side reactions and molecular energy transfers that result in gas heating. Thus if "second-boost" laser pumping of isotope-selectively excited $UF_6$ is contemplated to promote a desired reaction with, for example, a less toxic, less costly, less flammable, but less reactable coreactant RX, one has to consider such undesirable side effects also along with the coreactant cost, toxicity, and flammability.

Figure 14A:
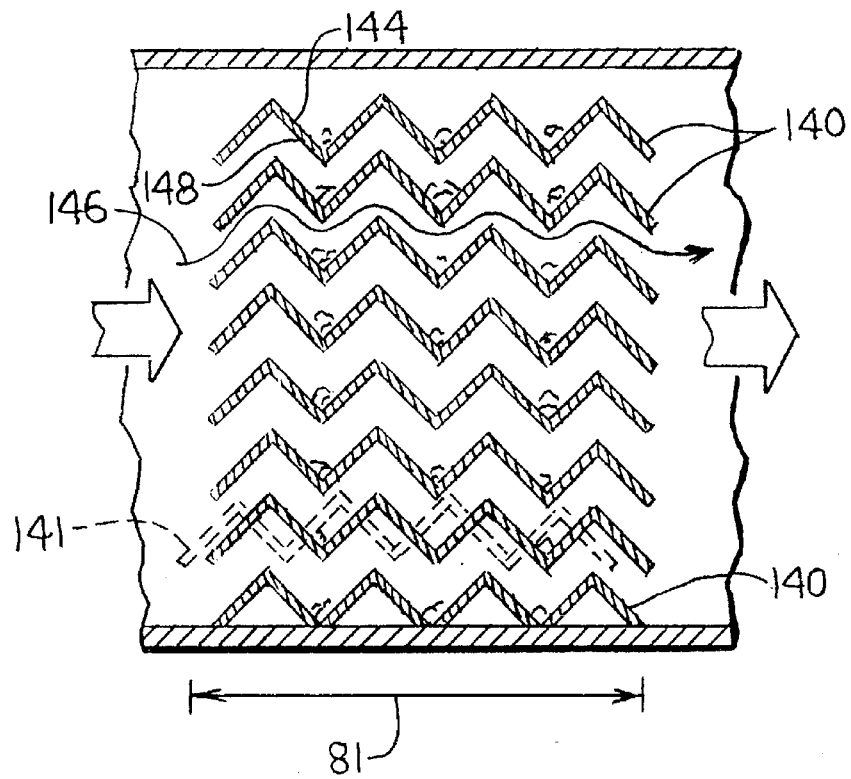
FIGS. 14A and 14B show two passive collector plate assemblies for use in the collection zone following the CRISLA laser-irradiation chamber, which allows passage of the irradiated CRISLA gas mixture between plates, where in one collector assembly zigzag plates are used that collect condensing reaction product in the sharp flow-turning corners, while in the other collector assembly wavy riffle plates are employed which collect product in their troughs, the plates being arranged in stacks such that the passage cross-sections between plates are either constant when the plates have their crests aligned, or the passage cross-sections alternate through constrictions and expansions when the crests in one plate are aligned with valleys of the next one, as shown by the dotted lines in FIGS. 14A and 14B.
Figure 14B:
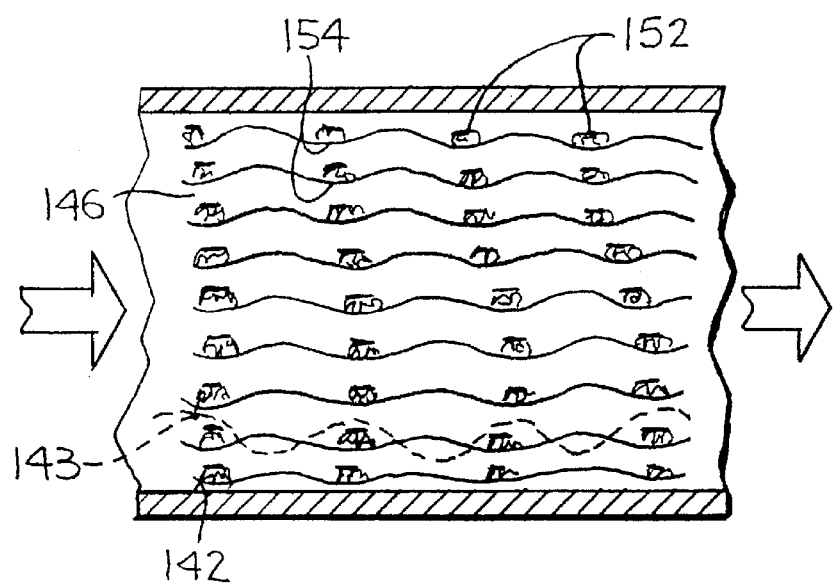
Figure 15A:
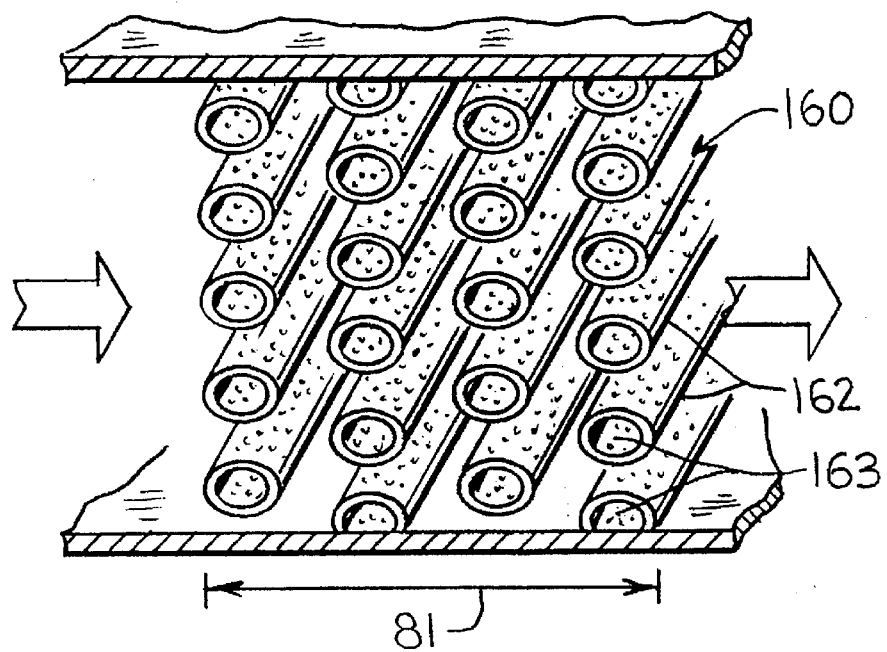
FIGS. 15A and 15B each, respectively, show two active collectors, each of which allow passage of the irradiated CRISLA gas mixture over collector surfaces which can transmit gaseous reactants through surface pores or perforations from internal reservoirs so that these reactants can contact and react with laser-excited $QF_6^{v*}$ from the main CRISLA gas stream, and/or which transmit buffer gases through surface pores and perforations to provide a thin boundary layer of surface-hugging buffer gas that allows penetration by heavy condensing reaction product species $\{QF_m(X)\}_n$, but which wards off the trans-diffusion of lighter unreacted $QF_6$ molecules in the main gas stream.
Figure 15B:
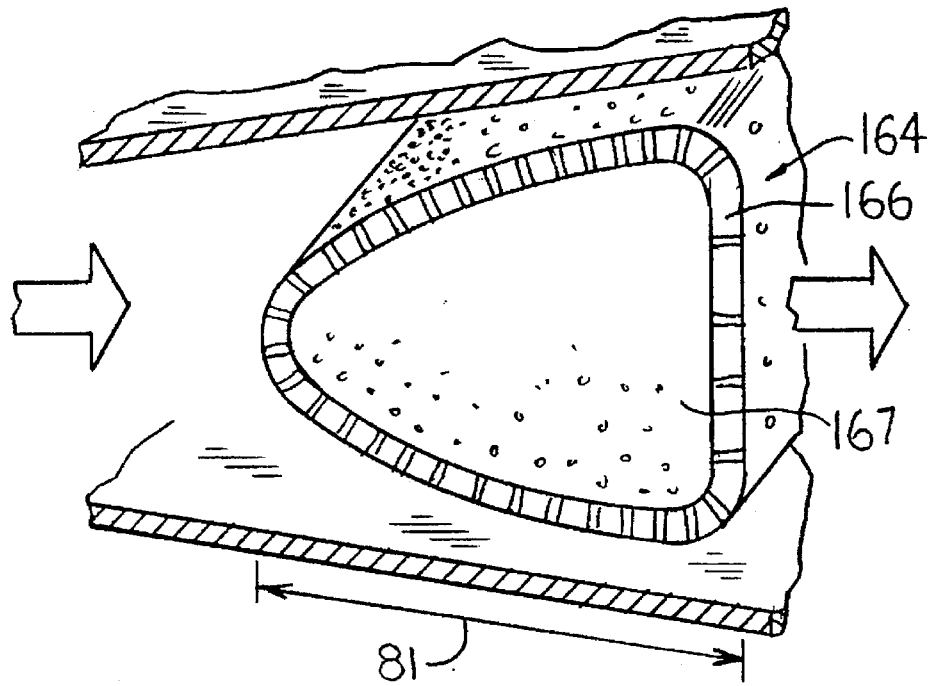

To separate enriched Uranium product from $UF_6$+M+RX streams entering the collection zones 81 or 119, a stack of zigzag plates 140 or a stack of wavy riffle plates 142 can be used, as shown in FIGS. 14A and 14B. Plates 140 and 142 are "passive" collectors in which polymerizing $\{UF_m(X)\}_n$ is precipitated in the corners 148 or troughs 154 of the plates 140 or 142, respectively, as a solid. For the zigzag plates 140, product piles 144 form in the corners 148 of the sharp turns (usually 90°) in the zigzag plate contours which force the $UF_6$+M+RX streams 146 through sharp turns when these streams 146 meander between two adjacent zigzag plates 140. Since heavier polymerizing Uraniferous product species cannot turn as rapidly as gaseous $UF_6$, they precipitate and condense out in the corners 148 of the zigzag plates 140. Similarly, as shown in FIG. 14B, in embodiments utilizing a stack of wavy plates 142, solid isotope-enriched product 152 precipitates and collects in the troughs 154 because the product species carried in the stream 146 cannot follow the rapid changes in flow direction.

The stacks of zigzag plates 140 or wavy plates 142 can be assembled in different ways. For a constant flow passage cross-section, the crests of adjacent plates are all aligned as illustrated in FIGS. 14A and 14B. If it is desirable that the gas flow between plates experience constrictions and expansions however, the crests of one plate can be aligned with the valleys of the next plate as shown by the dotted lines 141 and 143 in FIGS. 14A and 14B, respectively. In some applications, repeated constrictions and expansions of the product-carrying flow is wanted to promote product species polymerization and precipitation.

Instead of using stacks of collector plates 140, 142, surface-passivated particles may be injected into the gas stream at the entrance of the collection zone 81, 119 to collect precipitating and condensing product on their surfaces. After floating through the collection zone in the gas stream and gathering product, the product-covered particles are recaptured on a screen (not shown) positioned at the exit of collection zone 81, 119. The particles are typically 0.1 to 100 μm in diameter and made of solid or porous Ni, Pd, Pt, Cu, Al, Mg, Carbon, $Al_2O_3$, MgO, teflon, or any other suitable material used in the chemical process industry. The screen is continuously (or intermittently) moved in and out of the collection zone exit region; after leaving the collection zone the particles are shaken or blown from the screen and processed to extract the enriched product that was deposited on the particle surfaces.

In prior CRISLA process research, two important product harvesting problems were identified:
  (a) occurrence of undesirable isotope-scrambling back-reactions (9) and (10) discussed earlier; and
  (b) difficulty of quick removal of solid enriched Uranium product deposited on collector surfaces (plates or particles).

Thus, along with efficient isotope-selective formation of precipitable reaction product species from the reaction of laser-excited $UF_6'^*$ with RX, two important additional steps must be attended to if the enriched product is to be secured, namely: prevention of isotope-scrambling back-reactions during collection; and efficient rapid removal of precipitated product from collector surfaces.

To avoid or minimize the isotope-scrambling reaction (9), it is necessary that solid collector plates or particles be passivated. That is, the passivated surfaces are preferably covered with a film of fluoride which repels $UF_6$ and prevents its adsorption on the collector surface.

To minimize both reactions (9) and (10), another approach is to use hollow "active" collectors 160, 164 with porous or perforated outer walls 162, 166 and inner reservoirs 163, 167 which can provide a gaseous boundary layer over the outer walls 162, 166 to minimize reactions (9) and (10). Hollow active collectors 160, 164 allow the transmission of a buffer gas (e.g. $N_2$) from inner reservoirs 163, 167 through the outer walls 162, 166. Using slight reservoir overpressures, a thin boundary layer of buffer gas can then be created over the collector walls 162, 166 which keeps most of the unreacted $UF_6$ in the main stream from contacting the surfaces of active collectors 160, 164, but which allows heavy polymerizing $\{UF_m(X)\}_n$ product species to cross through and condense out on the surface of outer walls 162, 166.

Usually the active collector surfaces are passivated (i.e. fluorinated) prior to their use, by either pre-treatment in a hot zone or by "cooking" them for a while as some fluorinating gas FL is passed through the pores or perforations. Zigzag plates 140 and wavy plates 142 shown as solid "passive" collectors in FIGS. 14A and 14B, respectively, can also be made into "active" collectors by providing inner reservoirs (not shown), e.g. squeezed tubes or drilled out plenums) between the two surfaces of each plate with pores or perforations through the outer walls of the corresponding collector.

In another preferred embodiment of the present invention active collectors can also be used in CRISLA applications where only enriched laser-excited $UF_6'^*+UF_6+M$ gas enters the collection zone and where coreactant RX is provided via inner reservoirs 163, 167 and out through pores or perforations in outer collector walls 162, 166. In this case $UF_6'^*$ reacts with RX in the interface regions between the main gas stream and the RX-carrying gaseous boundary layers that cover the collector surfaces. After reaction, the heavier polymerizing $\{UF_m(X)\}_n$ product species can penetrate the gaseous boundary layers and precipitate downstream on collector surfaces as the bulk gas moves past collectors 160 or 164 of FIGS. 15A and 15B, respectively, or past collector plates 140 or 142 of FIGS. 14A and 14B, respectively.

To solve the rapid removal problem (b) mentioned above, three basic techniques can be applied. If only small quantities of isotopic product are to be extracted, for example in the case of $^{99}MoF_6/^{98}MoF_6$ separation with a 1/33,000 ratio, one can employ the "on-off" process technique discussed earlier. In this approach, the supersonic nozzle-cooled $MoF_6/M/RX$ gas flow is maintained for 5 seconds to 1 minute and halted after 1 to 5 monolayers of product have been deposited on passive or active collector surfaces. The feed flow and laser-beams are then switched off and a strong fluorinating gas FL diluted in carrier gas M is introduced. The FL/M gas mix is past slowly over the collector surfaces for 100 to 1000 seconds (or as long as is required) to reconvert the deposited solid $^{99}MoF_m(X)$ back to gaseous $^{99}MoF_6$ while simultaneously repassivating the collector surfaces with a fluoride layer. At the same time that the FL/M flow is started, the gaseous exhaust from the collection chamber is switched from the tails processing system to the product collection system. Gaseous $^{99}MoF_6$ product is pumped out and stored in a product tank after the FL/M gases are separated from it by differential freezing.

Figure 16:
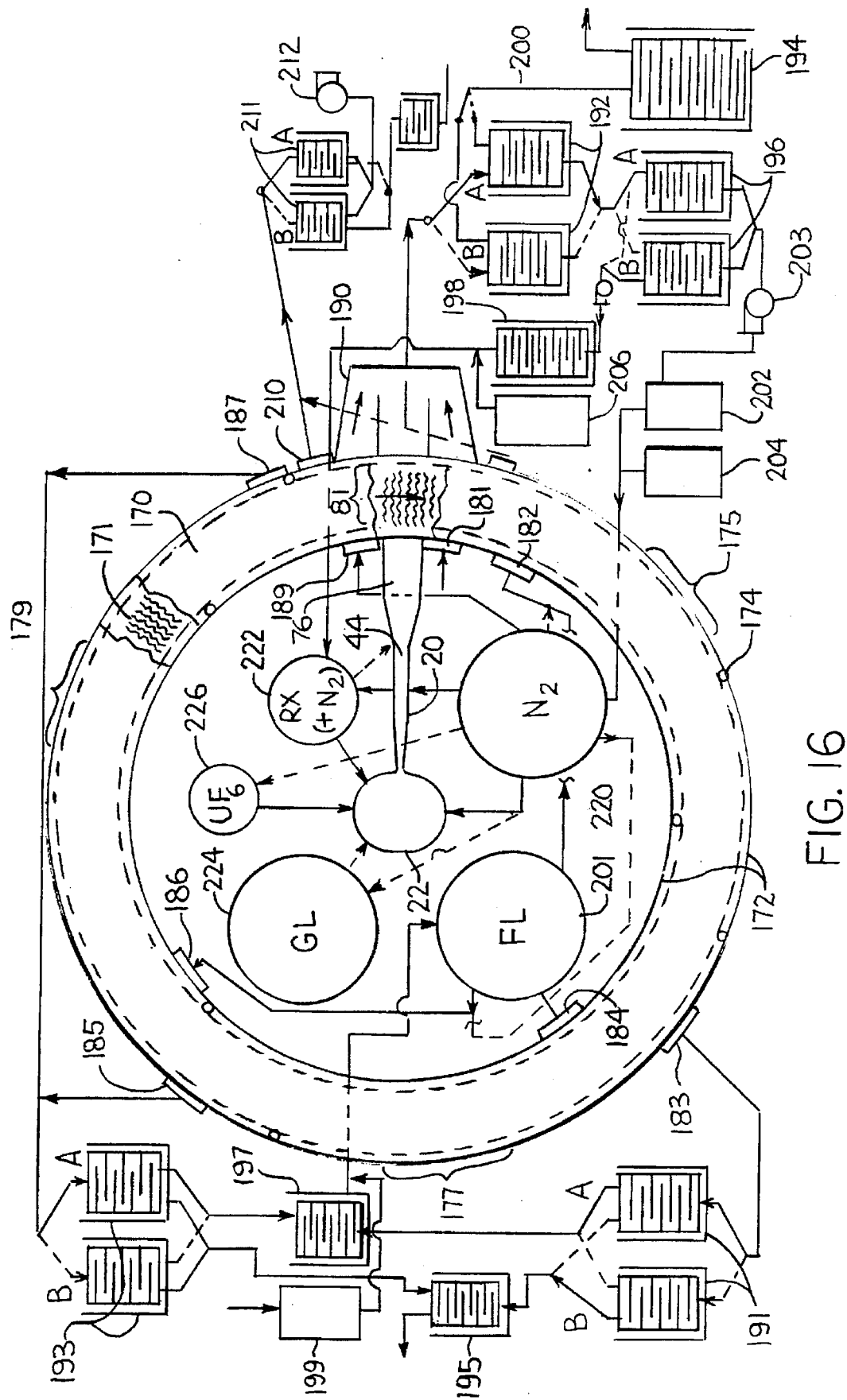
FIG. 16 shows a typical CRISLA process flow schematic, and a product collection wheel stacked with many parallel wavy or zigzag collector plates at its outer periphery, the wheel turning continuously on roller bearings inside a stationary housing to which the CRISLA nozzle and laser-irradiation chamber are attached, and passing through the CRISLA exhaust gas stream and product collection zone where its plates are oriented at a slight angle to the exhaust gas stream so as to cause rotation of the wheel by the stream's impulse, the set of plates in the collection zone collecting condensing enriched reaction product species $\{QF_m(X)\}_n$ as the stream passes over the plates, the wheel moving product-laden plates out of the collection zone to a nitrogen flush-out and a fluorination station, where after the nitrogen flush-out, a strong fluorinating gas is injected between the collector plates to refluorinate the precipitated enriched product back to gaseous enriched $QF_6$ and to re-passivate the cleaned-off collector plate surfaces, the product refluorination and surface repassivation operations being carried out three times as the wheel turns full circle while gaseous enriched $QF_6$ product and admixed fluorinating gases are pumped out three times and separated by differential freezers with the $QF_6$ transferred to a product tank, before the cleaned and repassivated plates return to the collection zone for another product harvesting cycle.

When large quantities of isotope must be separated as is the case in Uranium enrichment, the on-off technique becomes impractical and use of a continuous collection wheel as shown in FIG. 16 is preferable. In this method, a large number of passive or active collector plates 171 (wavy type 74 or zigzag type 72) are mounted on the periphery of a large wheel 170 which turns on roller bearings 174 inside a stationary housing 172, and which is hermetically attached to the CRISLA nozzle 20 and laser-irradiation chamber 44. As the wheel 172 rotates, collector plates 171 move into the gaseous exhaust from the diffuser/collection-entrance chamber 76, i.e., into the collection zone 81, allowing laser-irradiated CRISLA gases to pass over and between collector plates 171. The planes of the plates 171 are preferably mounted on the wheel at a slight angle so that in collection zone 81 there is an impulse from the gas stream on the plates 171 causing the wheel 170 to turn in a manner similar to what occurs in a turbine. Alternatively, the wheel 170 can be turned by an electric motor (not shown).

As collector plates 171 move through the collection zone 81, they pick up one to one thousand monolayers (depending on scrambling conditions) of precipitated condensed product in 0.1 to 100 seconds. After leaving the collection zone 81, the plates 171 pass by a nitrogen flushing station 181 which admits pure nitrogen from a supply tank 220 to the collectors. Then collector plates 171 rotate by a first fluorination station 182 that admits fluorinating gas FL, such as, for example, $F_2$, $ClF_3$, $XeF_2$, etc., from a supply tank 201 which may be diluted with nitrogen from supply tank 220. Both stations 181 and 182 are attached to stationary housing 172.

The nitrogen flush gas, after sweeping through the spaces between collector plates 171, is pumped to the tails exhaust chamber 190 and leaves the collector spaces at a (nitrogen) pressure on the order of 10 torr as the plates 171 enter first fluorination station 182. The FL/$N_2$ gas mix injected at the fluorination station 182 stays in the collector spaces for about a quarter of a wheel revolution to convert enriched product deposits to gaseous $^eUF_6$. During this time the wheel may be passed through a heating zone 175 to enhance the conversion rate if needed.

After the quarter-revolution exposure to FL, gaseous enriched product $^eUF_6$ together with the remaining FL/$N_2$ is pumped out through product collection station 183. The $^eUF_6$ is subsequently separated from the FL/$N_2$ in the differential freezers or cryotraps 191. While converting the product deposits on the collector surfaces to gaseous $^eUF_6$, the FL also passivates (i.e. fluorinates) the collector surfaces.

The process of fluorination is repeated two more times at fluorination stations 184 and 186. The gas injected at the respective fluorination stations 184, 186 is pumped out at corresponding product collection stations 185, 187. Between fluorination stations 184, 186 and corresponding product collection stations 185, 187 the gas trapped within wheel 170 is preferably heated in zones 177, 179, respectively. This should remove essentially all product deposits and alow adequate repassivation of the collector surfaces before they re-enter collection zone 81 for another product harvesting cycle. Just before the plates 171 re-enter collection zone 81, collector plates 171 are briefly exposed to a vacuum at station 210 which removes any residual gases by traps 211 and vacuum pump 212. Also a last nitrogen flush from station 189, exhausted through tails exhaust chamber 190, is provided before the collector plates start a new harvesting cycle.

FIG. 16 also shows a typical CRISLA process flow scheme which recycles the carrier gas M (usually $N_2$), unconsumed reactant RX and unconsumed fluorinating gas FL. The supply of carrier gas $N_2$ is stored in tank 220, reactant gas RX is stored in tank 222, a possible second auxilliary reactant GL is kept in tank 224, and the $UF_6$ feed is in tank 226, all of which are admixed in plenum 22, which is the source tank for the CRISLA process.

After passage of the mixed gases from plenum 22 through the slit nozzle 20, the laser-irradiation chamber 44, the collection-entrance or diffuser chamber 76, and the collection zone 81, the depleted $UF_6$, $N_2$, and unconsumed RX are exhausted to the tails collection system 200 via exhaust chamber 190. In the tails collection system 200, depleted $UF_6$ (which has the highest boiling point) is first trapped out in differential freezer 192, which passes RX and $N_2$, while RX is recovered in cryotraps 196 which passes the remaining $N_2$. The depleted $UF_6$ is transferred to a final tails storage tank 194, the RX is recycled to the RX feed tank 222 after passage through an interim RX recycle tank 198, while the $N_2$ carrier gas is returned via tank 202 to the original $N_2$ feed tank 220 through a compressor 203.

For enriched $^eUF_6$ product collection, similar techniques are used which transfer the $^eUF_6$ product from traps 191 and 193 to a final $^eUF_6$ product tank 195, and recycle the $FL/N_2$ gas to interim tank 197 which returns the FL to the supply tank 201. Make-up tanks 204 for $N_2$, 206 for RX, and 199 for FL are placed at strategic positions in the flow circuit to insure a continuous supply of consumed or lost ($N_2$) gases.

The flow of all gases is monitored and regulated by an electronic process flow control system. To maintain a continuous process, it is necessary to employ double trap-tanks "A" and "B" at a number of points in the flow circuit so that after filling one trap-tank, one can switch the flow to a second trap-tank to pump out the collected material from the first tank for storage elsewhere, and vice versa.

The advantage of using a collection wheel is that product harvesting, i.e. refluorination of deposited $UF_m(X)$ back to gaseous $UF_6$, can be done for suitably long times and at optimum temperatures away from the collection zone which thereby can be operated continuously to collect rapidly precipitating product.

Instead of "on-off" or "collection wheel" product harvesting, a third technique is to inject particles into the exhaust gas stream at the beginning of the diffuser, entrance chamber 76 or collection zone 81. As mentioned, collection particles are generally between 0.1 and 100 μm in diameter and made of a suitable material used in the chemical process industry, such as porous or solid Ni, Pt, Pd, Cu, Al, Carbon, Alumina, Teflon, etc. The particle surfaces are properly passivated (i.e. fluorinated) to repel non-polar $UF_6$, but allowing polar polymerizing $\{^eUF_m(X)\}_n$ product species to condense out on them. After collecting product while moving with the gas stream through the collection zone 81, the particles are recaptured on a screen at the exhaust end of the collection zone. The particle-covered screen is moved continuously through (or intermittently in and out of) the collection zone exit region. Once outside, the particles are blown or shaken off the screen and subsequently subjected to hot fluorinating gas or a leaching agent that removes the enriched product from the particle surfaces. The particles are then repassivated and reused in another product harvesting cycle.

One great advantage of using re-usable particles for product collection is that the period for removal of surface-deposited product is flexible. It can cover whatever time is required for product regassification and surface repassivation since the particle inventory can be adjusted as needed. Although a product wheel also allows some adjustments in harvesting time by changes in wheel size, FL pressures and "cooking" temperatures, there is generally less flexibility than in the case of collection by particles. Only by extensive testing of the two methods is it possible to determine which approach is most economic in a particular application.

Although $UF_6$ was used as an example in the above discussions, other hexafluorides $QF_6$ can be substituted of course and the Q isotopes separated by the same general techniques.

Figure 17A:
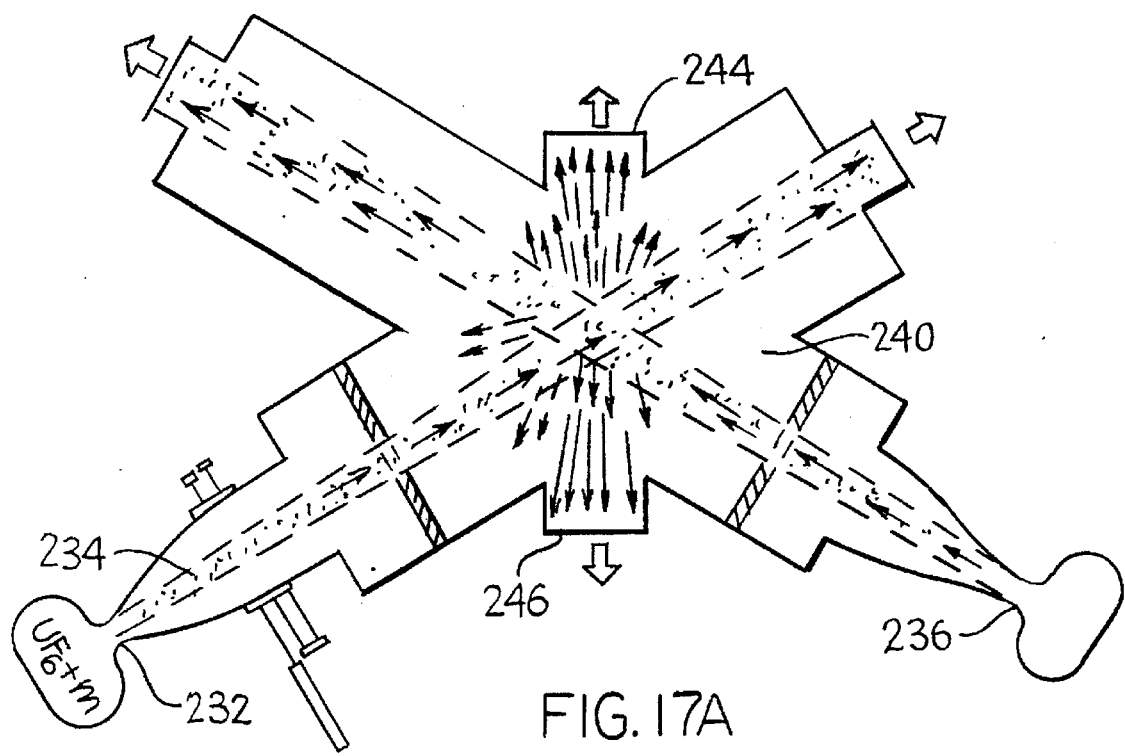
FIGS. 17A and 17B illustrate CRISLA operations using intersecting low-pressure expanding beams or jets of supercooled gaseous reactant(s) and laser-excited $UF_6$, the reactant(s) being supplied in either a cross-flowing beam or jet or being bled through a porous or perforated surface on which the beam or jet of supercooled laser-excited $UF_6$ impinges.
Figure 17B:
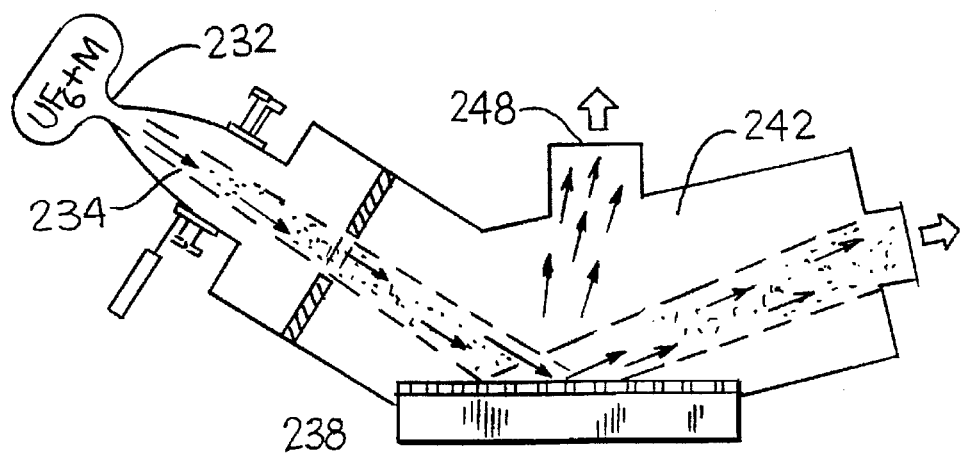
Figure 18:
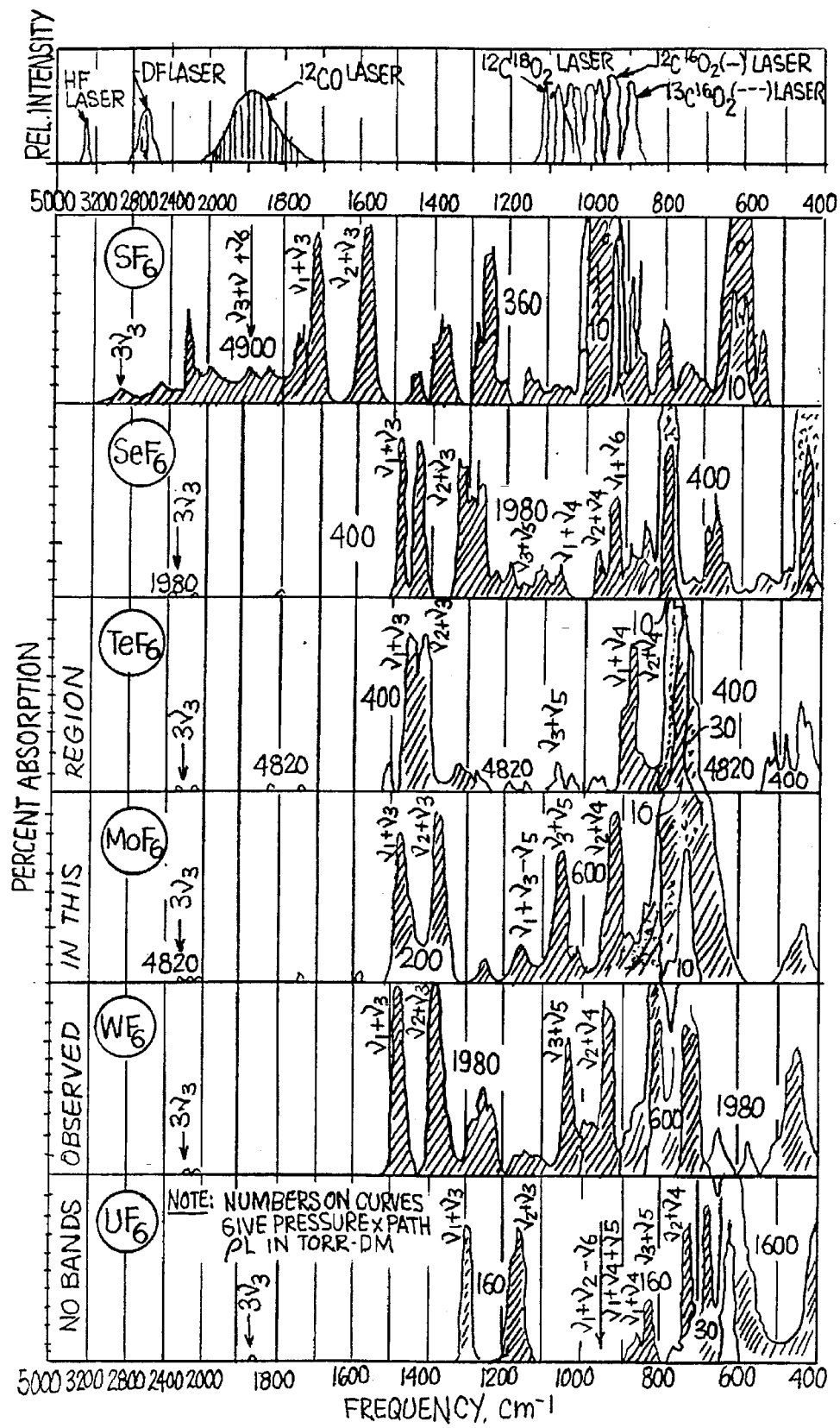
FIG. 18 compares available HF, DF, CO, and $CO_2$ laser emissions with the infrared spectra of six gaseous hexafluorides $^iQF_6$, whose isotopes $^iQ$ can be separated by the CRISLA process.

As shown in FIGS. 17A and 17B, if $UF_6$+carrier gas M is expanded through a nozzle or orifice 232 to total pressures below ~$10^{-3}$ torr (such that the collision mean-free-path is less than ~10 cm), a stream or jet 234 of such a gas can be directed to intercept and traverse through a similarly prepared (by expansion through a nozzle or orifice 236) stream or jet 237 of a reactant gas RX, or strike a surface 238 covered with RX or having RX flowing there through. If the $UF_6$ is sufficiently excited, a fraction of the $UF_6$ will collide with RX molecules and react while intersecting the RX stream 237 or surface layer 238. As discussed above, the supercooled $UF_6$ is isotope-selectively laser-irradiated before its entry into the low-pressure interaction chamber 240 or 242. Because products formed in some reactions of $UF_6$ with RX leave the reaction in certain preferred directions relative to the $UF_6$ flow velocity vector, and because most of them will travel 10 cm or more without a collision, the products can be collected and separated from unreacted $UF_6$ and RX by providing special product "catching" ports 244 and 246 positioned off chamber 240, as illustrated in FIG. 17A or special product "catching" port 248 positioned off chamber 242 as illustrated in FIG. 17B. The major disadvantage of the low-pressure CRISLA scheme shown in FIGS. 17A and 17B is that Uranium throughputs are very low (~1000 times less) compared to a CRISLA process that uses the techniques illustrated in FIGS. 10 through 16, which generally allow total gas pressures between $10^{-1}$ and $10^4$ torr in the enrichment modules. Nevertheless, the low-pressure beams technique may find applications in basic CRISLA research.

In addition to the $CO_2$ and CO lasers shown in Table I, other lasers such as BrF, ClF, HF, DF, $NH_3$, $ND_3$, $SF_6$, $UF_6$, HCl, DCl, HBr, DBr, CN, NOCl, NSF, $NO_2$, HCN, DCN, COS, $CS_2$, $H_2O$, $D_2O$, HDO, $CF_4$, $BCl_3$, $C_2H_2$, $C_2D_2$, CS, ClO, $Cl_2O$, HD, and other molecular lasers, as well as neon, argon, krypton, xenon ion lasers, $H_2$, $D_2$, $Br_2$, $Cl_2$, $Br_2$, $F_2$, $I_2$, ClF, BrF, IF, BrCl vibronic lasers, excimer lasers, free-electron lasers, and other types of lasers may also be used, either singly or in combination, to provide isotope-selective laser-pumped excited $UF_6$ with pumped energies sufficient for the promotion of a laser-enhanced chemical reaction. Laser pumping with these lasers may be provided in one, two, three, or more steps by one, two, three, or more laser photons of different or the same frequencies, delivered sequentially, simultaneously, or partially overlapping in time. The lasers may be operated continuously or they may be pulsed and their beams may be focused or unfocused to provide any desired intensity. Laser frequencies may be doubled or tripled, or frequency-mixed and/or-shifted in appropriate enharmonic crystals or Raman cells, to provide the desired outputs for $UF_6$ pumping.

Besides laser excitation and population of purely rovibrational energy levels, the laser excitation and population of vibronic energy levels may be employed successfully in a CRISLA process. A table similar to Table I can be prepared for such vibronic energy levels. The laser, in such a case, must be selected to provide, ultimately, a photon frequency corresponding to the desired vibronic energy level changes. U.S. Pat. No. 4,082,633 describes additional means for effecting isotope-selective excitations for use in a CRISLA process.

So far emphasis was placed on lasers that would preferentially excite $^{235}UF_6$, but $^{238}UF_6$ can be excited selectively equally well in a CRISLA process. Most Uranium enrichment applications require the enrichment of natural Uranium with $^{238}U/^{235}U=140$ to reactor-grade Uranium fuel with $^{238}U/^{235}U=20$ to 30, and therefore much less process work is required to remove $^{235}U$ from a natural $^{235}U-^{238}U$ mixture than $^{238}U$. However, for the isotope separation of Uranium with a feed of $^{238}U/^{235}U \leq 1$, clearly it would be better to laser-excite $^{238}UF_6$ rather than $^{235}UF_6$ in CRISLA. Also, if a much better laser-frequency match from a very strong laser can be found to excite $^{238}UF_6$ rather than $^{235}UF_6$, it might be advantageous to use the CRISLA process with selective laser excitation of $^{238}UF_6$ instead of $^{235}UF_6$.

Although $UF_6$ has been discussed primarily as the gaseous Uranium-bearing molecule in CRISLA, other molecules such as gaseous $UF_5Cl$, $U(BH_4)_4$, $U(BH_4)_3$ $(BH_3CH_3)$, U—HC, and $UO_2$—HCl, where —HC is some hydrocarbon or organic complex, may be used as well. In one CRISLA application for example, $UF_6$ might be intermixed with gaseous $BCl_3$ or $TiCl_4$ and a second reactant RX (e.g., HBr) just upstream of the nozzle. This causes the nearly instant production of $UF_5Cl$ which after supersonic expansion may be laser-irradiated and reacted with RX after isotope-selective excitation of $^{235}UF_5Cl$. The reaction product would be mostly $^{235}UF_4$, which would have to be kept separate (or separable) from precipitating $^{238}UF_5Cl$ and its decay product (usually $^{238}UF_5$) in the collection chamber. Since compounds other than $UF_6$ have different absorption resonances and isotope shifts, different laser frequencies generally would be needed to effect isotope-selective laser excitations. With the possible exception of $UF_5Cl$, to date only $UF_6$ appears to provide a practical gaseous Uraniferous molecule for use in a large-scale CRISLA enrichment process.

At present, the isotope enrichment of Uranium is the largest isotope separation endeavor in the world. However in radio-medicine, scientific research, and some industries, there are requirements for the isotopes of such elements as I, Pd, Ir, Re, Tc, Y, Pu, W, Zr, Te, Se, Cd, Hg, In, Zn, and many others. Many of these elements form volatile tetra- and hexa-halides ($MX_4$ or $MX_6$ with X=F, Cl, Br, I) or other volatile compounds and the CRISLA techniques for $UF_6$ can be equally applied and extended to the separation or enrichment of one or more isotopes of these elements.

Table II lists some volatile hexafluorides of isotopes other than uranium suitable for the CRISLA separation process and Table III lists still other volatile isotopic molecules that are candidates for the use of the CRISLA isotope separation process.

TABLE II

VOLATILE HEXAFLUORIDES SUITABLE FOR THE CRISLA ISOTOPE SEPARATION PROCESS.

| Ave. Mass of M (amu) | Molecule $QF_6$ | M.P./ B.P. (°C.) | $v_3 + v_5$ Band[*] Centr $cm^{-1}$ | Nearby $CO_2$ Laser Line $(cm^{-1})$[] | Isotope Application[*] |
|---|---|---|---|---|---|
| 78.96 | $SeF_6$ | −39/−35 | 1040 | 9P(28); 1039 | Industrial/Research |
| | | | $v_1 + v_4$ | | |
| 95.94 | $MoF_6$ | 17/35 | 1059 | 9P(6); 1059 | Indst/Radiomedicine |
| 98 | $TcF_6$ | | 1045 | 9P(22); 1045 | Radiomedicine (r) |
| 101.1 | $RuF_6$ | | 1018 | 9P(48); 1019 | Radiomedicine/Resch |
| 102.9 | $RhF_6$ | | 993 | 9P(28)[13]; 993 | Radiomedicine (r) |
| 127.6 | $TeF_6$ | −35/−36 | 1066 | 9R(2); 1066 | Radiomed/Industrial |
| 131.3 | $XeF_6$ | | 1050 | | Radiomed/Industrial |
| 183.9 | $WF_6$ | 2.5/20 | 1031 | 9P(36); 1032 | Radiomed/Industrial |
| 186.2 | $ReF_6$ | 26/48 | 1010 | 9P(10)[13]; 1010 | Radiomedicine |
| 190.2 | $OsF_6$ | 32/46 | 996 | 9P(24)[13]; 996 | Research |
| 192.2 | $IrF_6$ | 44/53 | 986 | 10R(38); 987 | Research/Radiomed. |
| 195.1 | $PtF_6$ | | 947 | 10P(16); 948 | Radiomed/Research |
| 238 | $UF_6$ | sub/56 | 826 | $CO_2/NH_3$[***] | Nuclear Fuel |
| 237 | $NpF_6$ | | 832 | $CO_2/NH_3$[***] | Research |
| 244 | $PuF_6$ | | 827 | $CO_2/NH_3$[***] | Nuclear Fuel |
| 243 | $AmF_6$ | | 830 | $CO_2/NH_3$[***] | Industrial/Research |

[*] All wavenumber entries are for the $v_3 + v_5$ band except for $SeF_6$. The strong fundamental $v_3$ bands of most hexafluorides lie between 600 and 860 $cm^{-1}$ where the CO and $CO_2$ "workhorse" IR lasers do not emit. Only the more complicated and expensive $H_2$- or $NH_3$-Raman-shifted $CO_2$ laser can provide emissions in the 600–860 $cm^{-1}$ region. The $CO_2$ laser emissions do overlap with many of the binary $v_1 + v_4$, $v_2 + v_4$, and $v_3 + v_5$ bands of the medium-heavy hexafluorides however. Of these three, the $v_3 + v_5$ band has the highest isotope-shifts and is usually preferred in CRISLA unless this band misses the $CO_2$ laser emissions (e.g. $SeF_6$). Though the binary bands absorb more weakly than the $v_3$ fundamentals, they are usually adequate for most CRISLA work.

[**] 9R(2) stands for the R(2) laser line from the $001 \rightarrow 020$ emission band of $CO_2$ in the 9 µm wavelength region. 10P(16) designates the P(16) line from the $001 \rightarrow 100$ $CO_2$ emissions around 10 µm. Superscript [13] indicates that the laser line is from $^{13}CO_2$. Many $^iQF_6$ molecules have several isotopes $^iQ$, and a nearby $CO_2$ laser line other than the indicated one must be used to separate $^iQF_6$.

[***] The designation (r) indicates that only radioactive isotopes require separation. CRISLA can of course be used to separate naturallly occurring stable isotopes prior to neutron irradiation and transmutation, as well as for separating post-neutron-irradiated radioactive isotopes.

[****] $CO_2/NH_3$ indicates that a $CO_2$-laser-pumped or -shifted $NH_3$ laser must be used.

TABLE III

MISCELLANEOUS VOLATILE ISOTOPIC MOLECULES THAT MAY BE SUITABLE FOR ISOTOPE SEPARATION BY THE CRISLA PROCESS.

| Ave. Mass of M (amu) | Molecule QZ | M.P./B.P. or Sub. P. (°C.) | Absorption Band*⁾ ($cm^{-1}$) | Nearest CO/$CO_2$ Laser Line ($cm^{-1}$)**⁾ | Isotope Application***⁾ |
|---|---|---|---|---|---|
| 10.8 | $BCl_3$ | −107/12.5 | 944 ($v_3$) | 10P(20); 944 | Res/Ind. |
| 32.07 | $SF_6$ | −56/−63.5 | 939 ($v_3$) | 10P(26); 939 | Res/RadM |
| 47.88 | $TiCl_4$ | −30/136.4 | 1001 ($v_1 + v_2 + v_3$) | 9P(20)¹³; 1001 | Ind/RadM |
| 52.0 | $Cr(CO)_6$ | subl 295 | 1049 ($v_2 + v_7$) | 9P(18); 1049 | Ind/RadM |
| 52.0 | $CrO_2Cl_2$ | −96.5/117 | | | Ind/RadM |
| 55.85 | $Fe(CO)_5$ | −21/102.8 | | | RadM/Ind |
| 58.69 | $Ni(PF_3)_4$ | −55/71 | 1022 ($2v_{15}$) | 9R(4)¹³; 1021 | RadM/Ind |
| 58.69 | $Ni(CO)_4$ | −25/43 | 1840 ($v_1 + v_{13}$) | CO:11(11) 1841 | RadM/Ind |
| 65.38 | $Zn(CH_3)_2$ | −42.2/46 | 1914 ($v_7 + v_9$) | CO:8(12) 1914 | Industr. |
| 78.92 | $SeO_2F_2$ | 4.6/124 | 1059 ($v_6$) 973 ($v_1$) | 9P(6); 1059 10R(16); 973 | Ind/RadM |
| 95.94 | $MoOF_4$ | 98/180 | 1045 ($v_1$) | 9P(22); 1045 | RadM/Ind |
| 106.42 | $Pd(PF_3)_4$ | −41/20d | 1025 ($2v_{15}$) 1825 ($2v_{13}$) | 9R(8)¹³; 1024 CO:11(15) 1826 | Radiomed |
| 112.4 | $CdI_2$ | 3.88/713 | ~920 ($3v_3$) | 10P(44); 921 | Ind/RadM |
| 114.8 | $InI_3$ | 210/550 | ~920 ($3v_3$) | 10P(44); 921 | Radiomed |
| 114.8 | $InCl_3$ | subl 300 | 1000 ($3v_3$) | 9P(20)¹³; 1001 | Radiomed |
| 127 | $IF_7$ | subl 4.5 | 1056 ($v_5 + v_8$) | 9P(10); 1056 | Radiomed |
| 195.08 | $Pt(PF_3)_4$ | −15/86 | 1036 ($2v_{15}$) 1860 ($v_1 + v_{13}$) | 9P(32); 1035 CO:9(19);1860 | RadM/Ind |

*⁾Band identifications (in parentheses) are only tentative. Most listed molecules have several bands in the $CO_2$ or CO laser emission ranges. Only one band and corresponding CO or $CO_2$ laser line is listed here for each molecule (except for $Pt(PF_3)_4$), which may or may not be the best one for isotope separation. Only actual experimentation can establish which one of several choices is best.

**⁾The 9 in 9R(6) and 10 in 10P(10) designate the R(6) and P(10) lines from respectively the 001→020 and 001→100 vibrational laser transition bands of $CO_2$. Superscript ¹³ indicates a laser line of ¹³$CO_2$. For the CO laser, 11(15) stands for the P-15 line from the 11→10 vibrational transition.

***⁾Ind = Industrial; Res = Research; RadM = Radiomedical.

---

The coreactant(s) RX used in CRISLA which undergo(es) reaction (8) with laser-excited $UF_6^{v*}$ (where $^{v*}$ designates a general vibrational excitation with 1, 3, 12, 25, or any number of quanta), can be any one or several of the general classes of molecular or atomic species that can be fluorinated by $UF_6$ (i.e., which can remove one or more F atoms from $UF_6$). Representative species RX from this class that have been found useful are: $H_2$, $CH_4$, $SiH_4$, $GeH_4$, $AsH_3$, $NH_3$, $H_2O$, $H_2S$, HCl, HBr, HI, $SiBr_4$, $SiCl_4$, $GeCl_4$, $TiCl_4$, $AsCl_3$, $BCl_3$, $CrO_2Cl_2$, $SO_2Cl_2$, NOCl, NOBr, $Br_2$, $Cl_2$, $I_2$. Also mixed halides such as $SiCl_mF_{4-m}$, $SiBr_mF_{4-m}$, or partially hydrogenated species like $SiX_mH_{4-m}$ with X=F, Cl, Br, or I may be substituted or added in place of $SiCl_4$, $SiBr_4$, or $SiH_4$. Here m=3, 2, or 1. Similarly coreactants with C or Ge substituted for Si and various higher hydrocarbons also may be used effectively.

In many reactions, a complex $UF_6^{v*}$:RX is formed briefly which then decomposes to form a Uranium-carrying product other than $UF_6$. While in the complex state, a second (same or different) coreactant species MY or RX may attach to or impinge on the complex to promote the decomposition of the complex into new product molecules. Such reactive interaction events between laser-excited $UF_6^{v*}$ and coreactants RX (and MY) can happen in the bulk gas (three dimensions) or on catalyst particle surfaces or collector surfaces (two dimensions).

Although not consumed in the reaction, inert gases such as He, Me, Ar, Kr, Xe, $N_2$, $O_2$, may be usefully employed to form temporary complexes and/or excimers with $UF_6$, either alone or together with another coreactant RX, thereby aiding the overall reaction or decomposition of laser-excited $UF_6^{v*}$ or complexes $UF_6^{v*}$:RX, or they may provide pure inelastic collisions necessary to "kick over" a reaction in a Uranium-bearing complex. For example, the following CRISLA reactions can be used with the following (postulated) reaction steps, after $UF_6$ is isotope-selectively excited to $^eUF_6^{v*}$ (pre-superscript e means preponderantly 235) by laser irradiation:

 (11a)

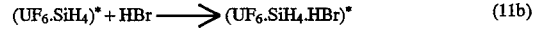 (11b)

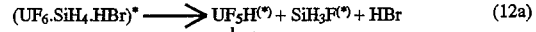 (12a)

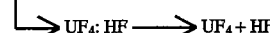

 (12b)

In reactions (11) and (12), C can be substituted for Si, that is methane for silane. However, $^eUF_6^{v*}$ should be sufficiently excited in this case (for example by one 5.3 μm isotope-selective CO laser photon and ten or so 9 μm $CO_2$ laser photons) since more "rearrangement activation energy" is required for a reaction between $UF_6$ and $CH_4$ than for one between $SiH_4$ and $UF_6$ (the latter reaction can be satisfactorily activated with one 5.3 μm laser photon). Also HBr could be left out in (11) and (12) but it has been found to catalyze the (very slow) $UF_6+SiH_4$ reaction, speeding it up ten- to one-hundred-fold. Any three adjacent F atoms of the six F atoms on $UF_6$ can fit very nicely between three H atoms on $SiH_4$ (or $CH_4$) that form one of the four sides of tetrahedral $XH_4$, hence the postulated complex formation in (9a) as a first step. However it is also possible that HBr first forms a complex with $UF_6$ followed by an attachment to $SiH_4$. When both HBr and $SiH_4$ are present as coreactants with $UF_6$, it has been found that $SiH_4$ is mostly consumed and very little, if any, HBr is consumed.

Without the presence of $SiH_4$, HBr seems to react with $UF_6$ according to the scenario:

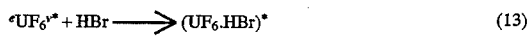

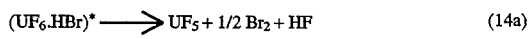

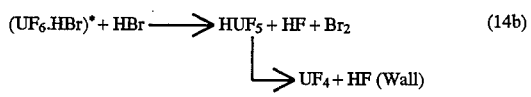

This reaction is found to be approximately three times slower than reaction (11)+(12), but ten times faster than the reaction of HCl with $UF_6$.

The reaction of $UF_6$ with HCl seems to proceed according to the steps:

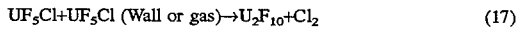

The steps shown in reaction scenarios (11) through (17) are postulated based on experimental observations of the IR spectra of product molecules and their growth (e.g., $SiH_3F$ and $UF_5Cl$). Wall reactions can sometimes modify the chain of events but even without detailed knowledge of all reaction steps, the CRISLA process may be practiced successfully with one or more reactants RX discussed earlier and those reviewed in reaction scenarios (11) through (17), provided suitable operating conditions are established.

In CRISLA applications where a supersonic nozzle is used, it is possible to isotope-selectively excite $UF_6$ in the supersonic laser irradiation chamber and have $^eUF_6^{\nu*}$ impinge on a downstream collector surface or on the surfaces of downstream-injected catalyst particles, with its isotope-selective excitation still intact. This is possible because of the short travel time (~0.1 ms) as the $UF_6$ passes from the irradiation zone to the collector chamber. During this journey, $^eUF_6^{\nu*}$ will experience about 5000 collisions and it takes, on average, 20,000 collisions for an excited $^eUF_6^{\nu*}$ molecule to loose a $\nu_3$ quantum due to a VT transfer event. A suitable isotope-specific surface-catalyzed reaction may then be promoted by providing reactant RX (and/or MY) at the surface that is passed through a porous or perforated wall of an active collector plate, or by preparing thin coats of (possibly organic) reactive agents on collector surfaces or catalytic dust particles that will react preferentially with laser-excited $^eUF_6^{\nu*}$ and much less or not at all with unexcited cold $UF_6$. This technique would avoid the need for gaseous mixing of RX with $UP_6$ in the nozzle or feed chamber and may be more economic. In general, any one of the reagents RX discussed above could be used in such surface-promoted reactions, but a particularly effective scheme is to provide atomic H or X (X=Cl or Br) as a surface reactant. In certain metals such as Palladium, Nickel, or Gold, H atoms can migrate freely through the metal in the form of very small protons that can dwell near the metal surface in large numbers. Thus some particularly effective surface reactions can be:

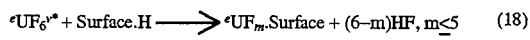

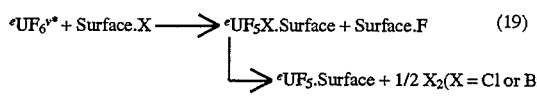

These reactions are examples and other equally effective surface reactions may be promoted using other surface reactants or radicals in place of H, Cl, or Br.

An important isotope used in nuclear medicine is radioactive $^{99}Mo$ ($\tau_{1/2}$=2.8 days). $^{99}Mo$ decays into $^{99m}$Technetium ($\tau_{1/2}$=6 hours), which is widely used as a medical tracer because of its short half life. The specific gamma emission by $^{99m}Tc$ is readily detected and can be used to form images of internal organs or tumors where it accumulates. $^{99m}Tc$ can be readily incorporated in various organic complexes for such applications and it has relatively benign decay products, which are eliminated by the body. Since the half lives of $^{99}Mo$ and $^{99m}Tc$ are short, it is uneconomic to store $^{99}Mo$ for more than a few days before the $^{99m}Tc$ is harvested. Therefore $^{99}Mo$ is created in a nuclear research reactor and quantities are separated daily sized to the market needs. The material is shipped in $^{99}Mo$ "cows". The cows have a bed of $^{99}Mo$-loaded granules that can be chemically leached or "milked" with a special liquid that extracts the continuously produced $^{99m}Tc$ from the radioactively decaying $^{99}Mo$. At present $^{99}Mo$ is chemically separated from the fission products of fissioned uranium and contains traces of other undesirable fission products.

A "direct route" to obtain $^{99}Mo$ is to irradiate $^{98}Mo$ or natural Mo {$^{92}Mo$ (14.84%); $^{94}Mo$ (9.25%); $^{95}Mo$ (15.92%); $^{96}Mo$ (16.68%); $^{97}Mo$ (9.55%); $^{98}Mo$ (24.13%); $^{100}Mo$ (9.63%)} with neutrons in a high-flux nuclear reactor to convert the $^{98}Mo$ into $^{99}Mo$:

$$^{98}Mo + n \xrightarrow{(\sigma_a = 0.13\ b)} {}^{99}Mo \qquad (20)$$

Since $^{99}Mo$ decays with a half life of 2.8 days, an increasing amount is lost as it is being produced while its quantity increases. The ratio of $^{98}Mo$ to $^{99}Mo$ during neutron irradiation is given by:

$$\frac{^{98}Mo}{^{98}Mo} = \frac{k_{na}}{k_d}\{1 - \exp(-k_d t)\} \to \frac{k_{na}}{k_d}, \text{ for } t \to \infty \qquad (21)$$

Here:

$$k_{na} = \text{Neutron Absorption Rate} = \phi_n \sigma_a = \frac{9.12 \times 10^{-6}}{\text{day}}, \qquad (22)$$

and $$k_d = 0.698/\tau_{1/2} = 0.25/\text{day}. \qquad (23)$$

In (22), a typical neutron flux of $\phi n = 8 \times 10^{14}$ n cm$^{-2}$ s$^{-1}$ is assumed and for $^{98}Mo$, $\sigma_a = 0.132 \times 10^{-24}$ cm$^2$. For an irradiation time of 7 days, one finds, for example, from (21) that:

or ~33,000 atoms of $^{98}Mo$ for every atom of $^{99}Mo$. For typical irradiations of 100 grams of $^{98}Mo$, approximately 3 mg of $^{99}Mo$ are therefore produced after 7 days of neutron irradiation. Much longer irradiation times can only produce 3.6 mg of $^{99}Mo$ in 100 grams of $^{98}Mo$, and are basically a waste of reactor time.

The desired radioactive $^{99}$Mo can be separated from the $^{98}$Mo by the CRISLA process in the same manner as $^{235}$U is separated from $^{238}$U, namely by supersonic expansion and cooling of MoF$_6$ to T≦100° K so that the Q-branch absorption peaks of the two isotope species are separated.

MoF$_6$ can be made directly by reacting F$_2$ and pure Mo powder in a nickel or monel tube at 600° to 700° C. for a few minutes. Of the various isotope-sensitive absorption bands of MoF$_6$, the $v_3+v_5$ is the most promising because it overlaps the 9 μm laser band of CO$_2$. For $^{99}$MoF$_6$ at T≦100° K, the Q-peak of $v_3+v_5$ is approximately at 1056.3 cm$^{-1}$, which is near the 9P(10) laser line of $^{12}C^{16}O_2$ at 1055.62 cm$^{-1}$ or the 9P(21) line of $^{12}C^{18}O^{16}O$ at 1056.04 cm$^{-1}$. The Q-peak of $^{98}$MoF$_6$($v_3+v_5$) is 1 cm$^{-1}$ higher at ~1054.6 cm$^{-1}$. This isotopic separation is more than adequate for CRISLA so long as the MoF$_6$ gas is supercooled to T≦100° K. Closer coincidence of the $^{99}$MoF$_6$ Q-absorption peak with a CO$_2$ laser line can be achieved by microwave-shifting of the laser frequency and/or by using high pressure CO$_2$ lasers that pressure-broaden the laser lines.

Using the above described CRISLA techniques, therefore the isotope-selective excitation:

$$^{99}MoF_6 + hv_L(1056.3\ cm^{-1}) \rightarrow {}^{99}MoF_6^{**}(v_3+v_5) \tag{25}$$

A directly following booster excitation:

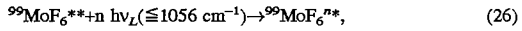
$$^{99}MoF_6^{**} + n\ hv_L(\leq 1056\ cm^{-1}) \rightarrow {}^{99}MoF_6^{n*}, \tag{26}$$

and chemical reaction would produce:

$$^{99}MoF_6^{n*} + RX \rightarrow {}^{99}MoF_{6-m}X\downarrow n + RF_m. \tag{27}$$

Thus there has been shown and described novel processes and apparatus for isotope separation that fulfill all of the objects and advantages sought therefor. Many changes, alterations, modifications and other uses and applications of the subject invention will become apparent to those skilled in the art after considering the specification and the accompanying drawings. All such changes, alterations and modifications that do not depart from the spirit and scope of the invention are deemed to be covered by the invention, which is limited only by the claims that follow.

What is claimed is:

1. A system for the separation of isotopic molecules having at least two isotopes of the same atom therein, including:

a source of the isotopic molecules in gaseous form at at least a first pressure;

a source of carrier gas at at least said first pressure;

a supersonic nozzle structure connected to said sources and having:

a nozzle throat through which the gaseous isotopic molecules and carrier gas introduced up stream thereof at said at least first pressure flow sonically; and an expansion chamber positioned downstream from said nozzle throat shaped so that the gaseous isotopic molecules and carrier gas become supersonic and supercooled thereat, said expansion chamber including:

means to selectively excite, from a first energy level to at least a second energy level, first isotopic molecules having a desired isotope therein with photons of at least a first wavelength while the first isotopic molecules are in said expansion chamber;

means to mix at least one reactant gas with excited isotopic molecules so that said at least one reactant gas chemically reacts with excited isotopic molecules to form a compound;

collection chamber means positioned downstream from said expansion chamber, said expansion chamber and said collection chamber means having:

walls generally parallel to flow through said nozzle throat; and means to gaseously shield the excited isotopic molecules from said walls.

2. The system for isotope separation as defined in claim 1 wherein said collection chamber means have a shock therein when said system for isotope separation is operating, said means to mix at least one reactant gas introducing the at least one reactant gas at a location in said collection chamber means to form the shock thereat and to affect said mixing with excited first isotopic molecules.

3. The system for isotope separation as defined in claim 1 wherein said collection chamber means further include:

at least one surface positioned for impingement on by the compound for collection; and means allowing the compound to be intermittently removed from said at least one surface.

4. The system for isotope separation as defined in claim 1 further including:

at least one plenum connecting said sources so that the gaseous isotopic molecules and carrier gas feed into said plenum, wherein said means to mix at least one reactant gas introduce the at least one reactant gas in said plenum.

5. The system for isotope separation as defined in claim 1 wherein said means to mix at least one reactant gas introduce the at least one reactant gas in said expansion chamber.

6. The system for isotope separation as defined in claim 1 wherein said means to mix at least one reactant gas introduce the at least one reactant gas in said expansion chamber upstream of said means to selectively excite first isotopic molecules.

7. The system for isotope separation as defined in claim 1 wherein said compound is a condensing compound and wherein said collection chamber means further include:

at least one surface positioned for impingement on by the condensing compound for collection;

means providing a reagent adjacent said at least one surface to further reduce the condensing compound to a back reaction resistant compound; and means for removing the back reaction resistant compound from said at least one surface.

8. The system for isotope separation as defined in claim 7 wherein said means for removing the back reaction resistant compound from said at least one surface include:

an organic coating on said at least one surface.

9. The system for isotope separation as defined in claim 7 wherein said means for removing the back reaction resistant compound from said at least one surface include:

a hot fluorinating agent.

10. The system for isotope separation as defined in claim 9 wherein said fluorinating agent is a gaseous fluorinator chosen from the group consisting of:

F$_2$;

ClF$_3$;

IF$_7$;

BrF$_3$; and

XeF$_2$.

11. The system for isotope separation as defined in claim 1 wherein said compound is a condensing compound and wherein said collection chamber means further include:

at least one surface passivated with fluorine positioned for impingement on by the condensing compound for collection;

means providing a reagent adjacent said at least one surface passivated with fluorine to further reduce the condensing compound to a back reaction resistant compound; and means for removing the back reaction resistant compound from said at least one surface passivated with fluorine.

12. The system for isotope separation as defined in claim 1 wherein the isotopic molecules are $UF_6$ and wherein the first isotopic molecules to be excited are $^{235}UF_6$, said means to selectively excite $^{235}UF_6$ including:

a laser system having:

at least one first 16 µm laser fine tuned to produce photons directed at the $UF_6$ to selectively excite the $^{235}UF_6$ to the $1v_3$ vibrational level;

at least one second 16 µm laser fine tuned to produce photons directed at the $UF_6$ to excite the $1v_3$ excited $^{235}UF_6$ to the $2v_3$ level; and at least one booster laser selected from the list of lasers consisting of:

a third 16 µm laser;

a 8 to 11 µm laser, to produce photons directed at the $UF_6$ to excite the $2v_3$ excited $^{235}UF_6$ to a higher vibrational level having at least four vibrational quanta; and a plurality of mirrors to pass photons produced by each of said lasers across said expansion chamber multiple times.

13. The system for isotope separation as defined in claim 1 wherein the isotopic molecules are $UF_6$ and wherein the first isotopic molecules to be excited are $^{235}UF_6$, said means to selectively excite the $^{235}UF_6$ including:

at least one 5.3 µm laser producing photons directed at the $^{235}UF_6$ to be selectively excited; and a plurality of mirrors to pass photons produced by said at least one 5.3 µm laser across said expansion chamber multiple times to excite the $^{235}UF_6$ to the $3v_3$ vibrational level.

14. The system for isotope separation as defined in claim 13 wherein said means to selectively excite the $^{235}UF_6$ further include:

at least one 8 to 11 µm laser producing photons directed at the $^{235}UF_6$ to be selectively excited, said plurality of mirrors also passing photons produced by said at least one 8 to 11 µm laser across said expansion chamber a plurality of times to excite the $3v_3$ excited $^{235}UF_6$ to a higher vibrational level with at least five vibrational quanta.

15. The system for isotope separation as defined in claim 1 wherein said means to gaseously shield the excited isotopic molecules from said walls include:

means to direct a flowing barrier of inert gas along said walls adjacent the flow of gaseous isotopic molecules and carrier gas.

16. The system for isotope separation as defined in claim 15 wherein said means to direct a flowing barrier of inert gas are positioned in said nozzle throat of said supersonic nozzle structure.

17. The system for isotope separation as defined in claim 15 wherein said expansion chamber includes:

at least two facing walls each having:

a window therein through which said means to selectively excite first isotopic molecules transmit photons, said system for isotope separation further including:

means to direct a flowing layer of inert gas along said walls adjacent said windows on the opposite side of said walls from the flowing barrier of inert gas directed along said walls adjacent the excited isotopic molecules, and in contact therewith and with similar velocity.

18. The system for isotope separation as defined in claim 1 wherein said nozzle throat includes:

1 through n separate feed inlets for producing 1 through n separate streams of gaseous isotopic molecules and carrier gas mixture; and means to maintain the 1 through n separate streams of gaseous isotopic molecules and carrier gas mixture separate from each other, and wherein said collection chamber means include:

1 through n separate collectors for capturing 1 through n separate depleted streams of gaseous isotopic molecules and carrier gas mixture, said system for isotope separation further including:

gas recompressor means that compress the 1 through n-1 separate depleted streams of gaseous isotopic molecules and carrier gas mixture and connect said 1 through n-1 separate depleted streams of gaseous isotopic molecules and carrier gas mixture to said separate feed inlets 2 through n respectively, whereby gaseous isotopic molecules in the depleted streams of gaseous isotopic molecules and carrier gas mixture pass by said means to selectively excite first isotopic molecules n times, where n is an integer greater than 1.

19. The system for isotope separation as defined in claim 18 wherein said means to maintain the 1 through n separate streams of gaseous isotopic molecules and carrier gas mixture separate include:

means to inject gaseous walls of carrier gas between the 1 through n separate streams of gaseous isotopic molecules and carrier gas mixture.

20. The system for isotope separation as defined in claim 1 wherein said supersonic nozzle structure produces a flow of the gaseous isotopic molecules in a first direction, said means to mix at least one reactant gas including:

a second nozzle structure positioned and oriented to produce a flow of reactant gas in a second direction so that the flow of reactant gas intersects the flow of the gaseous isotopic molecules after the first isotopic molecules have been excited for reaction therewith into the compound, and wherein said collection chamber means are positioned at predetermined angles to both flows to receive the compound.

21. The system for isotope separation as defined in claim 1 wherein said supersonic nozzle structure produces a flow of the gaseous isotopic molecules in a first predetermined direction, said means to mix at least one reactant gas including:

a porous plate having:

an impact surface positioned and oriented so said flow of reactant gas intersects said impact surface at a first angle after the first isotopic molecules have been excited; and a flow of reactant gas there through to react with the excited isotopic molecules into the compound, and wherein said collection chamber means are positioned at a second angle to said impact surface to receive the compound so formed.

22. The system for isotope separation as defined in claim 1 wherein said collection chamber means include:

at least one collection surface, said system for isotope separation further including:
  means to provide a fixation agent adjacent said at least one collection surface to reduce the compound into a second compound that is relatively resistant to isotope scrambling back reactions;
  means to interrupt flow of the gaseous isotopic molecules; and
  means to apply a removal agent for the second compound to said collection surface when the flow of the gaseous isotopic molecules is interrupted to remove the second compound therefrom.

23. The system for isotope separation as defined in claim 22 wherein said at least one collection surface is a fluorine passivated surface.

24. The system for isotope separation as defined in claim 22 wherein said at least one collection surface is porous, and wherein said means to provide a fixation agent flow the fixation agent through said at least one porous collection surface.

25. A system for separating $^{235}$U and $^{238}$U including:
  a source of $UF_6$ gas;
  a source of inert carrier gas;
  a nozzle structure having:
    a nozzle throat in flow connection to said gas sources so that a $UF_6$ gas and inert carrier gas mixture flow there through; and
    an expansion chamber positioned downstream from said nozzle throat, said expansion chamber including:
      means to isotopically selectively excite $UF_6$ molecules in the gas mixture with photons of at least one predetermined wavelength at least to a predetermined vibrational energy level while the $UF_6$ gas is in said expansion chamber;
      means to mix at least one reactant gas with the excited $UF_6$ molecules so that the excited $UF_6$ molecules chemically react with the reactant gas to form a first Uranium compound other than $UF_6$, that is enriched with a selected one of the Uranium isotopes; and
    collection means positioned downstream from said expansion chamber including:
      at least one collection surface for collecting the first Uranium compound; and
      means for cleaning said at least one collection surface of Uranium compound.

26. The system for separating $^{235}$U and $^{238}$U as defined in claim 25 wherein said collection means further include:
  means for fixating the first Uranium compound on said at least one collection surface by changing the first Uranium compound to a second Uranium compound less prone to isotope scrambling back reactions than the first Uranium compound, said at least one collection surface having fixating agent thereat.

27. The system for separating $^{235}$U and $^{238}$U as defined in claim 25 wherein said collection means include:
  a porous structure, said at least one collection surface being a surface of said porous structure, and wherein said means to mix at least one reactant gas with the excited $UF_6$ molecules flow the at least one reactant gas through said porous structure to said at least one collection surface for reaction with the excited $UF_6$ molecules.

28. The system for separating $^{235}$U and $^{238}$U as defined in claim 25 wherein said nozzle structure is a supersonic nozzle structure so that the $UF_6$ gas and inert carrier gas mixture is supersonically transported past said means to isotopically selectively excite $UF_6$ molecules to a shock, said means to mix at least one reactant gas so that it chemically reacts with the excited $UF_6$ molecules introduce the at least one reactant gas into the mixture flow to establish the position of said shock at a relatively stationary position adjacent said introduction.

29. The system for separating $^{235}$U and $^{238}$U as defined in claim 25 wherein said nozzle structure is a supersonic nozzle structure so that the $UF_6$ gas and inert carrier gas mixture is supersonically transported past said means to isotopically selectively excite $UF_6$ molecules, said means to mix at least one reactant gas so that it chemically reacts with the excited $UF_6$ molecules introduce the at least one reactant gas upstream of said supersonic nozzle throat.

30. The system for separating $^{235}$U and $^{238}$U as defined in claim 25 further including:
  at least one plenum connected said sources so that the $UF_6$ gas and inert carrier gas feed into said plenum for mixing, wherein said means to feed at least one reactant gas so that it chemically reacts with the excited $UF_6$ molecules mix the at least one reactant gas into said plenum for mixing with the $UF_6$ gas and the inert carrier gas.

31. The system for separating $^{235}$U and $^{238}$U as defined in claim 25 wherein said means to mix at least one reactant gas so that it chemically reacts with the excited $UF_6$ molecules mix the at least one reactant gas in said expansion chamber upstream of said means to isotopically selectively excite $UF_6$ molecules.

32. The system for separating $^{235}$U and $^{238}$U as defined in claim 25 wherein said means to isotopically selectively excite $UF_6$ molecules excite $^{235}UF_6$ molecules and include:
  a laser system having:
    a first fine tuned 16 μm laser producing photons directed at the $UF_6$ molecules to excite the $UF_6$ molecules to at least a first vibrational level;
    a second fine tuned 16 μm laser producing photons having a different wavelength than the photons produced by said first 16 μm laser directed at the $UF_6$ molecules to excite the $^{235}UF_6$ molecules excited to at least a first vibrational level to at least a second higher vibrational level; and
    a laser selected from the list of lasers consisting of:
      a 16 μm laser; and
      an about 9 μm laser, producing photons directed at the $UF_6$ molecules to excite the $^{235}UF_6$ molecules excited to at least a second higher vibrational level to a third still higher vibrational level.

33. The system for separating $^{235}$U and $^{238}$U as defined in claim 32 wherein said laser system further includes:
  a plurality of mirrors to pass photons produced by each of said lasers across said expansion chamber a plurality of times.

34. The system for separating $^{235}$U and $^{238}$U as defined in claim 25 wherein said means to isotopically selectively excite $UF_6$ molecules include:
  a fine tuned 5.3 μm laser producing photons directed at the $UF_6$ molecules; and
  a plurality of mirrors to pass photons produced by said 5.3 μm laser across said expansion chamber a plurality of times.

35. The system for separating $^{235}$U and $^{238}$U as defined in claim 34 wherein said means to isotopically selectively excite $UF_6$ molecules include:

an about 9 μm laser producing photons directed at the $UF_6$ molecules excited by the photons of said 5.3 μm laser; and a plurality of mirrors to pass photons produced by said about 9 μm laser across said expansion chamber a plurality of times.

36. The system for separating $^{235}U$ and $^{238}U$ as defined in claim 25 wherein said collection chamber means and said expansion chamber have:

walls, said system for separating $^{235}U$ and $^{238}U$ further including:

means to gaseously shield the $UF_6$ molecules from said walls that include:

means to direct a layer of inert gas along said walls adjacent the flow of $UF_6$ molecules and carrier gas mixture.

37. The system for separating $^{235}U$ and $^{238}U$ as defined in claim 36 wherein said means to direct a layer of inert gas along said walls are positioned in said nozzle throat of said nozzle structure.

38. The system for separating $^{235}U$ and $^{238}U$ as defined in claim 36 wherein said expansion chamber includes:

at least two spaced facing walls, each wall having:

a window therein through which said means to isotopically selectively excite $UF_6$ molecules with photons direct photons, said means for separating $^{235}U$ and $^{238}U$ further including:

means to direct layers of inert gas along said walls adjacent said windows on the opposite sides thereof from the layers of inert gas directed along said walls adjacent the flow of excited $UF_6$ molecules and carrier gas mixture and in contact therewith to form aerodynamic window panes of flowing inert gas.

39. The system for separating $^{235}U$ and $^{238}U$ as defined in claim 25 wherein said expansion chamber includes:

a first pair of spaced generally parallel walls, each wall of said first pair having:

a window therein through which said means to isotopically selectively excite $UF_6$ molecules with photons direct photons; and a second pair of spaced generally parallel walls extending between said first pair of spaced walls, said first pair of spaced walls being spaced substantially further than said second pair of spaced walls, said means for separating $^{235}U$ and $^{238}U$ further including:

means to gaseously shield the $UF_6$ molecules from said walls that include:

means to direct layers of inert gas along said walls adjacent the flow of $UF_6$ molecules and carrier gas mixture; and means to direct layers of inert gas along said walls adjacent said windows on the opposite sides thereof from the layers of inert gas directed along said walls adjacent the flow of excited $UF_6$ molecules and carrier gas mixture and in contact therewith to form dynamic window panes of flowing inert gas.

40. The system for separating $^{235}U$ and $^{238}U$ as defined in claim 25 wherein said nozzle throat includes:

1 through n separate feed inlets for producing 1 through n separate streams of $UF_6$ molecules and inert carrier gas mixture; and means to maintain the 1 through n separate streams of $UF_6$ molecules and inert carrier gas mixture separate, said collection chamber means including:

1 through n separate collectors for capturing 1 through n separate depleted streams of $UF_6$ molecules and inert carrier gas mixture, said system for separating $^{235}U$ and $^{238}U$ further including:

recompressor means that compress the 1 through n-1 separate depleted streams of $UF_6$ molecules and inert carrier gas mixture and connect said 1 through n-1 separate depleted streams of $UF_6$ molecules and inert carrier gas mixture to said separate feed inlets of 2 through n respectively, whereby $UF_6$ molecules in depleted streams of $UF_6$ molecules and inert carrier gas mixture pass by said means to isotopically selectively excite the $UF_6$ molecules n times, where n is an integer greater than 1.

41. The system for separating $^{235}U$ and $^{238}U$ as defined in claim 40 wherein said means to maintain the 1 through n separate streams of $UF_6$ molecules and inert carrier gas mixture separate include:

means to inject gaseous walls of carrier gas between the 1 through n separate streams of $UF_6$ molecules and inert carrier gas mixture.

42. The system for separating $^{235}U$ and $^{238}U$ as defined in claim 25 wherein said collection means further include:

means for fixating the first Uranium compound on said at least one collection surface by providing a coating created by fluorine passivation on said at least one collection surface.

43. The system for separating $^{235}U$ and $^{238}U$ as defined in claim 25 wherein said collection means further include:

means for fixating the first Uranium compound on said at least one collection surface by changing the first Uranium compound to a second Uranium compound less prone to isotope scrambling back reactions; and a porous structure, said at least one collection surface being a surface of said porous structure, and wherein said means for fixating flow fixating agent through said porous structure to said at least one collection surface.

44. The system for separating $^{235}U$ and $^{238}U$ as defined in claim 43 wherein said means for cleaning said at least one collection surface flow cleaning agent through said porous structure to said at least one collection surface at predetermined intervals to remove the second Uranium compound.

45. The system for separating $^{235}U$ and $^{238}U$ as defined in claim 25 wherein said nozzle structure is a supersonic nozzle structure so that the $UF_6$ gas and inert carrier gas mixture is supersonically transported past said means to isotopically selectively excite $UF_6$ molecules to a shock, said at least one collection surface being comprised of:

a plurality of particles introduced into the mixture flow to establish the position of said shock at a relatively stationary position.

46. The system for separating $^{235}U$ and $^{238}U$ as defined in claim 45 wherein said plurality of particles include materials chosen from the group consisting of:

stainless steel;

nickel;

copper;

gold;

palladium;

carbon;

alumina; and fullerenes, and said plurality of particles have a fixating agent included therewith to fixate the first Uranium compound into a second Uranium compound that is more resistant to isotope scrambling back reactions than the first Uranium compound.

47. The system for separating $^{235}$U and $^{238}$U as defined in claim 46 wherein said plurality of particles have at least one coreactant absorbed into their surfaces to produce the first compound when contacted by selectively excited $UF_6$.

48. An apparatus for the separation of isotopic molecules having at least two isotopes of the same atom therein, including:

a supersonic nozzle structure connected to sources of the isotopic molecules in gaseous form and carrier gas, said supersonic nozzle structure having:

a nozzle throat through which the gaseous isotopic molecules and carrier gas introduced up stream thereof at said at least first pressure flow sonically; and an expansion chamber positioned downstream from said nozzle throat shaped so that the gaseous isotopic molecules and carrier gas become supersonic and supercooled thereat, said expansion chamber including:

means for selectively exciting, from a first energy level to at least a second energy level, first isotopic molecules having a desired isotope therein with photons of at least a first wavelength while the first isotopic molecules are in said expansion chamber;

means for mixing at least one reactant gas with isotopic molecules excited by said means for selectively exciting so that said at least one reactant gas can chemically react with excited isotopic molecules to form a isotopic compound;

collection chamber means positioned downstream from said expansion chamber for collecting isotopic compound, said expansion chamber and said collection chamber means having:

walls generally parallel to flow through said nozzle throat; and means to gaseously shield the excited isotopic molecules from said walls.

49. The apparatus for isotope separation as defined in claim 48 wherein said collection chamber means include:

a port connected to said means to mix at least one reactant gas positioned to introduce the at least one reactant gas at a location in said collection chamber means to form the shock thereat and to affect said mixing with excited first isotopic molecules.

50. The apparatus for isotope separation as defined in claim 48 wherein said collection chamber means further include:

at least one surface positioned for impingement by isotopic compound for collection; and means permitting isotopic compound to be intermittently removed from said at least one surface.

51. The apparatus for isotope separation as defined in claim 50 wherein isotopic compound is a condensing compound and wherein said collection chamber means further include:

a collection chamber;

a wheel structure constructed so that a portion thereof can be rotated through said collection chamber, said wheel structure having:

a plurality of surfaces positioned for sequential impingement by isotopic compound within said collection chamber for collection;

means for sequentially removing isotopic compound from said plurality of surfaces outside said collection chamber; and means for sequentially passivating said plurality of surfaces outside said collection chamber after isotopic compound has been removed therefrom.

52. The apparatus for isotope separation as defined in claim 51 wherein said nozzle throat includes:

1 through n separate feed inlets capable of producing 1 through n separate streams of gaseous isotopic molecules and carrier gas mixture; and means capable of maintaining the 1 through n separate streams of gaseous isotopic molecules and carrier gas mixture separate from each other, and wherein said collection chamber means include:

1 through n regions of said plurality of surfaces for capturing 1 through n separate depleted streams of gaseous isotopic molecules and carrier gas mixture, said apparatus for isotope separation further including:

gas recompressor means capable of compressing the 1 through n-1 separate depleted streams of gaseous isotopic molecules and carrier gas mixture and connecting said 1 through n-1 separate depleted streams of gaseous isotopic molecules and carrier gas mixture to said separate feed inlets 2 through n respectively, whereby gaseous isotopic molecules in the depleted streams of gaseous isotopic molecules and carrier gas mixture are directed to pass by said means to selectively excite first isotopic molecules n times, where n is an integer greater than 1.

53. The apparatus for isotope separation as defined in claim 52 wherein said means to maintain the 1 through n separate streams of gaseous isotopic molecules and carrier gas mixture separate include:

means to inject gaseous walls of carrier gas between the 1 through n separate streams of gaseous isotopic molecules and carrier gas mixture.

54. The system for isotope separation as defined in claim 1 wherein said means to selectively excite, also selectively excite at least one reactant gas from a first energy level to at least a second energy level so that said at least one reactant gas chemically reacts with excited isotopic molecules to form a compound.

55. The system for isotope separation as defined in claim 54 wherein said at least one reactant gas is $SiH_4^{v*}$.

56. The system for separating $^{235}$U and $^{238}$U as defined in claim 25 further including:

means to excite at least one reactant gas.

57. The system for separating $^{235}$U and $^{238}$U as defined in claim 56 wherein said at least one reactant gas is $SiH_4^{v*}$.

* * * * *